(12) United States Patent
Wang et al.

(10) Patent No.: US 11,317,071 B2
(45) Date of Patent: Apr. 26, 2022

(54) VIDEO SIGNAL PROCESSING METHOD AND APPARATUS

(71) Applicant: Huawei Technologies Co., Ltd., Shenzhen (CN)

(72) Inventors: Zheng Wang, Shenzhen (CN); Le Yuan, Shenzhen (CN); Renjian Wu, Shenzhen (CN); Fang Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/135,568

(22) Filed: Dec. 28, 2020

(65) Prior Publication Data
US 2021/0152801 A1  May 20, 2021

Related U.S. Application Data

(63) Continuation of application No. PCT/CN2019/090566, filed on Jun. 10, 2019.

(30) Foreign Application Priority Data

Jul. 5, 2018  (CN) .......................... 201810732833.5
Jul. 19, 2018  (CN) .......................... 201810797968.X

(51) Int. Cl.
*H04N 11/20* (2006.01)
*H04N 7/01* (2006.01)
*H04N 9/64* (2006.01)

(52) U.S. Cl.
CPC ........... *H04N 11/20* (2013.01); *H04N 7/0135* (2013.01); *H04N 9/64* (2013.01)

(58) Field of Classification Search
CPC ........ H04N 11/20; H04N 7/0135; H04N 9/64; H04N 5/57; H04N 9/68; H04N 5/202;
(Continued)

(56) References Cited

U.S. PATENT DOCUMENTS

2009/0002564 A1* 1/2009 Barnhoefer .......... G09G 3/3406
348/687
2009/0290807 A1* 11/2009 Marchesotti ........... H04N 9/643
382/261
(Continued)

FOREIGN PATENT DOCUMENTS

CN       105516674 A     4/2016
CN       105794216 A     7/2016
(Continued)

OTHER PUBLICATIONS

Rocco Goris(Philips) et al, Philips response to CfE for HDR and WCG, International Organisation for Standardisation, Organisation Internationale De Normalisation, ISO/IEC JTC1/SC29/WG11, Coding of Moving Pictures and Audio, MPEG2015 M36266, Jul. 2015, Warsaw, Poland, 16 pages, XP030064634.
(Continued)

*Primary Examiner* — Paulos M Natnael
(74) *Attorney, Agent, or Firm* — Conley Rose, P.C.

(57) ABSTRACT

A video signal processing method includes obtaining a first linear luminance signal based on a first linear red green blue (RGB) signal corresponding to a video signal, converting the first linear luminance signal into a first non-linear luminance signal, performing a piecewise luminance mapping on the first non-linear luminance signal to obtain a second non-linear luminance signal, converting the second non-linear luminance signal into a second linear luminance signal, calculating a luminance gain between the second linear luminance signal and the first linear luminance signal, and obtaining, based on a product of the luminance gain and the first linear RGB signal, an RGB display signal corresponding to the video signal.

20 Claims, 20 Drawing Sheets

(58) Field of Classification Search
CPC ... H04N 9/77; H04N 9/67; H04N 9/69; G06T 2207/10024; G06T 2207/20208; G06T 5/009; G09G 2320/0276; G09G 2340/0428; G09G 2340/06; G09G 2360/16; G09G 2370/04; G09G 5/10
See application file for complete search history.

(56) References Cited

U.S. PATENT DOCUMENTS

| | | | |
|---|---|---|---|
| 2009/0310015 | A1 | 12/2009 | El-Mahdy et al. |
| 2014/0240367 | A1* | 8/2014 | Kim .................. G09G 3/3413 345/690 |
| 2016/0292834 | A1 | 10/2016 | Tsuru et al. |
| 2016/0309154 | A1 | 10/2016 | Rusanovskyy et al. |
| 2017/0085827 | A1 | 3/2017 | Terada et al. |
| 2018/0122058 | A1 | 5/2018 | Kang et al. |
| 2018/0276801 | A1 | 9/2018 | Stessen |
| 2018/0376221 | A1 | 12/2018 | Tsukagoshi |
| 2019/0180701 | A1 | 6/2019 | Nakanishi et al. |
| 2021/0092342 | A1* | 3/2021 | Yuan ..................... H04N 5/20 |

FOREIGN PATENT DOCUMENTS

| | | |
|---|---|---|
| CN | 106780402 A | 5/2017 |
| CN | 106878694 A | 6/2017 |
| CN | 106878964 A | 6/2017 |
| CN | 107046628 A | 8/2017 |
| CN | 107211079 A | 9/2017 |
| CN | 108009993 A | 5/2018 |
| CN | 108090879 A | 5/2018 |
| CN | 108900823 A | 11/2018 |
| GB | 2539917 A | 1/2017 |
| JP | 2010009583 A | 1/2010 |
| JP | 2018046556 A | 3/2018 |
| WO | 2015190044 A1 | 12/2015 |
| WO | 2017009182 A1 | 1/2017 |
| WO | 2018096925 A1 | 5/2018 |

OTHER PUBLICATIONS

Andrew Cotton(BBC) et al, BBC's response to CfE for HDR Video Coding (Category 3a), International Organisation for Standardisation, Organisation Internationale De Normalisation, ISO/IEC JTC1/SC29/WG11,Coding of Moving Pictures and Audio, M36249, Jun. 2015, Warsaw, Poland, 22 pages, XP030064617.
Recommendation ITU-R BT.2100-2, Jul. 2018 "Image parameter values for high dynamic range television for use in production and international programme exchange," BT Series, Broadcasting service(television), 16 pages.

* cited by examiner

VIDEO SIGNAL PROCESSING METHOD AND APPARATUS

CROSS-REFERENCE TO RELATED APPLICATIONS

This application is a continuation of International Patent Application No. PCT/CN2019/090566 filed on Jun. 10, 2019, which claims priority to Chinese Patent Application No. 201810732833.5 filed on Jul. 5, 2018 and Chinese Patent Application No. 201810797968.X filed on Jul. 19, 2018. The disclosures of the aforementioned applications are hereby incorporated by reference in their entireties.

TECHNICAL FIELD

This application relates to the field of multimedia communications, and in particular, to a video signal processing method and apparatus.

BACKGROUND

A high dynamic range (HDR) video technology expands a displayable luminance range of an image, and therefore can record a relatively large amount of luminance range information and present more brightness and darkness details. The HDR technology is a hot technology that has emerged in the video industry in recent years, and is also a development trend in the video industry in the future. A dynamic range of a real picture that is seen by human eyes in the real world is relatively large. A conventional standard dynamic range (SDR) display device has a low luminance and a relatively small dynamic range. In a conventional SDR video technology, when a camera performs capture, production, editing, and encoding, a dynamic range of a captured picture is continuously compressed to make the captured picture suitable for being displayed on an SDR television set. In contrast, usually, a luminance range of an HDR video is far larger than a luminance range that can be displayed by an SDR display device or a large quantity of other existing HDR display devices. Therefore, when an HDR video signal is displayed on an existing display device, a luminance of the HDR video signal needs to be processed based on a capability of the display device, to make the HDR video signal match a luminance range that can be displayed by the display device such that the HDR video signal is suitable for being displayed on the existing device. During luminance processing performed on a video signal, inappropriate luminance processing results in an undesirable display effect of the HDR video.

SUMMARY

Embodiments of this application provide a video signal processing method and apparatus, to improve a display effect of a video signal on a display device.

A first aspect of this application provides a video signal processing method. The method includes obtaining a first linear luminance signal, where the first linear luminance signal is obtained based on a first linear red, green, and blue (RGB) signal corresponding to a to-be-processed video signal, converting the first linear luminance signal into a first non-linear luminance signal, performing piecewise luminance mapping on the first non-linear luminance signal to obtain a second non-linear luminance signal, converting the second non-linear luminance signal into a second linear luminance signal, calculating a luminance gain between the second linear luminance signal and the first linear luminance signal, and obtaining, based on a product of the luminance gain and the first linear RGB signal, an RGB display signal corresponding to the to-be-processed video signal.

In this embodiment of this application, the luminance signal is converted to non-linear space for piecewise luminance mapping such that a display luminance range of a video signal can be appropriately mapped onto a luminance range that can be displayed by a display device. This improves a contrast ratio, a luminance, and a detail representation of a picture, and especially in a case of low-luminance displaying, display luminance distribution obtained after the mapping is appropriate and the displayed picture is not quite dark. Because luminance mapping is performed in the non-linear space, errors caused by luminance mapping are evenly distributed and have relatively small impact on an ultimate display effect of the video signal. In addition, a luminance range of a to-be-processed video signal is relatively large, and video signals in different luminance regions differ from each other in contributions to a video display effect. Therefore, performing piecewise mapping on luminance values of the to-be-processed video signal based on characteristics of luminance intervals of the to-be-processed video signal using different luminance mapping relationships improves flexibility and appropriateness of luminance mapping.

In a possible implementation, the to-be-processed video signal is a Perceptual Quantizer (PQ) signal, and obtaining a first linear luminance signal includes performing color space conversion on the PQ signal to obtain a first non-linear RGB signal, converting the first non-linear RGB signal into the first linear RGB signal based on a PQ electro-optical transfer function (EOTF), and performing calculation based on primary color signals of the first linear RGB signal to obtain the first linear luminance signal.

In a possible implementation, the to-be-processed video signal is a Hybrid Log-Gamma (HLG) signal, and obtaining a first linear luminance signal includes performing color space conversion on the HLG signal to obtain a second non-linear RGB signal, converting the second non-linear RGB signal into a second linear RGB signal based on an HLG inverse optical-electro transfer function (OETF), performing calculation based on primary color signals of the second linear RGB signal to obtain a third linear luminance signal, and performing luminance signal type conversion on the third linear luminance signal to obtain the first linear luminance signal.

In this embodiment of this application, the luminance signal obtained based on the HLG signal is a scene light luminance signal, and the scene light luminance signal needs to be converted into a display light luminance signal, and after the scene light luminance signal is converted into the display light display light luminance signal, the display light luminance signal is not displayed directly, but the display light luminance signal is converted to non-linear space for piecewise luminance mapping, to retain luminance details as much as possible. This improves appropriateness of luminance mapping, and improves a display effect of the HLG signal.

In a possible implementation, the first linear luminance signal is a linear display light luminance signal, and the third linear luminance signal is a linear scene light luminance signal.

In a possible implementation, after the obtaining an RGB display signal corresponding to the to-be-processed video signal, the method further includes performing color space conversion on the RGB display signal to obtain a target display signal, where a color format of the target display signal is the same as a color format corresponding to a display device.

In a possible implementation, after obtaining an RGB display signal corresponding to the to-be-processed video signal, the method further includes adding a black level lift (BlackLevelLift) to each color value of the RGB display signal to obtain a processed RGB display signal, where the BlackLevelLift is a minimum value of a display luminance of the display device, and correspondingly, performing color space conversion on the RGB display signal includes performing color space conversion on the processed RGB display signal.

In this embodiment of this application, impact of a black level of the display device on a luminance mapping curve is considered, and luminance details of a low luminance part are retained.

In a possible implementation, performing piecewise luminance mapping on the first non-linear luminance signal to obtain a second non-linear luminance signal includes determining a first threshold and a second threshold, where the first threshold is less than the second threshold, when a luminance value of the first non-linear luminance signal is less than or equal to the first threshold, a luminance value of the second non-linear luminance signal is equal to the luminance value of the first non-linear luminance signal, when the luminance value of the first non-linear luminance signal is greater than the first threshold and is less than or equal to the second threshold, the luminance value of the second non-linear luminance signal is obtained based on a fitted curve that uses the luminance value of the first non-linear luminance signal as an independent variable, and when the luminance value of the first non-linear luminance signal is greater than the second threshold, the luminance value of the second non-linear luminance signal is equal to a maximum non-linear display luminance value corresponding to the display device.

In this embodiment of this application, the to-be-processed video signal is divided into three parts based on the two luminance thresholds. A part whose luminance value is less than or equal to the first threshold is used as a first video signal segment, and a luminance that is of the first video signal segment and that is obtained after luminance mapping is equal to its luminance before luminance mapping, that is, a video signal in the low luminance part is not compressed such that image details of the low luminance part can be retained to the utmost. A high luminance part is divided into two parts: A part whose luminance value is greater than the first threshold and is less than the second threshold is compressed based on the fitted curve, to retain luminance details of the part as much as possible, and a part whose luminance value is greater than the second threshold is mapped onto the second threshold. During piecewise luminance mapping, characteristics of luminances are fully considered, and luminance details are retained as much as possible, thereby improving appropriateness of luminance mapping.

In a possible implementation, the fitted curve is obtained by performing Hermite interpolation on the first threshold and the second threshold.

In a possible implementation, performing piecewise luminance mapping on the first non-linear luminance signal to obtain a second non-linear luminance signal includes performing the luminance mapping on the first non-linear luminance signal using the following piecewise function:

$$f_{tm}(e) = \begin{cases} e, & e \leq KP1 \\ hmt(e), & KP1 < e \leq KP2, \\ maxDL, & e > KP2 \end{cases}$$

$$hmt(x) = y_0 \times \alpha_0(x) + y_1 \times \alpha_1(x) + y'_0 \beta_0(x) + y'_1 \beta_1(x),\text{ and}$$

$$\begin{cases} \alpha_0(x) = \dfrac{(x_1 - 3x_0 + 2x)(x_1 - x)^2}{(x_1 - x_0)^3} \\ \alpha_1(x) = \dfrac{(3x_1 - x_0 + 2x)(x - x_0)^2}{(x_1 - x_0)^3} \\ \beta_0(x) = \dfrac{(x - x_0)(x - x_1)^2}{(x_1 - x_0)^2} \\ \beta_1(x) = \dfrac{(x - x_0)^2(x - x_1)}{(x_1 - x_0)^2} \end{cases},$$

where e is the first non-linear luminance signal, $f_{tm}(e)$ is the second non-linear luminance signal, KP1 is the first threshold, KP2 is the second threshold, maxDL is the maximum non-linear display luminance value of the display device, maxSL is a maximum non-linear source luminance value, and $x_0$=KP1, $x_1$=maxSL, $y_0$=KP1, $y_1$=maxDL, $y_0'$=1, and $y_1'$=0.

In this embodiment of this application, y0=x0 indicates that compression is not performed on the luminance value less than or equal to the first threshold, and linear mapping is performed, x1=maxSL and y1=maxDL indicate that a maximum source luminance is mapped onto a maximum screen luminance maxDL, and when x0=KP and y0'=1, it is ensured that a slope of the curve at the threshold KP is 1, and when x1=maxSL and y1'=0, it is ensured that a slope of the curve at the threshold maxSL is 0. In this way, it can be ensured that the curve obtained through fitting is smooth at the two thresholds.

In a possible implementation, determining a first threshold and a second threshold includes determining the first threshold based on a relationship between a display luminance range of the first non-linear luminance signal and a display luminance range of the display device, and using a maximum luminance value of the first non-linear luminance signal as the second threshold.

In this embodiment of this application, selection of the luminance threshold is related to a difference between a source luminance and the display luminance of the display device. When the source luminance is lower than or equal to the display luminance, compression does not need to be performed on the source luminance, and in this case, the first threshold is equal to the second threshold and is equal to the maximum non-linear luminance value of the source signal. When the source luminance is far higher than the display luminance and a luminance interval that needs to be compressed is relatively large, a relatively small value is selected as the first threshold. When the source luminance is higher than the display luminance and a difference between them is quite small, a relatively large value may be selected as the first threshold.

In a possible implementation, performing piecewise luminance mapping on the first non-linear luminance signal to obtain a second non-linear luminance signal includes determining, based on a preset luminance value mapping relationship between the first non-linear luminance signal and the second non-linear luminance signal, a luminance value of the second non-linear luminance signal corresponding to a luminance value of the first non-linear luminance signal.

In a possible implementation, converting the first linear luminance signal into a first non-linear luminance signal includes converting the first linear luminance signal into the first non-linear luminance signal based on a PQ inverse EOTF, and correspondingly, converting the second non-linear luminance signal into a second linear luminance signal includes converting the second non-linear luminance signal into the second linear luminance signal based on the PQ EOTF.

A second aspect of this application provides a video signal processing apparatus. The apparatus includes a luminance obtaining unit configured to obtain a first linear luminance signal, where the first linear luminance signal is obtained based on a first linear RGB signal corresponding to a to-be-processed video signal, a first conversion unit configured to convert the first linear luminance signal into a first non-linear luminance signal, a luminance mapping unit configured to perform piecewise luminance mapping on the first non-linear luminance signal to obtain a second non-linear luminance signal, a second conversion unit configured to convert the second non-linear luminance signal into a second linear luminance signal, a gain calculation unit configured to calculate a luminance gain between the second linear luminance signal and the first linear luminance signal, and a display signal obtaining unit configured to obtain, based on a product of the luminance gain and the first linear RGB signal, an RGB display signal corresponding to the to-be-processed video signal.

In a possible implementation, the to-be-processed video signal is a PQ signal, and the luminance obtaining unit is further configured to perform color space conversion on the PQ signal to obtain a first non-linear RGB signal, convert the first non-linear RGB signal into the first linear RGB signal based on a PQ EOTF, and perform calculation based on primary color signals of the first linear RGB signal to obtain the first linear luminance signal.

In a possible implementation, the to-be-processed video signal is an HLG signal, and the luminance obtaining unit is further configured to perform color space conversion on the HLG signal to obtain a second non-linear RGB signal, convert the second non-linear RGB signal into a second linear RGB signal based on an HLG inverse (OETF), perform calculation based on primary color signals of the second linear RGB signal to obtain a third linear luminance signal, and perform luminance signal type conversion on the third linear luminance signal to obtain the first linear luminance signal.

In a possible implementation, the apparatus further includes a color space conversion unit configured to perform color space conversion on the RGB display signal to obtain a target display signal, where a color format of the target display signal is the same as a color format corresponding to a display device.

In a possible implementation, the apparatus further includes a compensation unit configured to add a BlackLevelLift to each color value of the RGB display signal to obtain a processed RGB display signal, where the BlackLevelLift is a minimum value of a display luminance of the display device, and correspondingly, the color space conversion unit is further configured to perform color space conversion on the processed RGB display signal.

In a possible implementation, the luminance mapping unit is further configured to determine a first threshold and a second threshold, where the first threshold is less than the second threshold, when a luminance value of the first non-linear luminance signal is less than or equal to the first threshold, a luminance value of the second non-linear luminance signal is equal to the luminance value of the first non-linear luminance signal, when the luminance value of the first non-linear luminance signal is greater than the first threshold and is less than or equal to the second threshold, the luminance value of the second non-linear luminance signal is obtained based on a fitted curve that uses the luminance value of the first non-linear luminance signal as an independent variable, and when the luminance value of the first non-linear luminance signal is greater than the second threshold, the luminance value of the second non-linear luminance signal is equal to a maximum non-linear display luminance value corresponding to the display device.

In a possible implementation, the fitted curve is obtained by performing Hermite interpolation on the first threshold and the second threshold.

In a possible implementation, the luminance mapping unit is further configured to perform the luminance mapping on the first non-linear luminance signal using the following piecewise function:

$$f_{tm}(e) = \begin{cases} e, & e \leq KP1 \\ hmt(e), & KP1 < e \leq KP2, \\ \max DL, & e > KP2 \end{cases}$$

$$hmt(x) = y_0 \times \alpha_0(x) + y_1 \times \alpha_1(x) + y_0' \beta_0(x) + y_1' \beta_1(x), \text{ and}$$

$$\begin{cases} \alpha_0(x) = \dfrac{(x_1 - 3x_0 + 2x)(x_1 - x)^2}{(x_1 - x_0)^3} \\ \alpha_1(x) = \dfrac{(3x_1 - x_0 + 2x)(x - x_0)^2}{(x_1 - x_0)^3} \\ \beta_0(x) = \dfrac{(x - x_0)(x - x_1)^2}{(x_1 - x_0)^2} \\ \beta_1(x) = \dfrac{(x - x_0)^2(x - x_1)}{(x_1 - x_0)^2} \end{cases},$$

where e is the first non-linear luminance signal, $f_{tm}(e)$ is the second non-linear luminance signal, KP1 is the first threshold, KP2 is the second threshold, maxDL is the maximum non-linear display luminance value of the display device, maxSL is a maximum non-linear source luminance value, and $x_0$=KP1, $x_1$=maxSL, $y_0$=KP1, $y_1$=maxDL, $y_0'$=1, and $y_1'$=0.

In a possible implementation, the luminance mapping unit is further configured to determine the first threshold based on a relationship between a display luminance range of the first non-linear luminance signal and a display luminance range of the display device, and use a maximum luminance value of the first non-linear luminance signal as the second threshold.

In a possible implementation, the luminance mapping unit is further configured to determine, based on a preset luminance value mapping relationship between the first non-linear luminance signal and the second non-linear luminance signal, a luminance value of the second non-linear luminance signal corresponding to a luminance value of the first non-linear luminance signal.

In a possible implementation, the first conversion unit is further configured to convert the first linear luminance signal into the first non-linear luminance signal based on a PQ inverse EOTF, and correspondingly, the second conversion unit is further configured to convert the second non-linear luminance signal into the second linear luminance signal based on the PQ EOTF.

A third aspect of this application provides a video signal processing apparatus. The apparatus includes a processor and a memory, where the processor is configured to invoke a software instruction in the memory to perform the following steps obtaining a first linear luminance signal, where the first linear luminance signal is obtained based on a first linear RGB signal corresponding to a to-be-processed video signal, converting the first linear luminance signal into a first non-linear luminance signal, performing piecewise luminance mapping on the first non-linear luminance signal to obtain a second non-linear luminance signal, converting the second non-linear luminance signal into a second linear luminance signal, calculating a luminance gain between the second linear luminance signal and the first linear luminance signal, and obtaining, based on a product of the luminance gain and the first linear RGB signal, an RGB display signal corresponding to the to-be-processed video signal.

In a possible implementation, the to-be-processed video signal is a PQ signal, and the processor is further configured to perform color space conversion on the PQ signal to obtain a first non-linear RGB signal, convert the first non-linear RGB signal into the first linear RGB signal based on a PQ EOTF, and perform calculation based on primary color signals of the first linear RGB signal to obtain the first linear luminance signal.

In a possible implementation, the to-be-processed video signal is an HLG signal, and the processor is further configured to perform color space conversion on the HLG signal to obtain a second non-linear RGB signal, convert the second non-linear RGB signal into a second linear RGB signal based on an HLG inverse OETF, perform calculation based on primary color signals of the second linear RGB signal to obtain a third linear luminance signal, and perform luminance signal type conversion on the third linear luminance signal to obtain the first linear luminance signal.

In a possible implementation, the processor is further configured to perform color space conversion on the RGB display signal to obtain a target display signal, where a color format of the target display signal is the same as a color format corresponding to a display device.

In a possible implementation, the processor is configured to add a BlackLevelLift to each color value of the RGB display signal to obtain a processed RGB display signal, where the BlackLevelLift is a minimum value of a display luminance of the display device, and correspondingly, the processor is further configured to perform color space conversion on the processed RGB display signal.

In a possible implementation, the processor is further configured to determine a first threshold and a second threshold, where the first threshold is less than the second threshold, when a luminance value of the first non-linear luminance signal is less than or equal to the first threshold, a luminance value of the second non-linear luminance signal is equal to the luminance value of the first non-linear luminance signal, when the luminance value of the first non-linear luminance signal is greater than the first threshold and is less than or equal to the second threshold, the luminance value of the second non-linear luminance signal is obtained based on a fitted curve that uses the luminance value of the first non-linear luminance signal as an independent variable, and when the luminance value of the first non-linear luminance signal is greater than the second threshold, the luminance value of the second non-linear luminance signal is equal to a maximum non-linear display luminance value corresponding to the display device.

In a possible implementation, the fitted curve is obtained by performing Hermite interpolation on the first threshold and the second threshold.

In a possible implementation, the fitted curve is stored in the memory.

In a possible implementation, the processor is further configured to perform the luminance mapping on the first non-linear luminance signal using the following piecewise function:

$$f_{tm}(e) = \begin{cases} e, & e \leq KP1 \\ hmt(e), & KP1 < e \leq KP2, \\ \max DL, & e > KP2 \end{cases}$$

$$hmt(x) = y_0 \times \alpha_0(x) + y_1 \times \alpha_1(x) + y'_0 \beta_0(x) + y'_1 \beta_1(x), \text{ and}$$

$$\begin{cases} \alpha_0(x) = \dfrac{(x_1 - 3x_0 + 2x)(x_1 - x)^2}{(x_1 - x_0)^3} \\ \alpha_1(x) = \dfrac{(3x_1 - x_0 + 2x)(x - x_0)^2}{(x_1 - x_0)^3} \\ \beta_0(x) = \dfrac{(x - x_0)(x - x_1)^2}{(x_1 - x_0)^2} \\ \beta_1(x) = \dfrac{(x - x_0)^2(x - x_1)}{(x_1 - x_0)^2} \end{cases},$$

where e is the first non-linear luminance signal, $f_{tm}(e)$ is the second non-linear luminance signal, KP1 is the first threshold, KP2 is the second threshold, maxDL is the maximum non-linear display luminance value of the display device, maxSL is a maximum non-linear source luminance value, and $x_0$=KP1, $x_1$=maxSL, $y_0$=KP1, $y_1$=maxDL, $y_0'$=1, and $y_1'$=0.

In a possible implementation, the piecewise function is stored in the memory.

In a possible implementation, the processor is further configured to determine the first threshold based on a relationship between a display luminance range of the first non-linear luminance signal and a display luminance range of the display device, and use a maximum luminance value of the first non-linear luminance signal as the second threshold.

In a possible implementation, the processor is further configured to determine, based on a preset luminance value mapping relationship between the first non-linear luminance signal and the second non-linear luminance signal, a luminance value of the second non-linear luminance signal corresponding to a luminance value of the first non-linear luminance signal. The mapping relationship is stored in the memory.

In a possible implementation, the processor is further configured to convert the first linear luminance signal into the first non-linear luminance signal based on a PQ inverse EOTF, and correspondingly, the processor is further configured to convert the second non-linear luminance signal into the second linear luminance signal based on the PQ EOTF.

A fourth aspect of this application provides a computer-readable storage medium. The computer-readable storage medium stores an instruction. When the instruction is run on a computer or a processor, the computer or the processor is enabled to perform the method according to any one of the first aspect or the possible implementations of the first aspect.

A fifth aspect of this application provides a computer program product including an instruction. When the computer program product is run on a computer or a processor, the computer or the processor is enabled to perform the method according to any one of the first aspect or the possible implementations of the first aspect.

It should be understood that technical means used in the second aspect to the fifth aspect and the possible implementations thereof in the embodiments of this application are similar to those used in the first aspect and the possible implementations of the first aspect in the embodiments of this application, and technical issues resolved in the second aspect to the fifth aspect and the possible implementations thereof are the same as those resolved in the first aspect and the possible implementations of the first aspect. For technical effects that can be achieved in the second aspect to the fifth aspect and the possible implementations thereof, refer to related descriptions of the first aspect in the embodiments of this application. Details are not described herein again.

DESCRIPTION OF EMBODIMENTS

Figure 1:
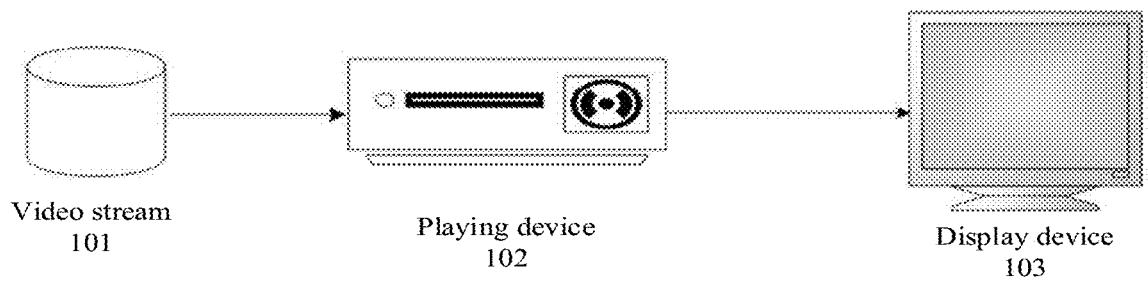
FIG. 1 is a schematic diagram of an example application scenario according to an embodiment of this application.

In the embodiments of the specification, claims, and accompanying drawings of this application, the terms "first", "second", and so on are intended to distinguish between similar objects but do not necessarily indicate a specific order or sequence. Moreover, the terms "include", "have", or any other variant thereof are intended to cover a non-exclusive inclusion. For example, a method, system, product, or device that includes a list of steps or units is not necessarily limited to those steps or units expressly listed, but may include other steps or units that are not expressly listed or inherent to such a process, method, product, or device.

It should be understood that in this application, "at least one (item)" means one or more, and "a plurality of" means two or more. The term "and/or" describes an association relationship for describing associated objects and represents that three relationships may exist. For example, "A and/or B" may represent the following three cases: only A exists, only B exists, and both A and B exist. A and B each may be in a singular or plural form. The character "/" generally indicates an "or" relationship between the associated objects. "The following at least one (item)" or a similar expression thereof means any combination of these items, including a singular (item) or any combination of a plural (items). For example, at least one (item) of a, b, or c may represent a, b, c, a and b, a and c, b and c, or a, b, and c, where a, b, and c each may be in a singular or plural form.

For ease of understanding the embodiments of this application, some concepts or terms in the embodiments of this application are first interpreted.

A color value is a value corresponding to a specific picture color component (for example, R, G, B, or Y).

A digital code value is a numerical expression value of an image signal, and the digital code value is used to indicate a non-linear color value.

Linear color value: A linear color value is in direct proportion to light intensity. In an optional case, the linear color value should be normalized into [0, 1] and is referred to as E for short.

Non-linear color value: A non-linear color value is a normalized numerical expression value of image information, and is in direct proportion to a digital code value. In an optional case, the non-linear color value should be normalized into [0, 1] and is referred to as E' for short.

An EOTF is a relationship of conversion from a non-linear color value into a linear color value.

An OETF is a relationship of conversion from a linear color value into a non-linear color value.

Metadata is data that describes video source information and that is carried in a video signal.

Dynamic metadata is metadata associated with each frame of image. The metadata varies with different pictures.

Static metadata is metadata associated with an image sequence. The metadata remains unchanged in the image sequence.

A luminance signal (luma) represents a combination of non-linear primary color signals, and its symbol is Y'.

Luminance mapping means mapping a luminance of a source image to a target system.

A color volume is a volume formed by a chroma and a luminance that can be presented by a display in color space.

Display adaptation means processing a video signal, to make the video signal adapt to a display characteristic of a target display.

A source image is an image that is input at an HDR pre-processing stage.

A mastering display is a reference display used during editing performed using a video signal, and is configured to determine an effect of video editing.

A linear scene light signal is an HDR video signal whose content is scene light in an HDR video technology. The scene light is scene light captured by a camera/camera lens sensor, and is usually a relative value. An HLG signal is obtained after HLG encoding is performed on the linear scene light signal. The HLG signal is a scene light signal, and the HLG signal is non-linear. The scene light signal usually needs to be converted into a display light signal using an optical-optical transfer (OOTF), and then the display light signal is displayed on a display device.

A linear display light signal is an HDR video signal that whose content is display light in the HDR video technology. The display light is display light emitted by a display device, and is usually an absolute value measured in nits. A PQ signal is obtained after PQ encoding is performed on the linear display light signal. The PQ signal is a display light signal, and the PQ signal is a non-linear signal. The display light signal is usually displayed on the display device based on an absolute luminance of the display light signal.

An OOTF curve is a curve used to convert an optical signal to another optical signal in the video technology.

A dynamic range is a ratio between a maximum luminance and a minimum luminance in a video signal.

Luminance-chroma-chroma (Luma-Chroma-Chroma) are three components of a Y/C separation video signal.

A PQ is an HDR standard and is also an HDR transfer equation. The PQ is determined based on a human visual capability. A video signal displayed on a display device is usually a video signal in a PQ encoding format.

A PQ EOTF curve is used to convert electrical signals obtained through PQ encoding into linear optical signals, and is measured in nits. A conversion formula is as follows:

$$\text{PQ\_EOTF}(E') = 10000\left(\frac{\max[(E'^{1/m_2} - c_1), 0]}{c_2 - c_3 E'^{1/m_2}}\right)^{1/m_1}. \quad (1)$$

E' represents an input electrical signal, and a value range of E is [0, 1]. Fixed parameter values are as follows:

$m_1 = 2610/16384 = 0.1593017578125$, $m_2 = 2523/4096 \times 128 = 78.84375$, $c_1 = 3424/4096 = 0.8359375 = c_3 - c_2 + 1$, $c_2 = 2413/4096 \times 32 = 18.8515625$, and $c_3 = 2392/4096 \times 32 = 18.6875$.

Figure 11:
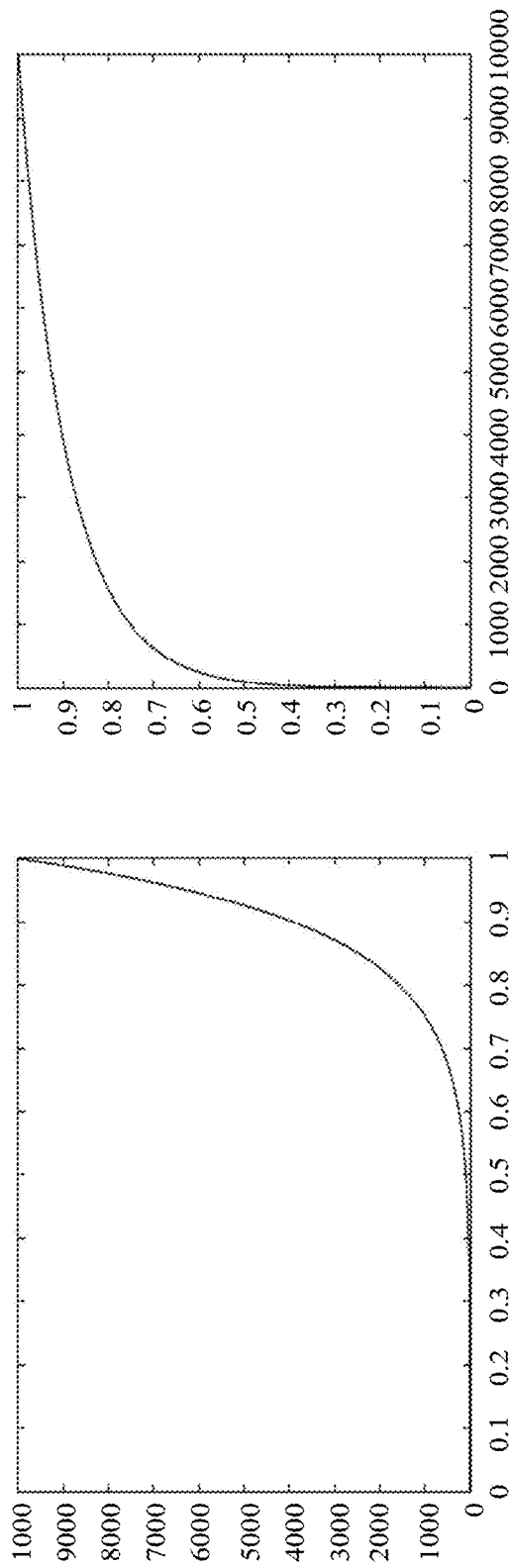
FIG. 11 shows an example PQ EOTF curve (figure on the left) and an example PQ $EOTF^{-1}$ curve (figure on the right) according to an embodiment of this application.

The PQ EOTF curve is shown in a left figure in FIG. 11: An input is the electrical signals in the range [0, 1], and an output is the linear optical signals in a range [0, 10000] nits.

A PQ EOTF$^{-1}$ curve is a PQ inverse EOTF curve, and its physical meaning is that the curve is used to convert linear optical signals in the range [0, 10000] nits into electrical signals obtained through PQ encoding. A conversion formula is as follows:

$$\text{PQ\_EOTF}^{-1}(E') = \left(\frac{c_1 + c_2(E/10000)^{m_1}}{1 + c_3(E/10000)^{m_1}}\right)^{m_2}. \quad (2)$$

The PQ EOTF$^{-1}$ curve is shown in a right figure in FIG. 11: An input is the linear optical signals in the range [0, 10000] nits, and an output is the electrical signals in the range [0, 1].

A color gamut is a color range included in color space, and related color gamut standards include BT.709 and BT.2020.

HLG is an HDR standard. A video signal collected by a camera, a video camera, an image sensor, or another type of image capture device is a video signal in an HLG encoding format.

An HLG OETF curve is a curve used to convert, through HLG encoding, linear scene light signals into non-linear electrical signals. A conversion formula is as follows:

$$E' = \begin{cases} \sqrt{3*E} & 0 \le E \le 1/12 \\ a*\ln(12*E - b) + c & 1/12 < E \le 1 \end{cases}. \quad (3)$$

E represents an input linear scene light signal, and a range of E is [0, 1]. E represents an output non-linear electrical signal, and a range of E is [0, 1].

Fixed parameters are a=0.17883277, b=0.28466892, and c=0.55991073. A left figure in FIG. 12 is an example diagram of the HLG OETF curve.

An HLG OETF$^{-1}$ curve is an HLG inverse OETF curve, and is used to convert non-linear electrical signals obtained through HLG encoding into linear scene light signals. For example, a conversion formula is as follows:

$$E = \begin{cases} E'^2/3, & 0 \le E' \le 1/2 \\ \left(\exp\left(\frac{(E'-c)}{a}\right) + b\right)/12, & 1/2 < E' \le 1 \end{cases}. \quad (4)$$

Figure 12:
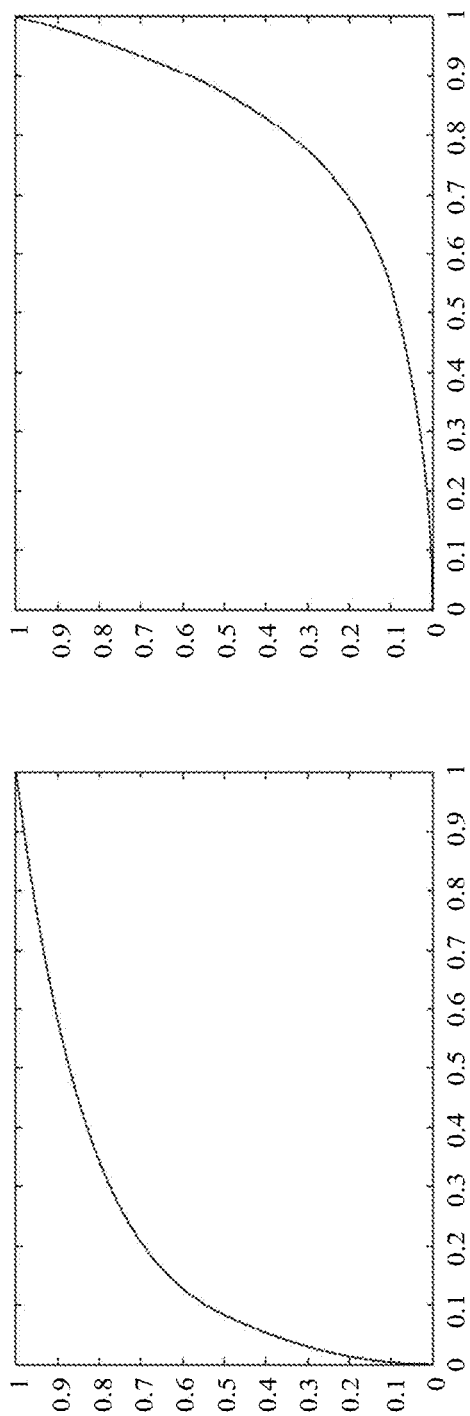
FIG. 12 shows an example HLG OETF curve (figure on the left) and an example HLG $OETF^{-1}$ curve (figure on the right) according to an embodiment of this application.

A right figure in FIG. 12 is an example diagram of the HLG OETF$^{-1}$ curve. E' represents an input non-linear electrical signal, and a range of E' is [0, 1]. E represents an output linear scene light signal, and a range of E is [0, 1].

Linear space: The linear space in this application is space in which a linear optical signal is located.

Non-linear space: The non-linear space in this application is space in which a signal obtained after a linear optical signal is converted using a non-linear curve is located. Non-linear curves commonly used for an HDR include a PQ EOTF$^{-1}$ curve, an HLG OETF curve, and the like. A non-linear curve commonly used for an SDR includes a gamma curve. It is generally considered that after encoding is performed on the linear optical signal using the non-linear curve, an encoded signal is visually linear to human eyes. It should be understood that the non-linear space may be considered as visually linear space.

Gamma correction: The Gamma correction is a method for performing non-linear tone editing on an image, and can be used to detect a deep color part and a light color part in an image signal and increase a proportion between the two parts, to improve a contrast ratio effect of the image. At present, all optical-electro transfer characteristics of a display screen, a camera film, and many electronic cameras may be non-linear. A relationship between outputs and inputs of these non-linear components may be expressed using a power function: output=(input)$^\gamma$.

Non-linear conversion is performed on a color value output by a device for the reason that a human visual system is non-linear and that humans perceive a visual stimulus through comparison. A stimulus is increasing uniformly from a perspective of humans only if the external world enhances the stimulus at a specific proportion. Therefore, in terms of human perception, values of a physical quantity that increase in a geometric progression are uniform. To display an input color according to a human visual law, non-linear conversion in a form of the foregoing power function needs to be performed, and a linear color value is converted into a non-linear color value. A value $\gamma$ of gamma may be determined using an optical-electro transfer curve of color space.

Color space: Colors may reflect different feelings of eyes for light rays at different frequencies, and may also indicate light at different frequencies that exists objectively. The color space is a color range defined by a coordinate system that is created by people to indicate colors. A color gamut and a color model jointly define color space. The color model is an abstract mathematical model that uses a group of color components to indicate colors. The color model may include, for example, an RGB color model and a printing cyan magenta yellow key (CMYK) mode. The color gamut means a full range of colors that can be generated by a system. For example, ADOBE RGB and Standard RGB (sRGB) are two types of different color space based on RBG models.

Each device such as a display or a printer has its own color space, and can generate colors only in a color gamut of the device. When an image migrates from a device to another device, because each device performs color conversion based on color space of the device and then displays an RGB or a CMYK, colors of the image may change on different devices.

The following describes several types of common color space.

sRGB color space is standard RGB color space that was developed by the HEWLETT PACKARD company and the MICROSOFT corporation in 1996 and that is used for a display, a printer, and an Internet. The sRGB color space provides a standard method for defining colors, to make various computer external devices that have displaying, printing, and scanning functions, and the like have a common language for colors with application software. The sRGB color space can make, based on independent color coordinates, colors correspond to a same color coordinate system during use and transmission performed by different devices, without being affected by different color coordinates of these devices. However, sRGB color gamut space is relatively small. The sRGB defines three primary colors, that is, red, green, and blue. When a color value of one color in the three primary colors takes its maximum value and color values of the other two colors are both 0, a corresponding color represents the one color. For example, in the three primary colors, that is, red, green, and blue, value ranges of color values R, G, and B are all 0-255. When values of R and G are both 0 and a value of B is 255, a corresponding color represents blue.

YCC color space is Y/C separation color space in this application. Three components of YCC respectively represent Luma-Chroma-Chroma. Common video signals in the YCC space include YUV, YCbCr, ICtCp, and the like.

It should be understood that conversion may be performed between different color space.

Reserved bit: "Reserved bits" in a bitstream mean that some syntactic units are reserved to extend this part in the future, and these bits should be ignored during decoding processing. For "reserved bits", more than 21 consecutive '0' should not appear starting from any byte alignment location.

A marker bit means that a value of the bit should be '1'.

A displayable luminance of an HDR video is relatively large. In an optional case, a maximum luminance of an SDR video signal is 100 nits and a maximum luminance of an HDR video signal is more than 1000 nits, but a luminance range that can be displayed by a large quantity of existing display devices cannot reach a luminance range of an HDR video. Therefore, during displaying of an HDR video signal, a luminance of the HDR video signal needs to be processed based on a display capability of a display device, to make the HDR video signal match a luminance range that can be displayed by the display device such that the HDR video signal is suitable for being displayed on the existing device. A PQ signal and an HLG signal that are defined in International Telecommunication Union (ITU) Broadcasting service (television) (BT).2100 are two types of internationally recognized HDR signal sources, and are incorporated into standards by many countries and regions.

FIG. 1 is a schematic diagram of an example application scenario according to an embodiment of this application. In this application scenario, a playing device 102 completes receiving and decoding of a video stream 101. The playing device 102 sends, through a High-Definition Multimedia Interface (HDMI), decoded video or audio data to a display device 103 for display or playing such that a user can view video or audio content.

For example, the video stream 101 may come from website streaming media, a remote network device, an Internet, an optical fiber network, or the like. The video stream 101 may be dynamic metadata HDR video data or static metadata HDR video data. For example, the video stream 101 may be a data stream in a transport stream (TS) format, and the TS may include a video stream, an audio stream, a caption data packet, and the like. The video stream may alternatively be a data stream in another similar format. For example, streaming media may be used to encapsulate all of audio data, video data, caption data, and the like using a Matroska Video File (MKV) format or an Audio Video Interleave (AVI) format similar to the MKV format. An audio/video stream transport format is not limited in this application. For example, the video stream may include HDR video data and metadata that is used to describe an HDR video. In this case, both the metadata and the HDR video data are compressed in the video stream. In another optional case, the TS may include a video stream, an audio stream, a caption data packet, and metadata that is used to describe an HDR video, in this case, the metadata that is used to describe HDR video data is placed in the TS, but is not compressed in the video stream. The metadata includes a description of video image data. For example, static metadata describes a production environment of an entire video, and may include related information of a mastering display used for video editing and color grading, a peak luminance, a black level, RGB trichromatic coordinates, white point coordinates, and the like. For example, dynamic metadata usually includes a description of each frame of content in a video image. For example, the dynamic metadata may include a maximum luminance, a minimum luminance, and an average luminance of an image. Optionally, the dynamic metadata may further include a reference mapping curve that is corresponding to a frame of image and a display screen. It should be understood that the reference mapping curve included in the dynamic metadata varies with a change of the video image.

Figure 3:
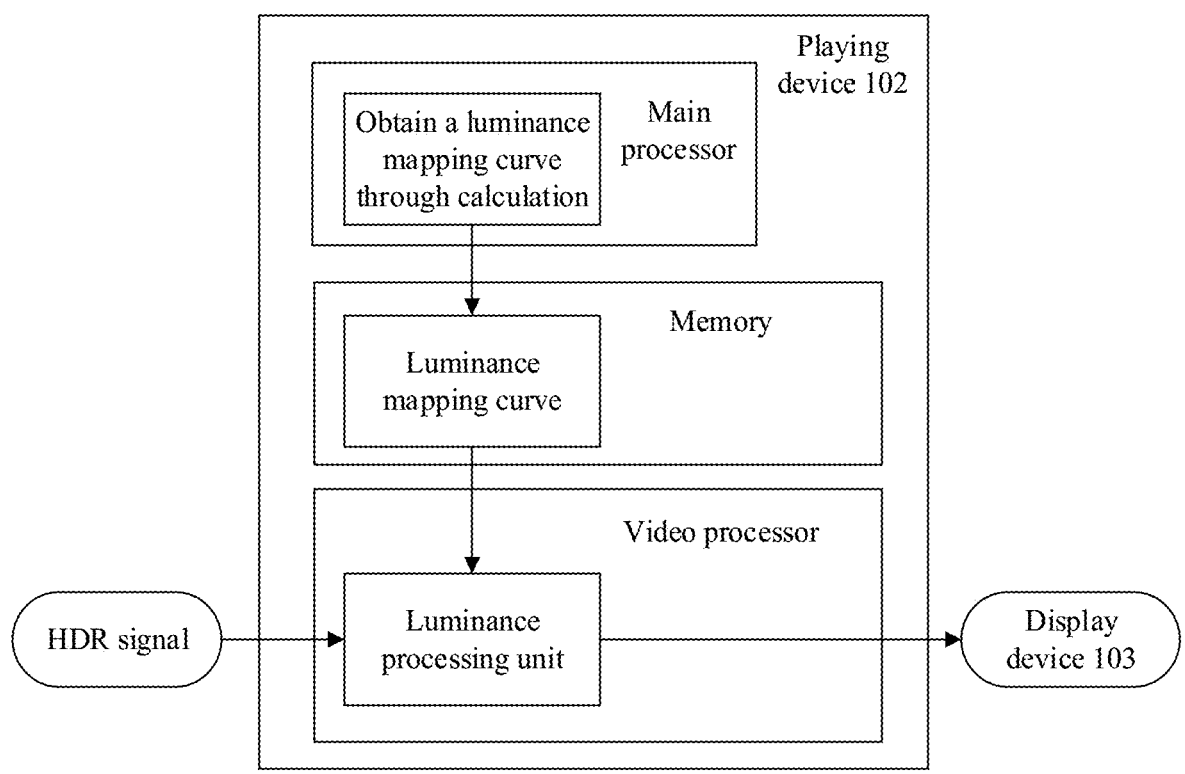
FIG. 3 is a schematic architectural diagram of another example application scenario according to an embodiment of this application.

In an optional solution, the playing device 102 may be a set top box (STB), a multimedia player, or the like. The STB mainly has many security functions such as plug-in card billing, video encryption and decryption, and the like. There is a digital rights protection mechanism for some videos of relatively high quality, and the videos can be watched on a TV side only after being decrypted on an STB side. Video data received on the STB side is usually encoded video data. The STB further has a decoding function, and the STB usually decodes the video data and then sends decoded video data to the TV side for display. FIG. 3 is a schematic architectural diagram of an application scenario in which a playing device completes processing of video data and sends processed video data to a display device for display according to an embodiment of this application. An STB parses a received TS to obtain video data, audio data, metadata, and the like. For example, the video data received by the STB may be an HDR HLG video signal, an HDR PQ video signal, or an SDR video signal. Then, the STB performs decoding, display luminance processing, color saturation processing, color gamut processing, and the like on the video data such that the HDR video signal adapts to a luminance range of a display screen, and the STB transmits processed video data to the display device 103 through a wired or wireless HDMI or display port transmission, or in another manner. Optionally, the video data obtained through processing performed by the playing device matches a luminance range that can be displayed by the display device, and a type of the processed video data is related to a type of the display device, and may be HDR video data or SDR video data. As shown in FIG. 3, obtaining of a luminance mapping curve through calculation is implemented by a main processor, and is usually completed using software, the luminance mapping curve that has been obtained through calculation in advance is stored in a memory, and a luminance processing unit in a video processor uses the luminance mapping curve in the memory to complete video picture processing. Optionally, the video processor may be dedicated integrated hardware, a dedicated circuit, or a plurality of software modules that are run on a dedicated chip. It should be understood that FIG. 3 is merely an example, and does not constitute any limitation on an architecture of the playing device. In actual application, implementation of the functional modules may be adjusted based on an actual application scenario. The functional modules may be implemented entirely using the video processor, may be implemented entirely using software of the main processor, or may be implemented using a combination of software and hardware, that is, another dedicated chip such as a digital signal processor (DSP) or a field-programmable gate array (FPGA).

Figure 2:
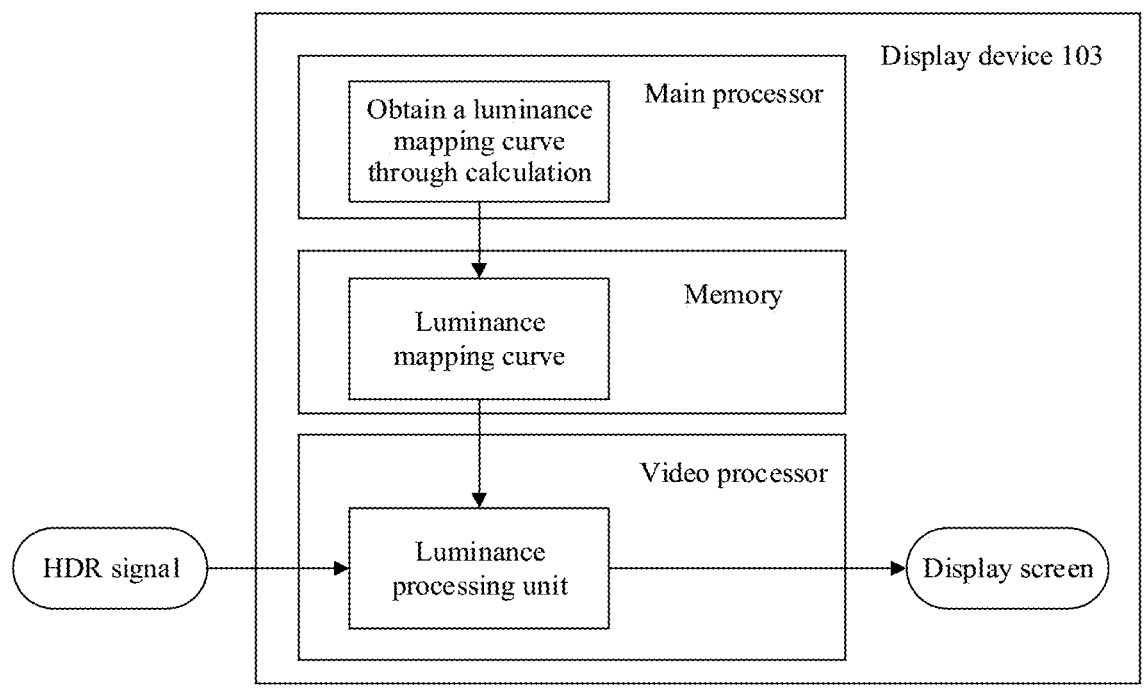
FIG. 2 is a schematic architectural diagram of an example application scenario according to an embodiment of this application.

In an optional case, a video stream including video data and the like may be directly transmitted to the display device 103 such as a television (TV), and then video decoding, luminance mapping processing, color saturation processing, color gamut processing, and the like are performed on the video data inside the display device. FIG. 2 is a schematic architectural diagram of an application scenario in which a display device completes processing of video data and displays processed video data according to an embodiment of this application. In an optional case, obtaining of a luminance mapping curve through calculation is implemented by a main processor, and is usually completed using a software instruction, the luminance mapping curve that has been obtained through calculation in advance is stored in a memory, and a luminance processing unit in a video processor uses the luminance mapping curve in the memory to complete video picture processing. It should be understood that in actual application, implementation of the functional modules may be adjusted based on an actual application scenario. The functional modules may be implemented entirely using the video processor, may be implemented entirely using software of the main processor, or may be implemented using a combination of software and hardware, that is, another dedicated chip such as a DSP or an FPGA.

For example, the display device 103 may be a TV, a computer display, or any fixed terminal or mobile terminal that has a display function. The TV performs display processing on the video data sent by the STB, and then displays processed video data on a screen. For example, display processing may be adjusting a video luminance by the TV based on a preset luminance mapping relationship, to make video content adapt to a display capability of the TV. In an optional case, when a video sent by the STB is an HDR video having dynamic metadata, and the TV is a TV having an HDR display function, the TV performs luminance mapping tone mapping processing on different video pictures based on a plurality of groups of luminance mapping relationships included in the dynamic metadata such that the different pictures can be displayed and presented in an optimal way. Optionally, the TV may alternatively be an SDR TV or an HDR PQ TV.

The following separately describes a playing device and a display device in the embodiments of this application from a perspective of processor hardware.

Figure 4:
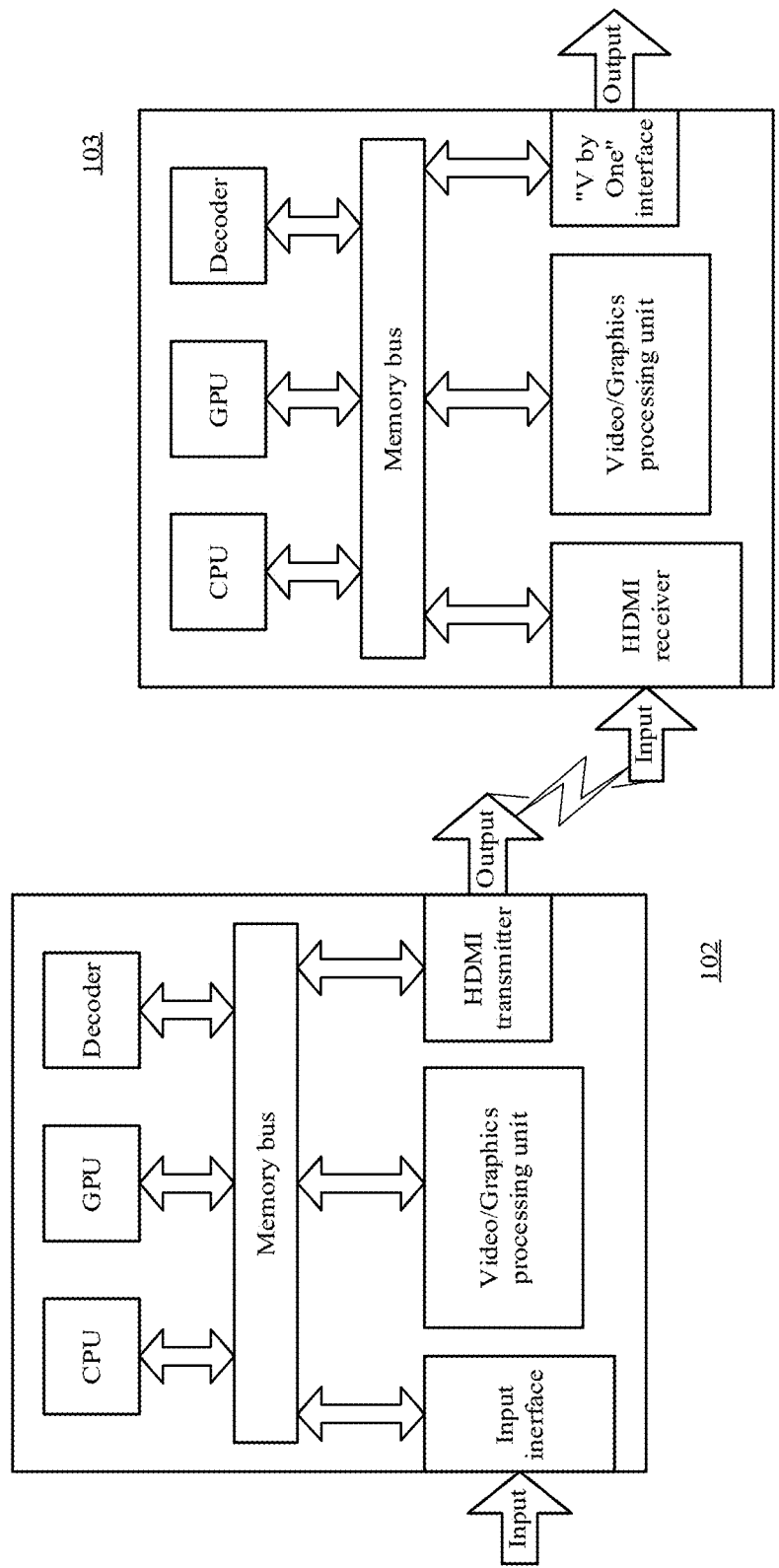
FIG. 4 is a schematic architectural diagram of hardware of an example playing device and display device according to an embodiment of this application.

FIG. 4 is a schematic architectural diagram of hardware of a playing device and a display device according to an embodiment of this application.

Optionally, the playing device 102 includes at least one central processing unit (CPU), at least one memory, a graphics processing unit (GPU), a decoder, a dedicated video/GPU, an input interface, an HDMI transmitter, and the like. Optionally, the playing device may further include a microprocessor, a microcontroller unit (MCU), and the like. In an optional case, the parts of the playing device are coupled to each other through a connector, where the connector may include various types of interfaces, transmission lines, buses, or the like. This is not limited in this embodiment. In an optional case, the parts are integrated into a same chip, and constitute a core chip of the playing device together. In another optional case, the CPU, the GPU, the decoder, the input interface, and the HDMI transmitter are integrated into a chip, and the parts inside the chip access an external memory using a bus. The dedicated video/GPU may be integrated with the CPU into a same chip, or may exist as an independent processor chip. The chip in this embodiment of this application is a system manufactured on a same semiconductor substrate using an integrated circuit technique, and is also referred to as a semiconductor chip. The chip may be a set of integrated circuits formed on the substrate (which is, for example, usually a silicon-type semiconductor material) using the integrated circuit technique, and an outer layer of the chip is usually packaged by a semiconductor packaging material. The integrated circuit may include various functional devices. Each functional device includes a logic gate circuit, a metal-oxide-semiconductor (MOS) transistor, a bipolar transistor, a diode, or another transistor, or may include a capacitor, a resistor, an inductor, or another component. Each functional device may work independently or work under action of necessary driver software, and can implement various functions such as communication, calculation, and storage.

The CPU may be used to implement all or some calculation in this embodiment of this application, for example, implement tone mapping for an image, demultiplexing and decoding of video data, obtaining of a tone-mapping curve through calculation, and obtaining of a color saturation curve through calculation. Optionally, the CPU may be a single-core processor (single-CPU) or a multi-core processor (multi-CPU). Optionally, the CPU may be a processor set including a plurality of processors, where the plurality of processors is coupled to each other through one or more buses. In an optional case, some image and video processing are completed by the GPU, and some image and video processing is completed by the dedicated video/GPU, or image and video processing may be completed using software code that is run on the CPU or the GPU.

The memory may be configured to store a computer program instruction, including a variety of computer program code that includes an operating system (OS), various user application programs, and program code used to perform the solutions of this application. For example, the memory may be configured to store a luminance mapping curve or a luminance mapping lookup table (LUT). The memory may further be configured to store video data, audio data, caption data, and the like. The CPU may be configured to execute the computer program code stored in the memory, to implement the methods in the embodiments of this application. The variety of executed program code may be considered as a driver of the CPU. Optionally, the memory 302 may be a non-power-off volatile memory, for example, an embedded MultiMediaCard (EMMC), Universal Flash Storage (UFS), a read-only memory (ROM), or another type of static storage device that can store static information and an instruction. Alternatively, the memory 302 may be a power-off volatile memory, for example, a random-access memory (RAM), another type of dynamic storage device that can store information and an instruction, an electrically erasable programmable ROM (EEPROM), a compact disc (CD) ROM (CD-ROM), other optical disk storage, optical disc storage (including a compact disc, a laser disc, an optical disc, a digital versatile disc (DVD), a BLU-RAY DISC, and the like), a magnetic disk storage medium, another magnetic storage device, or any other computer-readable storage medium that can be used to carry or store program code in a form of an instruction or a data structure and that can be accessed by a computer. However, no limitation is imposed thereto.

The input interface is configured to receive a transport stream. The input interface of the playing device may be a network interface, for example, a WI-FI interface or an Ethernet interface. The input interface may alternatively be a broadcast television port, for example, a tuner. The input interface may alternatively be a Universal Serial Bus (USB) interface.

In an optional case, the CPU executes related code to demultiplex the transport stream, to obtain the video data, the caption data, and the like. The decoder decodes the video data stream to obtain video data and metadata. The video/GPU completes luminance mapping processing, color saturation processing, color space conversion, color gamut processing, conversion between a scene light signal and a display light signal, conversion between linear space and non-linear space, and the like that are performed on the video data, and optionally may further complete obtaining of a luminance mapping curve and a saturation mapping curve through calculation. The HDMI transmitter separately encapsulates the decoded video data, the decoded metadata, and the caption data, and transmits an encapsulated data packet/information frame to the display device 103 through an HDMI data path.

Optionally, the display device 103 includes an HDMI receiver, at least one CPU, at least one memory, a GPU, a decoder, a dedicated video/GPU, a "V by One" interface, and the like. The display device further includes a display screen (not shown in the figure). Optionally, the "V by One" interface is coupled to the display screen. The "V by One" interface is a digital interface standard developed for image transmission. Optionally, the display device 103 shown in FIG. 4 may be an integrated display chip. The received video data is processed in the display chip, and then processed video data is sent to the display screen for display.

For specific descriptions of the CPU and the memory, refer to the descriptions of the CPU and the memory on the playing device side. Details are not described herein again. The HDMI transmitter separately transmits a video data frame, a metadata information frame, a caption information frame, and other information frames or data packets to the display device. It should be understood that there is a plurality of paths inside an HDMI, some paths are used for transmitting data information, and some other paths are used for transmitting control information such as a clock signal, a checksum signal, a power source signal, and a ground signal. In an optional case, time division multiplexing is performed for the data path, and various types of data packets cannot be transmitted simultaneously. A volume of data transmitted on the path in a given time period is limited by a working frequency, and a maximum volume of data that can be transmitted on the path in a given time period is equal to bandwidth of an HDMI path. For example, bandwidth of HDMI2.1 is 18 gigabits per second (Gbps). Optionally, a transmission interface transmits the HDR video data frame, the metadata information frame, and the caption information frame at different time. Optionally, the transmission interface is corresponding to a plurality of transmission frequency bands, and the transmission interface transmits the video data frame, the metadata frame, and the caption information frame at different frequency bands. Optionally, the transmission interface is corresponding to a plurality of transmission paths, and the transmission interface transmits the video data frame, the metadata frame, and the caption information frame on different paths. Tone mapping processing performed on the video data may be completed by the GPU, or may be completed by the dedicated video/GPU. Luminance mapping may be completed by the dedicated video/GPU, or may be completed using software code that is run on the CPU or the GPU. In an optional case, the video/GPU transmits, using the "V by One" interface, video data obtained after display luminance processing to the display screen for display.

For example, the display screen may be a liquid-crystal display (LCD), a light-emitting diode (LED) display, an organic LED (OLED) display screen, or a cathode-ray tube (CRT) display screen.

Figure 5:
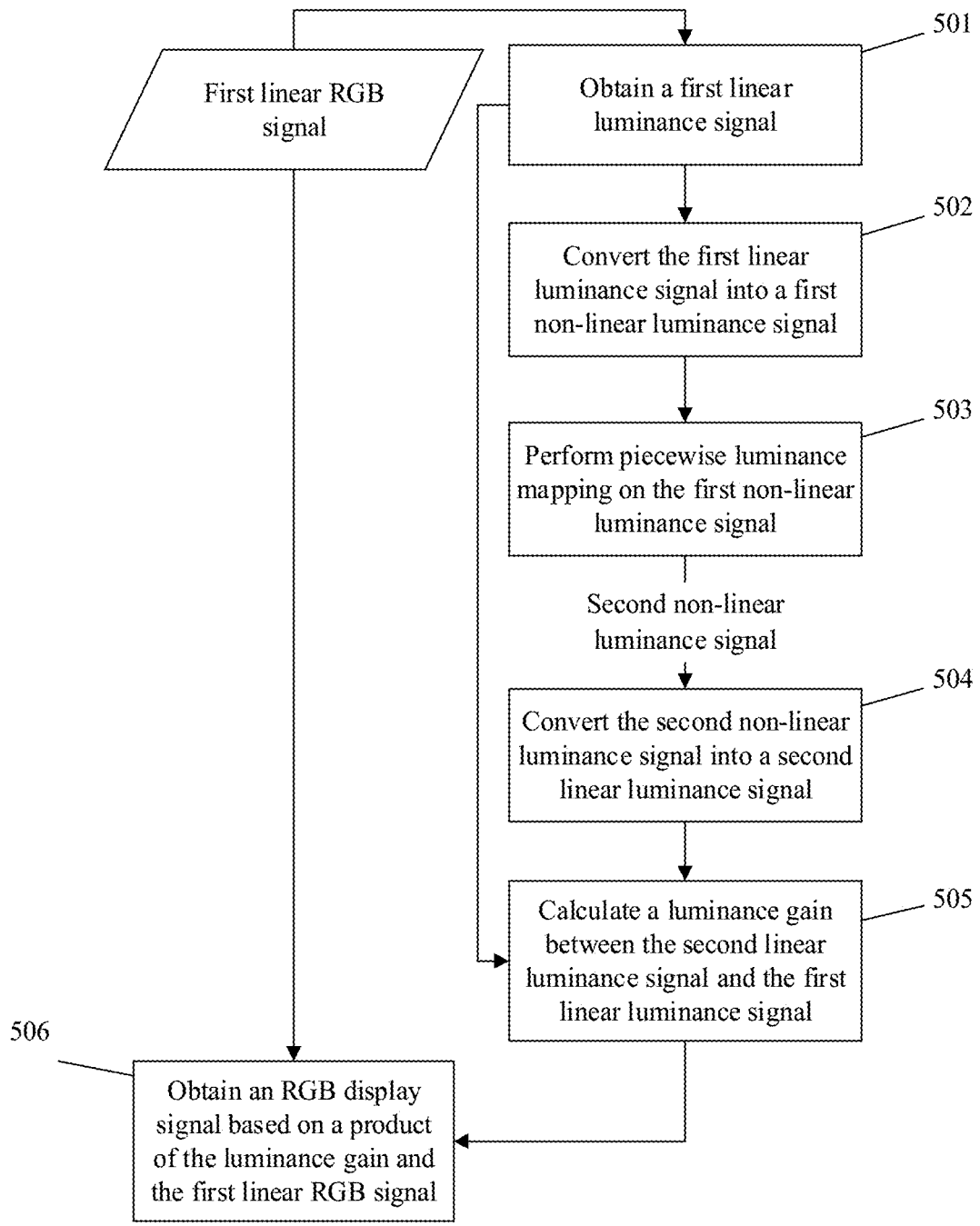
FIG. 5 is a flowchart of an example video signal processing method according to an embodiment of this application.

FIG. 5 is a flowchart of a video signal processing method according to an embodiment of this application. It should be understood that, for ease of description, FIG. 5 describes the method using steps. The method flowchart, that is, FIG. 5 shows a sequence of the method, but in some cases, the described steps can be performed in a sequence different from the sequence herein.

The video signal processing method includes the following steps.

501. Obtain a first linear luminance signal.

The first linear luminance signal is obtained based on a first linear RGB signal corresponding to a to-be-processed video signal. For example, the first linear RGB signal is a linear display light signal, and the first linear luminance signal is a linear display light luminance signal. It should be understood that the luminance signal is a luminance component of the to-be-processed video signal. In an optional case, the first linear luminance signal is calculated based on three primary color signals R, G, and B of the first linear RGB signal.

For example, the to-be-processed video signal may be a PQ signal, and the PQ signal may be a PQ signal in YUV space. Before the linear luminance signal is obtained, the PQ signal needs to be converted from the YUV space to RGB space, to obtain a first non-linear RGB signal. Optionally, the first non-linear RGB signal is converted into the first linear RGB signal based on a PQ EOTF, and calculation is performed based on primary color signals of the first linear RGB signal to obtain the first linear luminance signal. In this case, the first linear luminance signal is a display light luminance signal.

For example, the to-be-processed video signal may be an HLG signal, and the HLG signal may be an HLG signal in YUV space. Before the linear luminance signal is obtained, the HLG signal needs to be converted from the YUV space to RGB space, to obtain a second non-linear RGB signal. Optionally, the second non-linear RGB signal is converted into a second linear RGB signal based on an HLG inverse OETF, where the second linear RGB signal is a linear scene light signal, and calculation is performed based on primary color signals of the second linear RGB signal to obtain a third linear luminance signal. It should be understood that, because the HLG signal is a scene light signal, the obtained third linear luminance signal is a scene light luminance signal, luminance signal type conversion needs to be performed on the third linear luminance signal to obtain the first linear luminance signal. For example, the first linear luminance signal is a display light luminance signal.

502. Convert the first linear luminance signal into a first non-linear luminance signal.

Luminance mapping is performed in non-linear space in this embodiment of this application. That is, in this embodiment of this application, an input for luminance mapping is a linear luminance signal. Therefore, the linear luminance signal needs to be converted into a non-linear luminance signal.

For example, the first linear luminance signal may be converted into the first non-linear luminance signal based on a PQ inverse EOTF. Alternatively, conversion from the first linear luminance signal into the first non-linear luminance signal may be completed using another transfer function or transfer curve. The first non-linear luminance signal is a non-linear luminance signal before luminance mapping.

503. Perform piecewise luminance mapping on the first non-linear luminance signal to obtain a second non-linear luminance signal.

Optionally, the piecewise luminance mapping may be performed on the first non-linear luminance signal based on a preset luminance mapping lookup table. The luminance mapping LUT may be stored in a memory, the luminance mapping LUT includes several groups of discrete coordinate points, and a luminance value of a second non-linear luminance signal is correspondingly output after a luminance value of a first non-linear luminance signal is input. Optionally, mapping data in the luminance mapping LUT may be obtained by prior experiment.

Optionally, the piecewise luminance mapping may be performed on the first non-linear luminance signal using a piecewise function. In an optional case, the first non-linear luminance signal may be divided into three parts based on luminance values, where luminance mapping functions corresponding to the parts are different. For example, a first threshold and a second threshold are determined, where the first threshold is less than the second threshold, when a luminance value of the first non-linear luminance signal is less than or equal to the first threshold, a luminance value of the second non-linear luminance signal is equal to the luminance value of the first non-linear luminance signal, when the luminance value of the first non-linear luminance signal is greater than the first threshold and is less than or equal to the second threshold, the luminance value of the second non-linear luminance signal is obtained based on a fitted curve that uses the luminance value of the first non-linear luminance signal as an independent variable, and when the luminance value of the first non-linear luminance signal is greater than the second threshold, the luminance value of the second non-linear luminance signal is equal to a maximum non-linear display luminance value corresponding to a display device. In an optional case, the fitted curve is obtained by performing Hermite interpolation on the first threshold and the second threshold.

For example, the following describes several piecewise luminance mapping curves provided in an embodiment of this application.

Case 1: A luminance range before luminance mapping is 0-1000 nits, and a luminance range after the luminance mapping is 0-100 nits.

In this case, a piecewise luminance mapping curve may be expressed as the following piecewise function:

$$f_{tm}(e) = \begin{cases} e, & e \leq 0.2643 \\ hmt(e), & 0.2643 < e \leq 0.7518 \\ 0.508078, & e > 0.7518 \end{cases} \quad (5)$$

A function hmt( ) is defined as follows:

$$hmt(x) = 0.2643 \times \alpha_0(x) + 0.5081 \times \alpha_1(x) + \beta_0(x), \text{ and} \quad (6)$$

$$\begin{cases} \alpha_0(x) = \dfrac{(-0.0411 + 2x)(0.7518 - x)^2}{0.1159} \\ \alpha_1(x) = \dfrac{(1.9911 - 2x)(x - 0.2643)^2}{0.1159} \\ \beta_0(x) = \dfrac{(x - 0.2643)(x - 0.7518)^2}{0.2377} \end{cases} \quad (7)$$

Case 2: A luminance range before luminance mapping is 0-1000 nits, and a luminance range after the luminance mapping is 0-150 nits.

In this case, a piecewise luminance mapping curve may be expressed as the following piecewise function:

$$f_{tm}(e) = \begin{cases} e, & e \leq 0.3468 \\ hmt(e), & 0.3468 < e \leq 0.7518 \\ 0.549302, & e > 0.7518 \end{cases} \quad (8)$$

A function hmt( ) is defined as follows:

$$hmt(x) = 0.3468 \times \alpha_0(x) + 0.5493 \times \alpha_1(x) + \beta_0(x), \text{ and} \quad (9)$$

$$\begin{cases} \alpha_0(x) = \dfrac{(-0.2885 + 2x)(0.7518 - x)^2}{0.0665} \\ \alpha_1(x) = \dfrac{(1.9087 - 2x)(x - 0.3468)^2}{0.0665} \\ \beta_0(x) = \dfrac{(x - 0.3468)(x - 0.7518)^2}{0.1641} \end{cases} \quad (10)$$

Case 3: A luminance range before luminance mapping is 0-1000 nits, and a luminance range after the luminance mapping is 0-200 nits.

In this case, a piecewise luminance mapping curve may be expressed as the following piecewise function:

$$f_{tm}(e) = \begin{cases} e, & e \leq 0.4064 \\ hmt(e), & 0.4064 < e \leq 0.7518 \\ 0.579133, & e > 0.7518 \end{cases} \quad (11)$$

A function hmt( ) is defined as follows:

$$hmt(x) = 0.4064 \times \alpha_0(x) + 0.5791 \times \alpha_1(x) + \beta_0(x), \text{ and} \quad (12)$$

$$\begin{cases} \alpha_0(x) = \dfrac{(-0.4675 + 2x)(0.7518 - x)^2}{0.0412} \\ \alpha_1(x) = \dfrac{(1.849 - 2x)(x - 0.4064)^2}{0.0412} \\ \beta_0(x) = \dfrac{(x - 0.4064)(x - 0.7518)^2}{0.1193} \end{cases} \quad (13)$$

Case 4: A luminance range before luminance mapping is 0-1000 nits, and a luminance range after the luminance mapping is 0-250 nits.

In this case, a piecewise luminance mapping curve may be expressed as the following piecewise function:

$$f_{tm}(e) = \begin{cases} e, & e \leq 0.4533 \\ hmt(e), & 0.4533 < e \leq 0.7518 \\ 0.602559, & e > 0.7518 \end{cases} \quad (14)$$

A function hmt( ) is defined as follows:

$$hmt(x) = 0.4533 \times \alpha_0(x) + 0.6026 \times \alpha_1(x) + \beta_0(x), \text{ and} \quad (15)$$

$$\begin{cases} \alpha_0(x) = \dfrac{(-0.6080 + 2x)(0.7518 - x)^2}{0.0266} \\ \alpha_1(x) = \dfrac{(1.8022 - 2x)(x - 0.4533)^2}{0.0412} \\ \beta_0(x) = \dfrac{(x - 0.4533)(x - 0.7518)^2}{0.0891} \end{cases} \quad (16)$$

Case 5: A luminance range before luminance mapping is 0-1000 nits, and a luminance range after the luminance mapping is 0-300 nits.

In this case, a piecewise luminance mapping curve may be expressed as the following piecewise function:

$$f_{tm}(e) = \begin{cases} e, & e \leq 0.4919 \\ hmt(e), & 0.4919 < e \leq 0.7518 \\ 0.621863, & e > 0.7518 \end{cases} \quad (17)$$

A function hmt( ) is defined as follows:

$$hmt(x) = 0.4919 \times \alpha_0(x) + 0.6219 \times \alpha_1(x) + \beta_0(x), \text{ and} \quad (18)$$

$$\begin{cases} \alpha_0(x) = \dfrac{(-0.7239 + 2x)(0.7518 - x)^2}{0.0176} \\ \alpha_1(x) = \dfrac{(1.7636 - 2x)(x - 0.4919)^2}{0.0176} \\ \beta_0(x) = \dfrac{(x - 0.4533)(x - 0.7518)^2}{0.0676} \end{cases} \quad (19)$$

Case 6: A luminance range before luminance mapping is 0-1000 nits, and a luminance range after the luminance mapping is 0-350 nits.

In this case, a piecewise luminance mapping curve may be expressed as the following piecewise function:

$$f_{tm}(e) = \begin{cases} e, & e \leq 0.5247 \\ hmt(e), & 0.5247 < e \leq 0.7518 \\ 0.638285, & e > 0.7518 \end{cases} \quad (20)$$

A function hmt( ) is defined as follows:

$$hmt(x) = 0.5247 \times \alpha_0(x) + 0.6383 \times \alpha_1(x) + \beta_0(x), \text{ and} \quad (21)$$

$$\begin{cases} \alpha_0(x) = \dfrac{(-0.8224 + 2x)(0.7518 - x)^2}{0.0117} \\ \alpha_1(x) = \dfrac{(1.7307 - 2x)(x - 0.5247)^2}{0.0117} \\ \beta_0(x) = \dfrac{(x - 0.5247)(x - 0.7518)^2}{0.0516} \end{cases} \quad (22)$$

Case 7: A luminance range before luminance mapping is 0-1000 nits, and a luminance range after the luminance mapping is 0-400 nits.

In this case, a piecewise luminance mapping curve may be expressed as the following piecewise function:

$$f_{tm}(e) = \begin{cases} e, & e \le 0.5533 \\ hmt(e), & 0.5533 < e \le 0.7518 \\ 0.652579, & e > 0.7518 \end{cases} \quad (23)$$

A function hmt( ) is defined as follows:

$$hmt(x) = 0.5533 \times \alpha_0(x) + 0.6526 \times \alpha_1(x) + \beta_0(x), \text{ and} \quad (24)$$

$$\begin{cases} \alpha_0(x) = \dfrac{(-0.9082 + 2x)(0.7518 - x)^2}{0.0078} \\ \alpha_1(x) = \dfrac{(1.7022 - 2x)(x - 0.5533)^2}{0.0078} \\ \beta_0(x) = \dfrac{(x - 0.5533)(x - 0.7518)^2}{0.0394} \end{cases} \quad (25)$$

Optionally, the piecewise luminance mapping may be performed on the first non-linear luminance signal based on the luminance mapping curve. The luminance mapping curve may be a piecewise curve. It should be understood that the piecewise luminance mapping curve may be considered as a graphical representation of the piecewise function, and discrete data in the LUT may be coordinate points on the luminance mapping curve.

504. Convert the second non-linear luminance signal into a second linear luminance signal.

For example, the second non-linear luminance signal may be converted into the second linear luminance signal based on the PQ EOTF. Alternatively, conversion from the second non-linear luminance signal into the second linear luminance signal may be completed using another transfer function or transfer curve. The second non-linear luminance signal is a non-linear luminance signal after the luminance mapping.

505. Calculate a luminance gain between the second linear luminance signal and the first linear luminance signal.

For example, the luminance gain is a ratio of the second linear luminance signal to the first linear luminance signal.

506. Obtain, based on a product of the luminance gain and the first linear RGB signal, an RGB display signal corresponding to the to-be-processed video signal.

Further, the luminance gain is separately multiplied by the three primary color components R, G, and B of the first linear RGB signal to obtain the RGB display signal. Optionally, the RGB display signal may be used for display performed by the display device.

In an optional case, if a color format that can be displayed by the display device is different from the RGB, the method further includes performing color space conversion on the RGB display signal to obtain a target display signal, where a color format of the target display signal is the same as the color format corresponding to the display device.

In a possible implementation, after the RGB display signal is obtained, a BlackLevelLift is added to each of the primary color components R, G, and B of the RGB display signal, where the BlackLevelLift is a minimum value of a display luminance of the display device. Further, color space conversion is performed on the processed RGB display signal to obtain the target display signal whose color format is the same as the color format corresponding to the display device.

The following separately uses examples in which an input is an HDR PQ signal and an input is an HDR HLG signal for describing video signal processing methods provided in the embodiments of this application.

Figure 6:
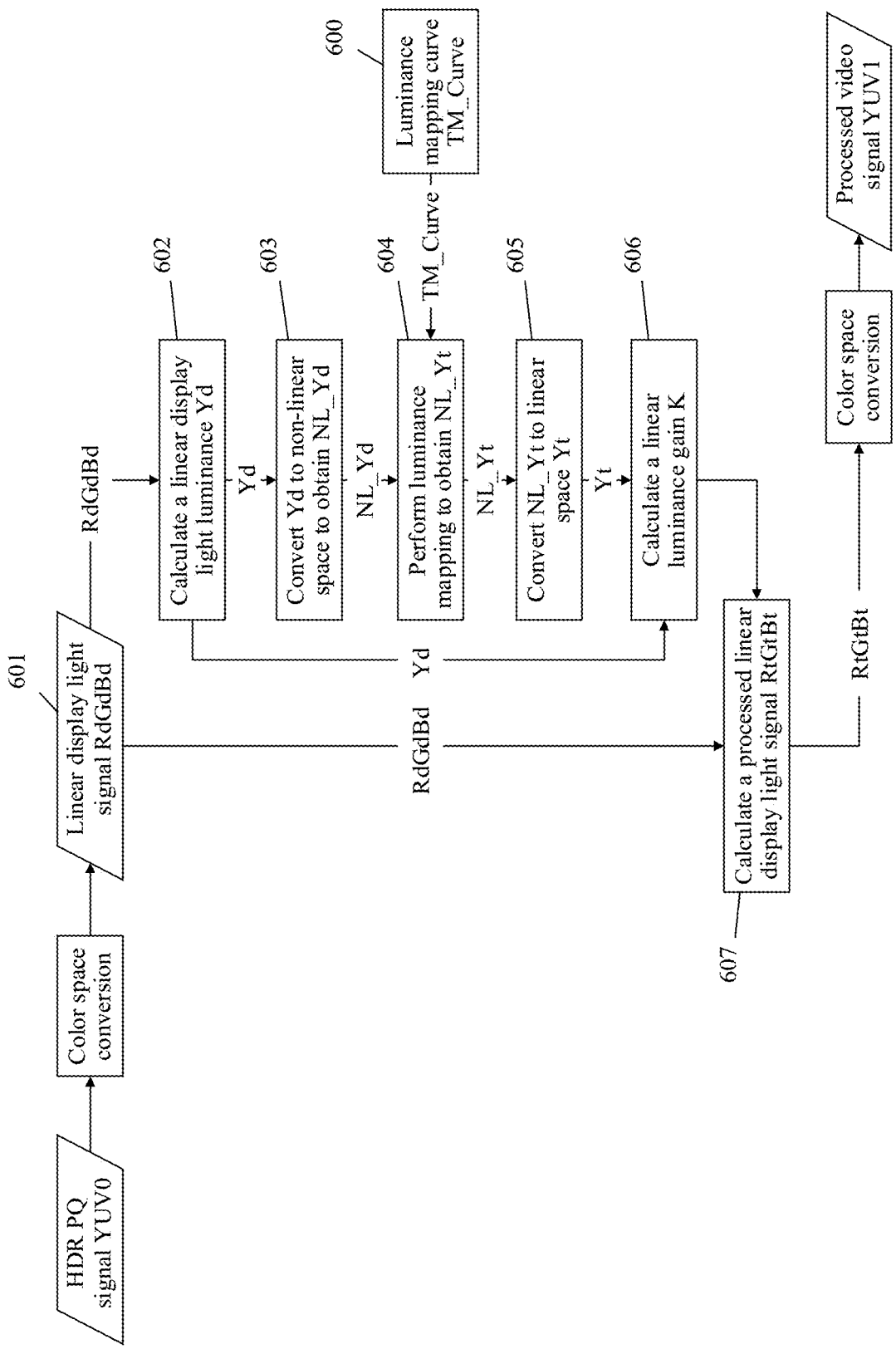
FIG. 6 is a flowchart of an example HDR video signal luminance processing method according to an embodiment of this application.

FIG. 6 is a schematic flowchart of an HDR video signal luminance processing method according to an embodiment of this application.

It should be understood that a linear scene light signal and a linear display light signal are two forms of video signals. The linear scene light signal is a video signal captured by a camera, another image capture device, or a video capture device, and the linear display light signal is a video signal displayed by a display device. A luminance signal is a component, in the video signal, that represents a luminance. A signal obtained based on the linear scene light signal is a linear scene light luminance signal, and a signal obtained based on the linear display light signal is a linear display light luminance signal. Further, the method includes the following steps.

600. Obtain a luminance mapping curve (TM_Curve) through calculation.

Figure 7:
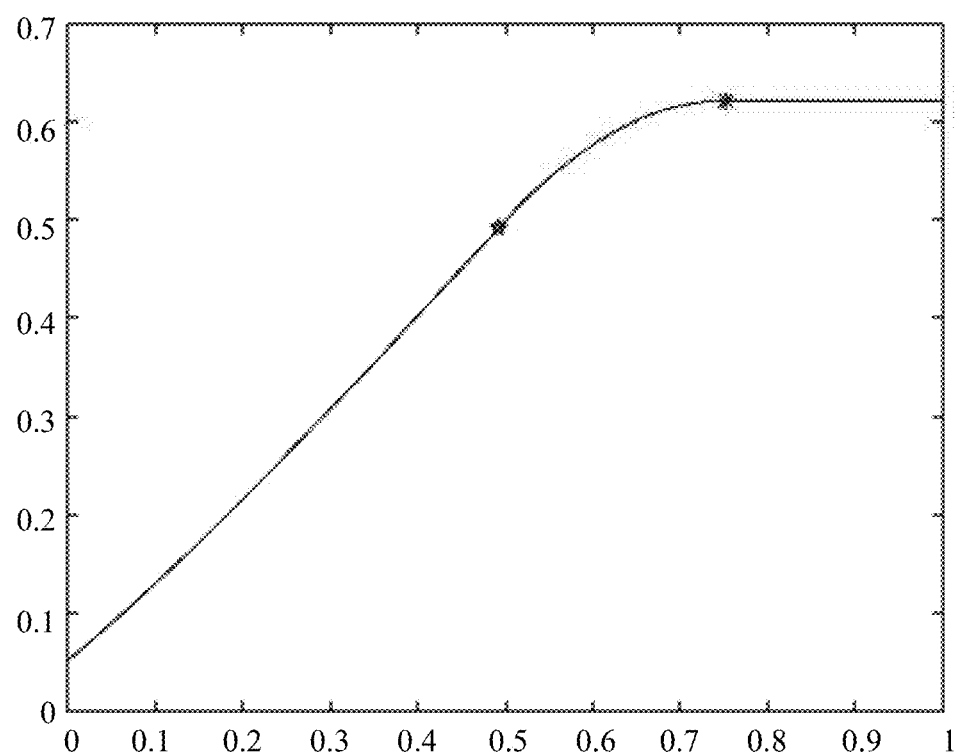
FIG. 7 is a schematic diagram of an example luminance mapping curve according to an embodiment of this application.

The luminance mapping curve may be any luminance mapping curve that acts on selected non-linear space. For example, the non-linear space in this embodiment of this application may be PQ curve space. FIG. 7 shows an example of a luminance mapping curve generated in non-linear space (a PQ $EOTF^{-1}$ curve). A horizontal axis of the luminance mapping curve represents non-uniform-encoding luminance signals before luminance mapping, and a vertical axis of the luminance mapping curve represents non-uniform-encoding luminance signals after the luminance mapping. For example, value ranges of both horizontal coordinates and vertical coordinates are [0, 1], and mean that after PQ curve encoding is performed on linear optical signals in a luminance range [0, 10000] nits, a range of obtained electrical signals is [0, 1] (as shown in the right figure in FIG. 11, after PQ curve encoding is performed on luminance signals in a luminance range 0-10000 nits, obtained electrical signals are within 0-1). That is, the horizontal coordinates indicate that a luminance range of luminance signals before the luminance mapping is [0, 10000] nits, and the vertical coordinates represent a luminance range of luminance signals after the luminance mapping. The curve shown in FIG. 7 indicates that luminance signals in a luminance range [0, 10000] nits are mapped onto a luminance range [0, 300] nits.

Optionally, the luminance mapping curve may be expressed as a luminance mapping curve formula, for example, $y=1-e^{-x}$, where x represents an input display luminance, and y represents an output display luminance. In an optional case, the luminance mapping curve is a piecewise function. For example, the luminance mapping curve formula may be as follows:

$$f_{tm}(e) = \begin{cases} e, & e \le 0.2643 \\ hmt(e), & 0.2643 < e \le 0.7518 \\ 0.5079133, & e > 0.7518 \end{cases} \quad (26)$$

A function hmt( ) is defined as follows:

$$hmt(x) = 0.2643 \times \alpha_0(x) + 0.5081 \times \alpha_1(x) + \beta_0(x), \text{ and} \qquad (27)$$

$$\begin{cases} \alpha_0(x) = \dfrac{(-0.0411 + 2x)(0.7518 - x)^2}{0.1159} \\ \alpha_1(x) = \dfrac{(1.9911 - 2x)(x - 0.2643)^2}{0.1159} \\ \beta_0(x) = \dfrac{(x - 0.2643)(x - 0.7518)^2}{0.2377} \end{cases} \qquad (28)$$

It should be understood that, according to the formula, an original luminance range 0-1000 nits is mapped onto a luminance range 0-100 nits.

In an optional case, a one-dimensional LUT is used to represent the luminance mapping curve. The one-dimensional LUT stores a specific quantity of discrete coordinate points TM_Curve={TM_Curve_x, TM_Curve_y}. These discrete coordinate points are sampling points on the luminance mapping curve. TM_Curve_x=(x0, x1, . . . , xn) represents horizontal coordinates of n sampling points, that is, an input of the luminance mapping curve, and indicates luminance signals before luminance mapping, TM_Curve_y=(y0, y1, . . . , yn) represents vertical coordinates of the n sampling points, that is, an output of the luminance mapping curve, and indicates luminance signals after the luminance mapping. It should be understood that, because mapping relationships in the LUT is a group of discrete points, if a point corresponding to an input luminance value is not in these discrete points, the input luminance value may be obtained based on known interpolated luminance values. In an optional case, input luminance values in a range are corresponding to a same output luminance value. For example, x0 to x3 are all corresponding to y0, and x4 to x6 are all corresponding to y1. These discrete coordinate points may be measured by prior experiment. For example, a luminance value is input, and a display luminance value corresponding to the input luminance value is measured on a display screen. In an optional case, a fitting function of a correspondence between an input luminance value and a luminance value displayed by the display screen may be obtained, and discrete coordinate points in the LUT may be calculated using the fitting function.

Figure 8A:
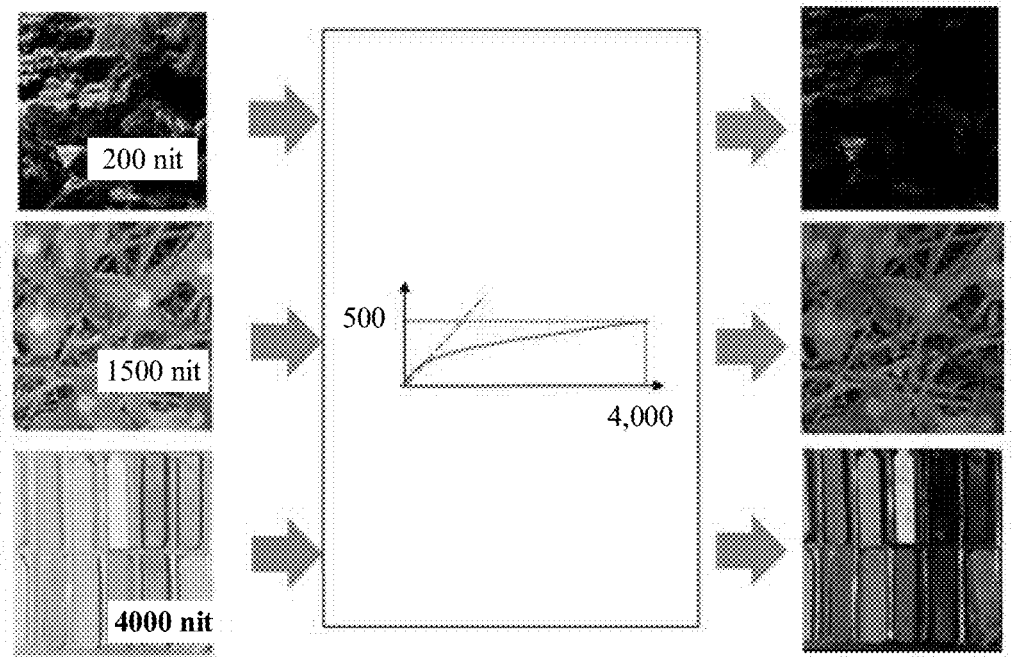
FIG. 8A is a schematic diagram of example static metadata HDR tone mapping according to an embodiment of this application.
Figure 8B:
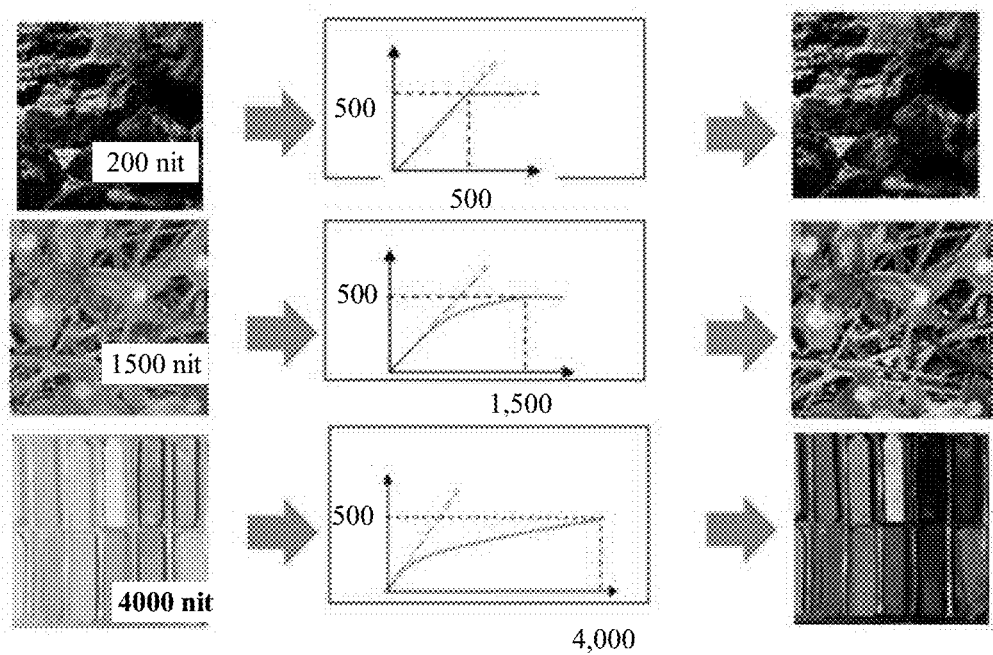
FIG. 8B is a schematic diagram of example dynamic metadata HDR tone mapping according to an embodiment of this application.

It should be understood that essence of luminance mapping is adjusting a display luminance range of a video image, to map a display luminance range onto another display luminance range. For example, the luminance range of the video image may be adjusted to a luminance range that can be displayed by the display screen. An input signal of the TM_Curve curve is a luminance signal before luminance mapping, and an output thereof is a luminance signal after the luminance mapping. For ease of understanding action of TM_Curve on the video image, the following provides schematic tone mapping diagrams of one TM_Curve included in a static metadata HDR and a group of TM_Curve included in a dynamic metadata HDR, as shown in FIG. 8A and FIG. 8B, respectively. It should be understood that tone mapping may be an implementation of luminance mapping, or that is, a tone mapping process may be equivalent to a luminance mapping process in a specific case.

For a static metadata HDR video, a fixed mapping method is used for processing all video images. As shown in FIG. 8A, the static metadata HDR video is corresponding to a fixed mapping curve, where an input luminance range for the mapping curve is 0-4000 nits, and an output luminance range for the mapping curve is 0-500 nits. A TV performs tone mapping processing on all three frames of images whose maximum luminances are respectively 200 nits, 1500 nits, and 4000 nits using the mapping curve, and displays processed images on a display. Because luminance ranges for the mapping curve are inconsistent with actual luminance ranges of the first two frames of images, most image details of the first two frames of images are lost, the entire video image is quite dark, and a display effect is relatively undesirable. A dynamic metadata HDR video is corresponding to a plurality of mapping curves. In a process of displaying video images, mapping curves used are adjusted based on actual luminances of the images. As shown FIG. 8B, three different mapping curves are provided. An input luminance range for a mapping curve 1 is 0-500 nits, and an output luminance range for the mapping curve 1 is 0-500 nits, an input luminance range for a mapping curve 2 is 0-1500 nits, and an output luminance range for the mapping curve 2 is 0-500 nits, and an input luminance range for a mapping curve 3 is 0-4000 nits, and an output luminance range for the mapping curve 3 is 0-500 nits. A TV selects, based on an actual luminance range of an image frame, an appropriate mapping curve for tone mapping processing such that all images corresponding to different luminances can be presented on the screen in an optimal way. For example, the mapping curve 2 is selected for performing luminance mapping on an image whose maximum luminance is 1500 nits, and therefore a processed image retains image details well. It should be understood that the input luminance for the foregoing mapping curve is a luminance of a video signal source, and the output luminance for the foregoing mapping curve is a luminance that can be actually displayed by the display device such as a TV. For an HDR video, a luminance range corresponding to a video signal generated in a specialized film and television production environment is usually larger than a luminance range that can be displayed by a consumer television. Tone mapping is a technique for mapping a luminance range of an input video signal onto a luminance range displayed by the display device and then matching the luminance ranges.

601. Calculate a linear display light signal RdGdBd.

For example, an input video signal in this embodiment of this application is an HDR PQ signal in YUV space. It should be understood that PQ encoding is performed on the linear display light signal to obtain a PQ signal. The PQ signal is a display light signal, and the PQ signal is a non-linear signal. The input video signal is converted from the YUV space to RGB space through color space conversion, to obtain a non-linear display light signal R'dG'dB'd in the RGB color space. Further, the non-linear display light signal R'dG'dB'd is converted into the linear display light signal RdGdBd. In an optional case, the non-linear display light signal R'dG'dB'd is converted into the linear display light signal RdGdBd using a PQ EOTF curve.

It should be understood that in this case, it is considered that conversion from the YUV into the RGB is color space conversion, but conversion from a non-linear RGB signal into a linear RGB signal does not involve color space conversion. That is, in this case, the non-linear RGB signal and the linear RGB signal belong to same RGB color space. A standard color space conversion process is used for color space conversion, where Rd, Gd, and Bd are in a range [0, 10000]. In an optional case, an HDR PQ signal in other YCC space may alternatively be processed.

It should be understood that in an optional case, alternatively, conversion of the input video signal from a YUV signal into the non-linear display light signal R'dG'dB'd may be considered as color space conversion, and conversion from the non-linear display light signal R'dG'dB'd into the linear display light signal RdGdBd may also be considered as color space conversion. In this case, the non-linear display light signal and the linear display light signal belong to different color space.

602. Calculate a linear display light luminance Yd.

The display light luminance Yd is calculated according to the following formula:

$$Yd=(cr \times Rd+cg \times Gd+cb \times Bd). \tag{29}$$

Yd is a linear luminance signal. The luminance signal is a component that represents a luminance of a display light signal, and the luminance signal may also be considered as a component that represents a luminance of a video signal. Selection of parameters cr, cg, and cb is related to a color gamut of the linear display light signal RdGdBd. When the color gamut of the display light signal RdGdBd is BT.2020, calculation parameters are cr=0.2627, cg=0.6780, and cb=0.0593. Different color gamuts of the linear display light signal are corresponding to different calculation parameters. Therefore, based on a color gamut of the display light signal, linear luminance calculation parameters corresponding to the color gamut need to be selected during luminance calculation.

603. Convert the display light luminance Yd to non-linear space to obtain NL_Yd.

Yd is a display light luminance in linear space. For example, the display light luminance Yd is converted to the non-linear space using a PQ EOTF$^{-1}$ curve, to obtain a non-linear display light luminance, that is, NL_Yd=PQ_EOTF$^{-1}$(Yd). This process is equivalent to performing PQ curve encoding on a linear display light luminance signal Yd in a luminance range 0-10000 nits to obtain an electrical signal within 0-1, where the electrical signal is the non-linear display light luminance NL_Yd in the non-linear space. Alternatively, another non-linear transfer curve may be used as the non-linear space transfer curve.

604. Perform luminance mapping on a non-linear display light luminance signal NL_Yd.

Mapping is performed on the non-linear display light luminance signal NL_Yd using the prestored luminance mapping curve TM_Curve, to obtain a non-linear luminance NL_Yt obtained after the mapping. It should be understood that, the luminance mapping curve TM_Curve herein may be TM_Curve in step 600, the non-linear display light luminance signal NL_Yd is a luminance signal before the luminance mapping, or that is, NL_Yd may be a non-linear display light luminance signal of a source image signal, and NL_Yt is a non-linear display light luminance signal after the luminance mapping, or that is, NL_Yt may be a luminance signal that adapts to a display capability of the display device, that is, a target luminance signal. For example, when the luminance mapping curve TM_Curve is represented using a calculation formula, a non-linear display light luminance signal NL_Yd is input, and a corresponding non-linear luminance NL_Yt after luminance mapping is obtained according to the calculation formula for the luminance mapping curve. In this embodiment, the one-dimensional LUT is chosen to implement the luminance mapping curve. For specific descriptions of the one-dimensional LUT, refer to the descriptions of the one-dimensional LUT in step 600. Optionally, in actual mapping, a linear interpolation method may be used, or another interpolation method may be used. Linear interpolation is an interpolation method specific to a one-dimensional LUT, and is used for performing value estimation based on two data points that are adjacent to and on the left and right sides of a to-be-interpolated point in a one-dimensional data sequence.

605. Convert, to linear space, the non-linear display light luminance signal NL_Yt obtained after the mapping, to obtain a linear display light luminance signal Yt.

In an optional case, the non-linear luminance NL_Yt obtained after the mapping is converted to the linear space using the PQ EOTF curve, to obtain the linear luminance Yt obtained after the mapping, that is, Yt=PQ EOTF(NL_Yt). To be specific, a non-linear electrical signal in a range [0, 1] is converted into a linear display light luminance signal in a range [0, 10000] nits. It should be understood that a curve other than the PQ EOTF curve may alternatively be used to convert NL_Yt into Yt.

606. Calculate a linear luminance gain K.

For example, a calculation formula of the linear luminance gain K is as follows:

$$K=Yt/Yd. \tag{30}$$

To be specific, K represents a ratio of the linear display light luminance signal Yt obtained after the luminance mapping to the linear display light luminance signal Yd before the luminance mapping, and may be used to measure a variation between display light luminances before and after the luminance mapping.

607. Calculate a processed linear display light signal as follows:

$$(Rt,Gt,Bt)=K \times (Rd,Gd,Bd)+(BLoffset,BLoffset,BLoffset). \tag{31}$$

Rt, Gt, and Bt are respectively a red component, a green component, and a blue component of the linear display light signal obtained after the luminance mapping processing, and BLoffset is a black level of the display device. Theoretically, when the screen displays black, a corresponding luminance should be 0. However, in actual application, when the screen displays black, a corresponding luminance value is not 0 but is a relatively small luminance value. That is, the black level is a minimum value of a luminance that can be displayed by the display device. In this step, BLoffset is a display luminance in the linear space. It should be understood that display devices may be corresponding to different BLoffset, and BLoffset may be obtained by performing measurement on the display devices.

After the processed linear display light signal RtGtBt is obtained, color space conversion is performed on the linear display light signal RtGtBt based on color space of an actual display device, and the signal RtGtBt is converted to the color space of the display device, to obtain a processed video signal that matches both a display luminance range and the color space of the display device. For example, if the color space of the display device is sRGB space, the signal RtGtBt may be directly displayed, and color space conversion does not need to be performed on the signal RtGtBt. If the color space of the display device is YUV, the signal RtGtBt is converted into a video signal YUV1 in the YUV space.

In this embodiment of this application, the luminance signal of the display light signal is converted to the non-linear space, luminance mapping is performed on the display luminance in the non-linear space such that the display luminance range of the HDR video signal can be appropriately mapped onto the luminance range that can be displayed by the display device. This improves a contrast ratio, a luminance, and a detail representation of a picture. Because luminance mapping is performed in the non-linear space, errors caused by luminance mapping are evenly distributed and have relatively small impact on an ultimate display effect of the video signal, and especially in a case of low-luminance displaying, display luminance distribution obtained after the mapping is appropriate and the displayed picture is not quite dark. In addition, in this embodiment of this application, impact of the black level of the display device on the luminance mapping curve is considered, and luminance details of a low luminance part are retained. Further, according to the HDR signal luminance processing method provided in this embodiment of this application, an HDR signal can be converted into an SDR signal. This improves compatibility of the SDR display device with HDR signals.

Figure 9:
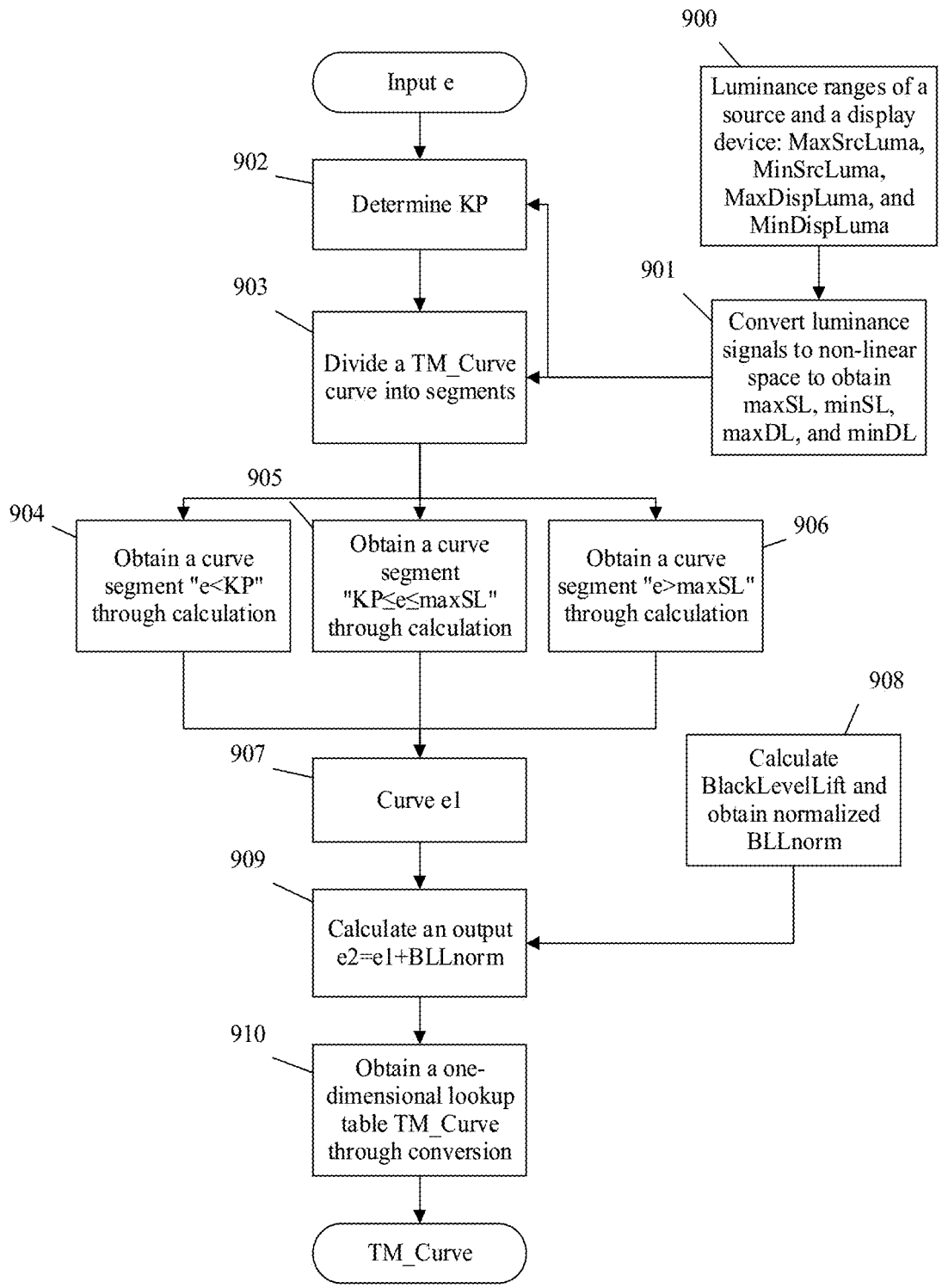
FIG. 9 is a flowchart of an example method for obtaining a luminance mapping curve according to an embodiment of this application.

FIG. 9 is a flowchart of a method for obtaining a luminance mapping curve TM_Curve through calculation according to an embodiment of this application. It should be understood that the method shown in FIG. 9 may be used for obtaining the luminance mapping curve TM_Curve in step 600 through calculation. The luminance mapping curve TM_Curve in step 600 may alternatively be obtained through calculation in another manner, and the method for obtaining TM_Curve is not limited to the method shown in FIG. 9.

Further, the method for obtaining the luminance mapping curve TM_Curve through calculation may include the following steps.

900. Obtain luminance ranges of a source and a display device.

A maximum luminance of the source is MaxSrcLuma, a minimum luminance of the source is MinSrcLuma, a maximum luminance of the display device is MaxDispLuma, and a minimum luminance of the display device is MinDispLuma, all of which are measured in nits. The maximum/minimum luminance of the source may be determined based on an actual case and experience, or may be obtained from metadata information carried in an HDR signal. For example, a maximum/minimum luminance of a mastering display is used as the maximum/minimum luminance of the source. The maximum/minimum luminance of the display device is obtained by performing measurement on an actual display device. Optionally, when a luminance value of the actual display device cannot be measured in a special application scenario, the luminance value may be set by experience.

901. Convert luminance signals of the source and the display device to non-linear space.

For example, a non-linear space PQ EOTF$^{-1}$ curve that is the same as that in step 603 may be selected to obtain a maximum non-linear source luminance maxSL, a minimum non-linear source luminance minSL, a maximum non-linear display luminance maxDL, and a minimum non-linear display luminance minDL in the non-linear space PQ space through calculation. The maximum/minimum luminances are as follows:

max$SL$=$PQ\_EOTF^{-1}$(MaxSrcLuma),
min$SL$=$PQ\_EOTF^{-1}$(MinSrcLuma), and max$DL$=$PQ\_EOTF^{-1}$(MaxDispLuma), and
min$DL$=$PQ\_EOTF^{-1}$(MinDispLuma).

It should be understood that step 901 may be considered as mapping of luminance signals in a luminance range [0, 10000] nits in linear space onto electrical signals in a range [0, 1].

902. Determine KP.

KP is a knee point of the luminance mapping curve, compression is not performed on a luminance whose luminance value is less than a luminance value corresponding to KP, and compression is performed on a luminance whose luminance value is greater than the luminance value corresponding to KP. For example, KP is selected from (minDL, maxDL), and a value of KP may be adjusted based on an actual effect. In an optional case, selection of KP is related to a difference between a source luminance and a display luminance of the display device. When the source luminance is lower than or equal to the display luminance, compression does not need to be performed on the source luminance, and in this case, KP=maxSL. When the source luminance is far higher than the display luminance and a luminance interval that needs to be compressed is relatively large, a relatively small value is selected as a value of KP. When the source luminance is higher than the display luminance and a difference between them is quite small, a relatively large value may be selected as the value of KP.

903. Divide the TM_Curve curve into segments.

The TM_Curve curve is divided into three segments based on KP and maxSL: e<KP, KP≤e≤maxSL, and e>maxSL. e is an input of the TM_Curve curve, and e=[0, 1] represents [0, 10000] nits on which PQ encoding is performed. That is, e represents the electrical signals, in a range [0, 1] in the non-linear space, that are obtained through conversion after PQ encoding is performed on the luminance signals in the luminance range 0-10000 nits.

904. Obtain a curve segment "e<KP" through calculation.

When e<KP holds true, e1 is equal to e.

905. Obtain a curve segment "KP≤e≤maxSL" through calculation.

When KP≤e≤maxSL holds true, e1 is equal to both Hermite interpolation(e) and hmt(e).

3rd degree Hermite polynomial is used for performing Hermite interpolation. It should be understood that another interpolation method may alternatively be used as the interpolation method. A Hermite interpolation formula is as follows:

$$hmt(x) = y_0 \times \alpha_0(x) + y_1 \times \alpha_1(x) + y'_0 \beta_0(x) + y'_1 \beta_1(x), \text{ and} \quad (32)$$

$$\begin{cases} \alpha_0(x) = \dfrac{(x_1 - 3x_0 + 2x)(x_1 - x)^2}{(x_1 - x_0)^3} \\ \alpha_1(x) = \dfrac{(3x_1 - x_0 - 2x)(x - x_0)^2}{(x_1 - x_0)^3} \\ \beta_0(x) = \dfrac{(x - x_0)(x - x_1)^2}{(x_1 - x_0)^2} \\ \beta_1(x) = \dfrac{(x - x_0)^2(x - x_1)}{(x_1 - x_0)^2} \end{cases} \quad (33)$$

x is an independent variable, and other parameter values are: x0=KP, x1=maxSL, y0=KP, y1=maxDL, y0'=1, and y1'=0.

y0=x0 indicates that compression is not performed on the luminance value less than a luminance value corresponding to a first knee point, and linear mapping is performed, x1=maxSL and y1=maxDL indicate that a maximum source luminance is mapped onto a maximum screen luminance maxDL, and when x0=KP and y0'=1, it is ensured that a slope of the curve at the knee point KP is 1, and when x1=maxSL and y1'=0, it is ensured that a slope of the curve at a knee point maxSL is 0. In this way, it can be ensured that the second curve segment obtained through fitting is smooth at the two knee points.

906. Obtain a curve segment "e>maxSL" through calculation.

When e>maxSL holds true, e1 is equal to maxDL.

907. Obtain a luminance mapping curve e1.

The curve e1 is obtained according to steps 904, 905, and 906.

908. Calculate BlackLevelLift.

Because the display device has a minimum luminance, even if a black signal is provided for the display device, the minimum luminance value is still displayed on the display device. The minimum luminance is referred to as a black level. In this case, a specific BlackLevelLift needs to be performed on the display luminance, where BlackLevelLift is referred to as BLL for short, to retain a luminance part whose luminance is lower than the black level. In this embodiment, a value of the BlackLevelLift (BLL) is calculated based on the input e of the luminance mapping curve TM_Curve as follows:

$$BLL = minDLx(1-e)^n \quad (34)$$

n is greater than or equal to 1. For example, n=5 is selected in this embodiment of this application.

It should be understood that the BLL herein is a non-linear space luminance value, and BLoffset in step 607 is a linear space luminance value. To ensure that a minimum source luminance can be mapped onto a minimum screen luminance for the luminance mapping curve TM_Curve and that the BLL affects TM_Curve slightly, BLL needs to be normalized, to obtain a normalized BLL (BLLnorm). A normalized result is as follows:

$$BLLnorm = MAX((BLL - norm\_y1)/(norm\_y0 - norm\_y1) \times (minDL - maxSL), 0), \quad (35)$$

where norm_x0=minSL, norm_y0=minDLx(1−minSL)^n, norm_x1=KP, and norm_y1=minDLx(1−KP)^n.

909. Obtain an output luminance mapping curve e2 through calculation.

The output luminance mapping curve TM_Curve is e2=e1+BLLnorm, where BLLnorm is a normalized luminance value lift caused by the black level.

910. Obtain a one-dimensional LUT TM_Curve through conversion.

In this embodiment, to ensure generality of the luminance mapping curve, a one-dimensional lookup is used to represent TM_Curve. In this case, n sampling points {(x0, y0), (x1, y1), . . . , (xn, yn)} are selected from the mapping curve e2 to obtain the one-dimensional LUT through conversion, that is, TM_Curve={TM_Curve_x, TM_Curve_y}.

TM_Curve_x=(x0, x1, xn) represents horizontal coordinates of the n sampling points, that is, an input of the curve, and indicates luminance signals before luminance mapping.

TM_Curve_y=(y0, y1, yn) represents vertical coordinates of the n sampling points, that is, an output of the curve, and indicates luminance signals after the luminance mapping.

In actual application, the mapping curve TM_Curve may be represented in another manner (for example, through formulation) depending on a requirement. For details, refer to the descriptions of TM_Curve in step 600.

In an optional manner, an input luminance is first normalized based on the luminance range (minSL, maxSL) of the source signal, then, the normalized input luminance is mapped onto a normalized output luminance, and finally, the normalized output luminance is denormalized based on the luminance range (minDL, maxDL) of the display device, to obtain an ultimate output luminance. A luminance mapping curve in this case is a relative-value mapping curve, where an input [0, 1] of the mapping curve represents [minSL, maxSL], and an output [0, 1] of the mapping curve represents [minDL, maxDL]. In contrast, in this embodiment of this application, for the luminance mapping curve, an output luminance is calculated directly based on an input luminance, and therefore the luminance mapping curve in this case is an absolute-value mapping curve, where an input [0, 1] of the mapping curve represents [0, 10000] nits, and an output [0, 1] of the mapping curve represents [0, 10000] nits.

In this embodiment of this application, two thresholds are selected for dividing a conventional luminance mapping curve into three parts. A low luminance part (that is, a luminance part whose luminance value is less than or equal to a first threshold) is not compressed, and a high luminance part (that is, a luminance part whose luminance value is greater than the first threshold) is compressed. Then, the high luminance part is further divided into two parts. Flexible compression is performed on a luminance part whose luminance value is greater than the first threshold and is less than or equal to a second threshold using a curve, to retain luminance details of the part as much as possible, where the curve is obtained through fitting based on the first threshold and the second threshold. Second compression is performed on a part whose luminance value is greater than a luminance value corresponding to the second luminance knee point, that is, a luminance higher than the second threshold is mapped onto the second threshold. During piecewise luminance mapping, characteristics of luminances are fully considered, and luminance details are retained as much as possible, thereby improving appropriateness of luminance mapping. In addition, for the luminance mapping curve, impact of the black level of the display device on the luminance mapping curve is considered, and luminance details of the low luminance part are retained.

Figure 10:
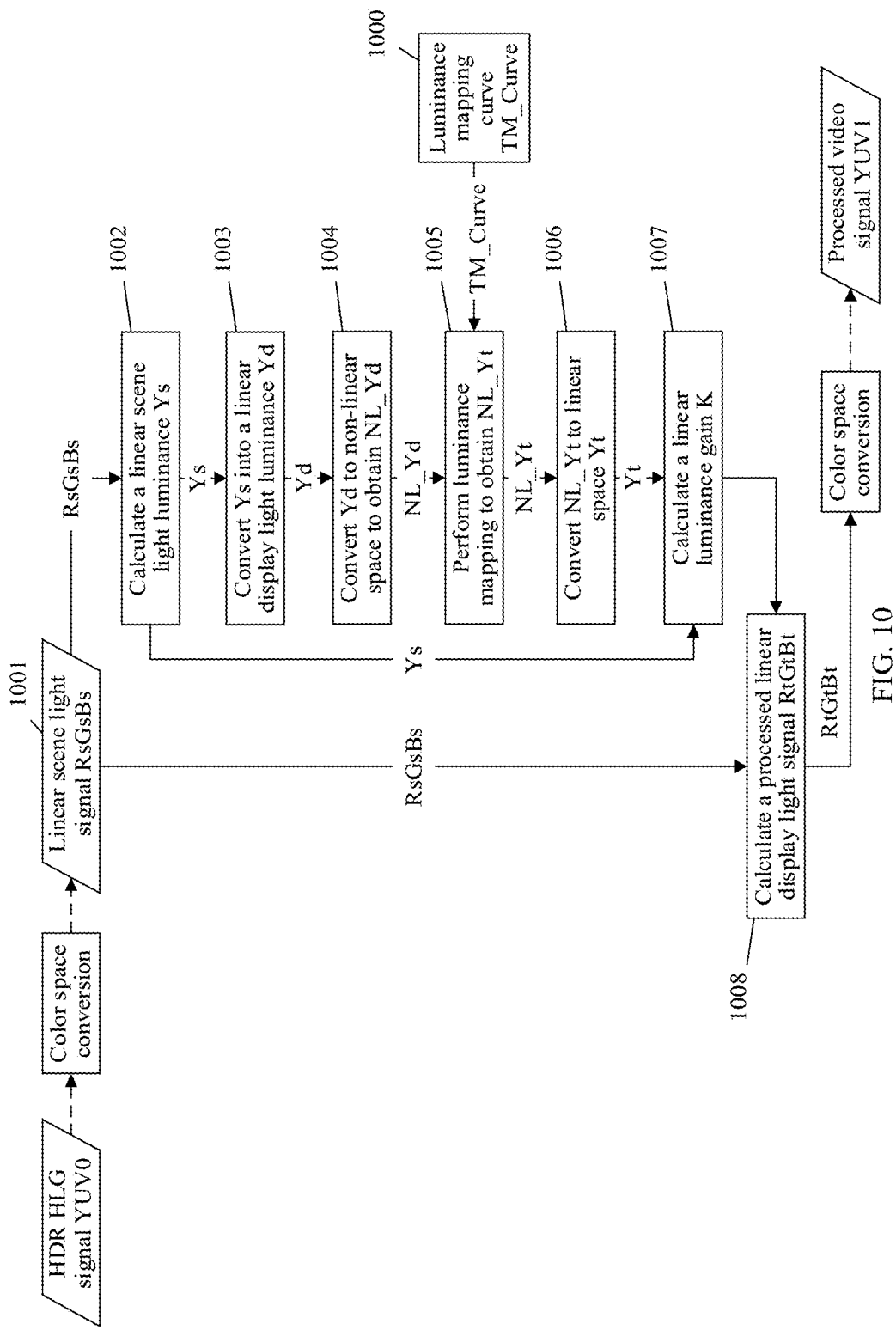
FIG. 10 is a flowchart of another example HDR signal luminance processing method according to an embodiment of this application.

FIG. 10 is a flowchart of another HDR video signal luminance processing method according to an embodiment of this application.

For example, an input source video signal in this embodiment of this application is a scene light signal, that is, an HDR HLG signal.

The method may include the following steps.

1000. Obtain a luminance mapping curve TM_Curve through calculation.

This step is the same as step 600. For details, refer to the descriptions of step 600. The luminance mapping curve may be the luminance mapping curve obtained through calculation using the method shown in FIG. 9, or a luminance mapping curve obtained using another method. This is not limited in this embodiment of this application. For example, during obtaining of the luminance mapping curve through calculation using the method shown in FIG. 9, it may be specified that MaxSrcLuma=$L_W$ and MinSrcLuma=0, where $L_W$ is a maximum display luminance corresponding to a display signal into which the HLG scene light signal is converted.

1001. Calculate a linear scene light signal RsGsBs.

For example, the input video signal in this embodiment of this application is an HDR HLG signal YUV0 in YUV space, and color space conversion is performed on YUV0 to obtain a non-linear scene light signal R'sG'sB's in RGB color space. Further, the non-linear scene light signal R'sG'sB's is converted into a linear scene light signal RsGsBs. In an optional case, the non-linear scene light signal R'sG'sB's is converted into the linear scene light signal RsGsBs using an HLG OETF$^{-1}$ curve. A standard color space conversion process is used for color space conversion, where Rs, Gs, and Bs are in a range [0, 1]. In an optional case, an HDR HLG signal in other YCC space may alternatively be processed.

It should be understood that in this case, it is considered that conversion from the YUV into the RGB is color space conversion, but conversion from a non-linear RGB signal into a linear RGB signal does not involve color space conversion. That is, in this case, the non-linear RGB signal and the linear RGB signal belong to same RGB color space.

It should be understood that in an optional case, alternatively, conversion of the input video signal from a YUV signal into the non-linear scene light signal R'sG'sB's may be considered as color space conversion, and conversion from the non-linear scene light signal R'sG'sB's into the linear scene light signal RsGsBs may also be considered as color space conversion. In this case, a non-linear scene light signal and a linear scene light signal belong to different color space.

1002. Calculate a scene light luminance Ys.

The scene light luminance Ys is calculated according to the following formula:

$$Ys = cr \times Rs + cg \times Gs + cb \times Bs. \quad (36)$$

Ys is a linear scene light luminance signal. The scene light luminance signal is a component that represents a luminance of a scene light signal. Selection of parameters cr, cg, and cb is related to a color gamut of the linear scene light signal RsGsBs. When the color gamut of the linear scene light signal RsGsBs is BT.2020, calculation parameters are cr=0.2627, cg=0.6780, and cb=0.0593. Different color gamuts of the linear scene light signal are corresponding to different calculation parameters. Therefore, based on a color gamut of the light signal, linear luminance calculation parameters corresponding to the color gamut need to be selected during luminance calculation. A range of the calculated scene light luminance is Ys=[0, 1].

In an optional case, the HLG linear scene light signal is converted, using the HLG OOTF defined in ITU BT.2100, into a linear display light signal for display. According to the method, parameters related to a "system gamma" are calculated based on a maximum luminance and a minimum luminance of an actual display device, and then the linear scene light signal is converted into the linear display light signal in a dynamic range of the display device.

The HLG OOTF is defined as follows:

$$R_D = \alpha Y_S^{\gamma-1} R_S + \beta$$

$$G_D = \alpha Y_S^{\gamma-1} G_S + \beta.$$

$$B_D = \alpha Y_S^{\gamma-1} B_S + \beta \quad (37)$$

The linear scene light signal RsGsBs is converted into the linear display light signal $R_D G_D B_D$ according to the foregoing formula, where Ys is the linear scene light luminance, α, β, and γ are calculation parameters. Calculation is performed as follows:

$$Y_S = 0.2627 R_S + 0.6780 G_S + 0.0593 B_S$$

$$\alpha = (L_W - L_B), \text{ and} \quad (38)$$

$$\beta = L_R$$

$$\gamma = 1.2 + 0.42 \, \text{Log}_{10}(L_W/1000). \quad (39)$$

$L_W$ and $L_B$ are the maximum luminance and the minimum luminance of the display device, respectively.

In an optional case, the scene light luminance $Y_S$ is converted into a display luminance after being obtained, and luminance mapping processing is performed on the display luminance, or that is, tone mapping processing is performed on the display luminance.

1003. Convert the scene light luminance into the linear display luminance Yd.

It should be understood that the luminance signal obtained based on the scene light signal is a scene light luminance signal, and the scene light luminance signal needs to be converted into a display light luminance signal. This step is an example implementation of luminance signal type conversion in which the linear scene light luminance Ys is converted into the linear display luminance Yd using the system gamma. Calculation is performed as follows:

$$Yd = (Ys^\gamma) \times L_W. \quad (40)$$

where $\gamma = 1.2 + 0.42 \, \text{Log}_{10}(L_W/1000)$.

For example, the maximum luminance of the display signal is set to $L_W$=1000 nits in this embodiment of this application. $L_W$ may alternatively be set to another value.

Converting the scene light luminance into the display luminance improves compatibility of processing a scene signal and a display signal.

1004. Convert the display luminance Yd to non-linear space to obtain NL_Yd.

This step is the same as step 603. For details, refer to the descriptions of step 603. Details are not described herein again.

1005. Perform luminance mapping on a non-linear display light luminance signal NL_Yd.

This step is the same as step 604. For details, refer to the descriptions of step 604. Details are not described herein again.

1006. Convert, to linear space, the non-linear display light luminance signal NL_Yt obtained after the mapping, to obtain a linear display light luminance signal Yt.

This step is the same as step 605. For details, refer to the descriptions of step 605. Details are not described herein again.

1007. Calculate a linear luminance gain K.

For example, K=Yt/Ys holds true. To be specific, K represents a ratio of the luminance signal Yt that is obtained after the luminance mapping and that is in the linear space to the scene light luminance signal Ys before the luminance mapping.

1008. Calculate a processed linear display light signal as follows:

$$(Rt, Gt, Bt) = K \times (Rs, Gs, Bs) + (BL\text{offset}, BL\text{offset}, BL\text{offset}). \quad (41)$$

Rt, Gt, and Bt are respectively a red component, a green component, and a blue component of the linear display light signal obtained after the luminance mapping processing, and BLoffset is a black level of the display device. For details, refer to the descriptions of step 607.

After the processed linear display light signal RtGtBt is obtained, color space conversion is performed on the linear display light signal RtGtBt based on color space of an actual display device, and the signal RtGtBt is converted to the color space of the display device, to obtain a processed video signal that matches both a display luminance range and the color space of the display device. For example, if the color space of the display device is sRGB space, the signal RtGtBt may be directly displayed, and color space conversion does not need to be performed on the signal RtGtBt. If the color space of the display device is YUV, the signal RtGtBt is converted into a video signal YUV1 in the YUV space.

In this embodiment of this application, the luminance signal of the scene light signal is converted into the display light luminance signal, the linear display light luminance signal is converted to the non-linear space, and luminance mapping is performed on the display luminance in the non-linear space such that the display luminance range of the HDR video signal can be appropriately mapped onto the luminance range that can be displayed by the display device. This improves a contrast ratio, a luminance, and a detail representation of a picture. After the HLG scene signal is converted into the linear display light luminance signal, the linear display light luminance signal is not displayed directly, but the linear display light luminance signal is converted to the non-linear space and luminance mapping is performed in the non-linear space. Because luminance mapping is performed in the non-linear space, errors caused by luminance mapping are evenly distributed and have relatively small impact on an ultimate display effect of the video signal, and especially in a case of low-luminance displaying, display luminance distribution obtained after the mapping is appropriate and the displayed picture is not quite dark. In addition, in this embodiment of this application, impact of the black level of the display device on the luminance mapping curve is considered, and luminance details of a low luminance part are retained. Further, according to the HDR signal luminance processing method provided in this embodiment of this application, an HDR signal may be converted into an SDR signal. This improves compatibility of the SDR display device with HDR signals.

It should be understood that, for ease of understanding, the method embodiments in FIG. 6, FIG. 9, and FIG. 10 describe the methods using steps. The method flowcharts, that is, FIG. 6, FIG. 9, and FIG. 10, show sequences of the methods, but in some cases, the described steps can be performed in sequences different from the sequences herein.

Figure 13:
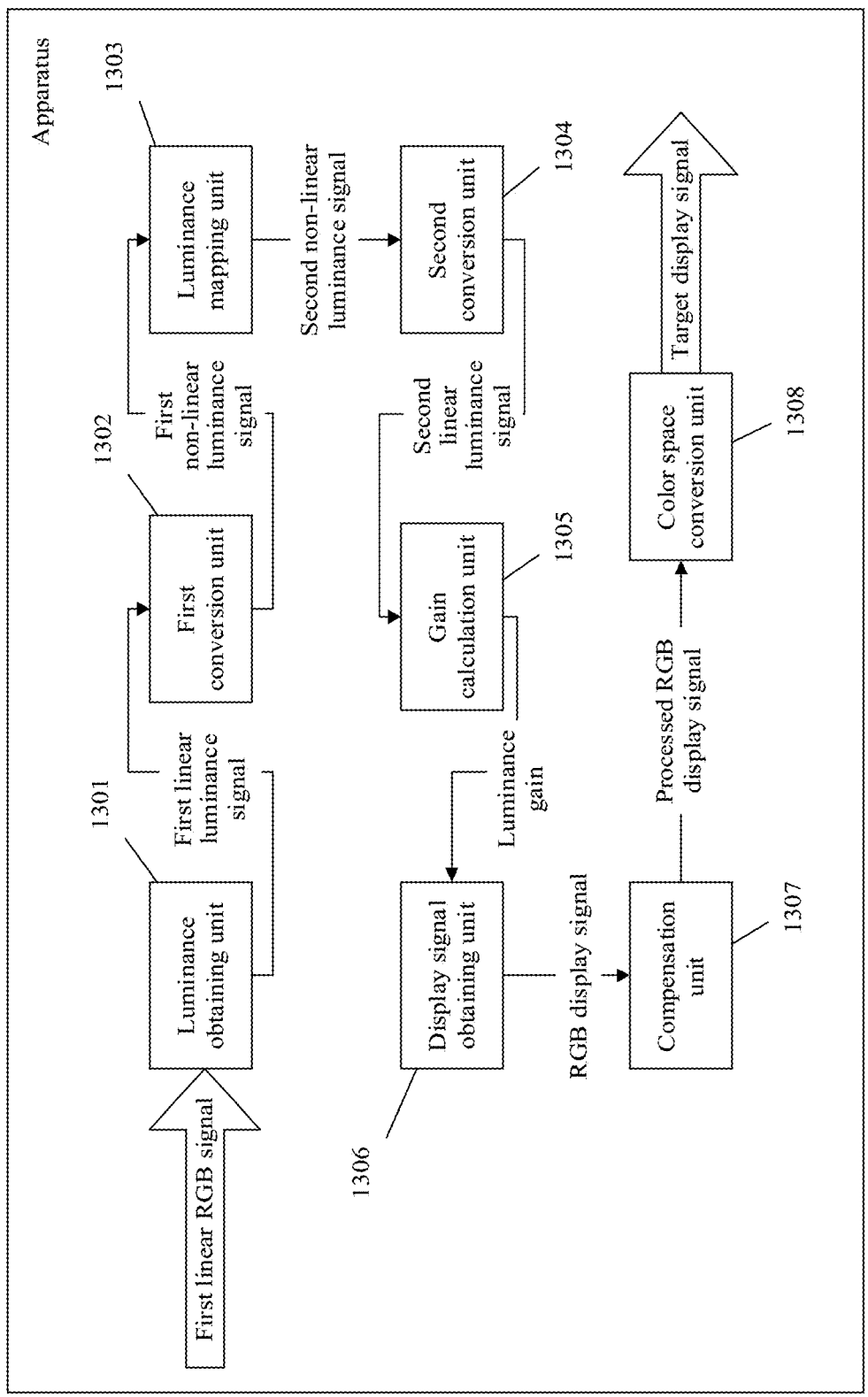
FIG. 13 shows an example video signal processing apparatus according to an embodiment of this application.

FIG. 13 shows a video signal processing apparatus according to an embodiment of this application. The apparatus includes a luminance obtaining unit 1301, a first conversion unit 1302, a luminance mapping unit 1303, a second conversion unit 1304, a gain calculation unit 1305, and a display signal obtaining unit 1306. Optionally, the apparatus may further include a compensation unit 1307 and a color space conversion unit 1308.

The luminance obtaining unit 1301 is configured to obtain a first linear luminance signal, where the first linear luminance signal is obtained based on a first linear RGB signal corresponding to a to-be-processed video signal. For details, refer to the descriptions of step 501. Details are not described herein again.

Optionally, when the to-be-processed video signal is an HDR PQ signal, the luminance obtaining unit 1301 is further configured to perform color space conversion on the PQ signal to obtain a first non-linear RGB signal, convert the first non-linear RGB signal into the first linear RGB signal based on a PQ EOTF, and perform calculation based on primary color signals of the first linear RGB signal to obtain the first linear luminance signal. For details, refer to the descriptions of steps 601 and 602.

When the to-be-processed video signal is an HLG signal, the luminance obtaining unit 1301 is further configured to perform color space conversion on the HLG signal to obtain a second non-linear RGB signal, convert the second non-linear RGB signal into a second linear RGB signal based on an HLG inverse OETF, perform calculation based on primary color signals of the second linear RGB signal to obtain a third linear luminance signal, and perform luminance signal type conversion on the third linear luminance signal to obtain the first linear luminance signal. For details, refer to the descriptions of steps 1001, 1002, and 1003.

The first conversion unit 1302 is configured to convert the first linear luminance signal into a first non-linear luminance signal.

For details, refer to the descriptions of step 502. Details are not described herein again. Optionally, the first conversion unit 1302 may further be configured to complete steps 603 and 1004.

The luminance mapping unit 1303 is configured to perform piecewise luminance mapping on the first non-linear luminance signal to obtain a second non-linear luminance signal.

For details, refer to the descriptions of step 503. Details are not described herein again. Optionally, the luminance mapping unit 1303 may further be configured to complete steps 604 and 1005. It should be understood that the luminance mapping unit may use the LUT, the luminance mapping curve, or the luminance mapping formula stored in the memory, to complete luminance mapping performed on the to-be-processed video signal. For the luminance mapping curve, refer to step 600 and the descriptions of the embodiment corresponding to FIG. 9.

The second conversion unit 1304 is configured to convert the second non-linear luminance signal into a second linear luminance signal.

For details, refer to the descriptions of step 504. Details are not described herein again. Optionally, the second conversion unit 1304 may further be configured to complete steps 605 and 1006.

The gain calculation unit 1305 is configured to calculate a luminance gain between the second linear luminance signal and the first linear luminance signal.

For details, refer to the descriptions of step 505. Details are not described herein again. Optionally, the gain calculation unit 1305 may further be configured to complete steps 606 and 1007.

The display signal obtaining unit 1306 is configured to obtain, based on a product of the luminance gain and the first linear RGB signal, an RGB display signal corresponding to the to-be-processed video signal.

For details, refer to the descriptions of step 506. Details are not described herein again.

The compensation unit 1307 is configured to add a BlackLevelLift to each color value of the RGB display signal to obtain a processed RGB display signal, where the BlackLevelLift is a minimum value of a display luminance of the display device.

Optionally, the display signal obtaining unit 1306 and the compensation unit 1307 can jointly complete steps 607 and 1008.

The color space conversion unit 1308 is configured to perform color space conversion on the processed RGB display signal to obtain a target display signal, where a color format of the target display signal is the same as a color format corresponding to the display device. It should be understood that if the color format corresponding to the display device is an RGB, the processed RGB display signal may be directly displayed, and color space conversion does not need to be performed on the processed RGB display signal.

For example, the following describes a specific implementation of video signal processing provided in this application. In this embodiment of this application, an HDR HLG signal is converted into an SDR signal, to make the SDR signal adapt to an SDR TV. In this application, saturation mapping is first performed, and then luminance mapping and color gamut mapping are performed. In other possible implementations, a processing sequence of saturation mapping, luminance mapping, and color gamut mapping may be changed. This is not limited in this embodiment of this application.

It is assumed that YsCbsCrs is a 4:4:4 YCbCr non-linear video signal that is obtained through restoration after a terminal performs AVS2 decoding reconstruction and chroma upsampling. Each component is a 10-bit digital code value.

(1) Calculate a YiCbiCri signal (saturation mapping).

a. Calculate a normalized original luminance:

$$Y_{norm}=(Y-64)/(940-64). \quad (42)$$

$Y_{norm}$ should be clipped to a range [0, 1].

b. Calculate a saturation mapping gain SmGain:

$$SmGain=f_{sm}(Y_{norm}). \quad (43)$$

$f_{sm}( )$ is a saturation mapping curve, and is obtained through calculation based on a luminance mapping curve $f_{tm}( )$. Calculation steps of $f_{tm}( )$ are as follows.

i. Convert the luminance mapping curve $f_{tm}( )$ to linear space, to obtain a linear luminance mapping curve:

$$f_{tmL}(L)=PQ\_EOTF(f_{tm}(PQ\_EOTF^{-1}(L))). \quad (44)$$

where L is an input linear luminance and is measured in nits, and a result of $f_{tmL}(L)$ is a linear luminance and is measured in nits.

ii. Convert the luminance mapping curve $f_{tmL}( )$ to HLG space, to obtain a luminance mapping curve in HLG space:

$$f_{tmHLG}(e) = HLG\_OETF\left(\frac{PQ\_EOTF(f_{tm}(PQ\_EOTF^{-1}(1000*HLG\_OETF^{-1}(e))))}{1000}\right), \quad (45)$$

where e is a normalized HLG signal luminance, and a result of $f_{tmHLG}(e)$ is a normalized HLG signal luminance.

iii. Calculate the saturation mapping curve $f_{sm}( )$:

$$f_{sm}(e) = \frac{f_{tmHLG}(e)}{e} = HLG\_OETF\left(\frac{(PQ\_EOTF(f_{tm}(PQ\_EOTF^{-1}(1000*HLG\_OETF^{-1}(e))))}{(1000)}\right)/e, \quad (46)$$

where an input of the saturation mapping curve is e, and $f_{sm}(e)$ is a saturation mapping gain in the HLG space.

c. Calculate the signal obtained after the saturation mapping:

$$\begin{pmatrix} Y_i \\ Cb_i \\ Cr_i \end{pmatrix} = \begin{pmatrix} 1 & 0 & 0 \\ 0 & SmGain & 0 \\ 0 & 0 & SmGain \end{pmatrix} \times \begin{pmatrix} Y-64 \\ Cb-512 \\ Cr-512 \end{pmatrix} + \begin{pmatrix} 64 \\ 512 \\ 512 \end{pmatrix}. \quad (47)$$

The YiCbiCri signal is a 10-bit digital code value, where a value of Yi should be within an interval [64, 940], and values of Cbi and Cri each should be within an interval [64, 960].

(2) Calculate a non-linear R'sG'sB's signal:

$$\begin{pmatrix} Y_{sf} \\ Cb_{sf} \\ Cr_{sf} \end{pmatrix} = \begin{pmatrix} \frac{1}{876} & 0 & 0 \\ 0 & \frac{1}{896} & 0 \\ 0 & 0 & \frac{1}{896} \end{pmatrix} \times \begin{pmatrix} Y_i - 64 \\ Cb_i - 512 \\ Cr_i - 512 \end{pmatrix}, \text{ and} \quad (48)$$

$$\begin{pmatrix} R'_s \\ G'_s \\ B'_s \end{pmatrix} = \begin{pmatrix} 1 & 0 & 1.4746 \\ 1 & -0.1645 & -0.5713 \\ 1 & 1.8814 & 0 \end{pmatrix} \times \begin{pmatrix} Y_{sf} \\ Cb_{sf} \\ Cr_{sf} \end{pmatrix}. \quad (49)$$

The $Y_sCb_sCr_s$ signal is a 10-bit digital code value, and $R'_sG'_sB'_s$ obtained through the foregoing processing is a floating-point non-linear color value and its value should be clipped to an interval [0, 1].

(3) Calculate a linear $R_sG_sB_s$ signal, and calculate an input signal linear luminance $Y_s$:

$$E_s = HLG\_OETF^{-1}(E'_s). \quad (50)$$

In the equation, $E_s$ represents a linear color value of any component of the $R_sG_sB_s$ signal, and its value is within an interval [0, 1], and $E'_s$ represents a non-linear color value of any component of the R'sG'sB's signal. A function $HLG\_OETF^{-1}( )$ is defined as follows according to ITU BT.2100:

$$HLG\_OETF^{-1}(E') = \begin{cases} \frac{E'^2}{3} & 0 \le E' \le 1/2 \\ \frac{\left(\exp\left(\frac{(E'-c)}{a}\right)+b\right)}{12} & 1/2 < E' \le 1 \end{cases}, \quad (51)$$

where a=0.17883277, b=1−4a, and c=0.5−a×ln(4a).

The linear luminance $Y_s$ is calculated as follows:

$$Y_s=0.2627R_s+0.6780G_s+0.0593B_s, \quad (52)$$

where $Y_s$ is a real number and its value is within an interval [0, 1].

(4) Calculate a $Y_t$ signal.

a. Calculate a display luminance $Y_d$:

$$Y_d=1000(Y_s)^{1.2}. \quad (53)$$

b. Calculate a visually linear luminance $Y_{dPQ}$:

$$y_{dPQ} = PQ\_EOTF^{-1}(Y_d), \quad (54)$$

where $PQ\_EOTF^{-1}(E) = \left(\frac{c_1 + c_2(E/10000)^{m_1}}{1 + c_3(E/10000)^{m_1}}\right)^{m_2}$, and (55)

$m_1 = 2610/16384 = 0.1593017578125$,
$m_2 = 2523/4096 \times 128 = 78.84375$,
$c_1 = 3424/4096 = 0.8359375 = c_3 - c_2 + 1$,
$c_2 = 2413/4096 \times 32 = 18.8515625$, and
$c_3 = 2392/4096 \times 32 = 18.6875$.

c. Perform luminance mapping to obtain $Y_{tPQ}$:

$$Y_{tPQ}=f_{tm}(Y_{dPQ}). \quad (56)$$

$f_{tm}( )$ in the equation is defined as follows:

$$f_{tm}(e) = \begin{cases} e, & e \le 0.4064 \\ hmt(e), & 0.4064 < e \le 0.7518 \\ 0.579133, & e > 0.7518 \end{cases} \quad (57)$$

A function hmt( ) is defined as follows:

$$hmt(x) = 0.4064 \times \alpha_0(x) + 0.5791 \times \alpha_1(x) + \beta_0(x), \text{ and} \quad (58)$$

$$\begin{cases} \alpha_0(x) = \dfrac{(-0.4675 + 2x)(0.7518 - x)^2}{0.0412} \\ \alpha_1(x) = \dfrac{(1.849 - 2x)(x - 0.4064)^2}{0.0412} \\ \beta_0(x) = \dfrac{(x - 0.4064)(x - 0.7518)^2}{0.1193} \end{cases}.$$

d. Calculate a normalized linear luminance $Y_t$ obtained after luminance mapping:

$$Y_t = PQ\_EOTF(Y_{tPQ}), \quad (59)$$

$$\text{where } PQ\_EOTF(E') = 10000 \left( \frac{\max[(E'^{1/m_2} - c_1), 0]}{c_2 - c_3 E'^{1/m_2}} \right)^{1/m_1}. \quad (60)$$

Therefore, a calculation formula of Yt is as follows:

$$Y_t = PQ\_EOTF(f_{tm}(PQ\_EOTF^{-1}(1000(Y_s)^{1.2})) \quad (61)$$

where $Y_t$ is a real number and its value should be clipped to an interval [0, 200].

(5) Calculate a luminance mapping gain TmGain.

The luminance mapping gain TmGain is calculated according to the following equation:

$$TmGain = \begin{cases} \dfrac{Y_t}{Y_s}, & Y_s \neq 0 \\ 0, & Y_s = 0 \end{cases}. \quad (62)$$

(6) Calculate an $R_{tm}G_{tm}B_{tm}$ signal:

$$E_{tm} = E_s \times TmGain. \quad (63)$$

In the equation, Es represents any component of the $R_sG_sB_s$ signal, and $E_{tm}$ represents any component of the $R_{tm}G_{tm}B_{tm}$ signal.

(7) Calculate an $R_tG_tB_t$ signal (color gamut mapping):

$$\begin{pmatrix} R_t \\ G_t \\ B_t \end{pmatrix} = \begin{pmatrix} 1.6605 & -0.5876 & -0.0728 \\ -0.1246 & 1.1329 & -0.0083 \\ -0.0182 & -0.1006 & 1.1187 \end{pmatrix} \times \begin{pmatrix} R_{tm} \\ G_{tm} \\ B_{tm} \end{pmatrix}. \quad (64)$$

RtGtBt obtained through the foregoing processing is a floating-point linear color value and its value should be clipped to an interval [0, 200].

(8) Calculate an $R'_t G'_t B'_t$ signal:

$$E'_t = (E_t/200)^{1/\gamma}. \quad (65)$$

(9) Calculate a $Y_t Cb_t Cr_t$ signal:

$$\begin{pmatrix} Y_{tf} \\ Cb_{tf} \\ Cr_{tf} \end{pmatrix} = \begin{pmatrix} 0.2126 & 0.7152 & 0.0722 \\ -0.1146 & -0.3854 & 0.5 \\ 0.5 & -0.4542 & -0.0458 \end{pmatrix} \times \begin{pmatrix} R'_t \\ G'_t \\ B'_t \end{pmatrix}, \text{ and} \quad (66)$$

$$\begin{pmatrix} Y'_t \\ Cb_t \\ Cr_t \end{pmatrix} = \begin{pmatrix} 876 & 0 & 0 \\ 0 & 896 & 0 \\ 0 & 0 & 896 \end{pmatrix} \times \begin{pmatrix} Y_{tf} \\ Cb_{tf} \\ Cr_{tf} \end{pmatrix} + \begin{pmatrix} 64 \\ 512 \\ 512 \end{pmatrix}. \quad (67)$$

For example, a value of γ in this embodiment may be 2.2 or 2.4, or may be another value. The value of γ may be selected based on an actual case, and is not limited in this embodiment of this application.

R'tG'tB't is a non-linear color value, and its value is within an interval [0, 1]. A Y'tCbtCrt signal obtained through the foregoing processing is a 10-bit digital code value, where a value of Y't should be within an interval [64, 940], and values of Cbt and Crt each should be within an interval [64, 960].

Figure 14:
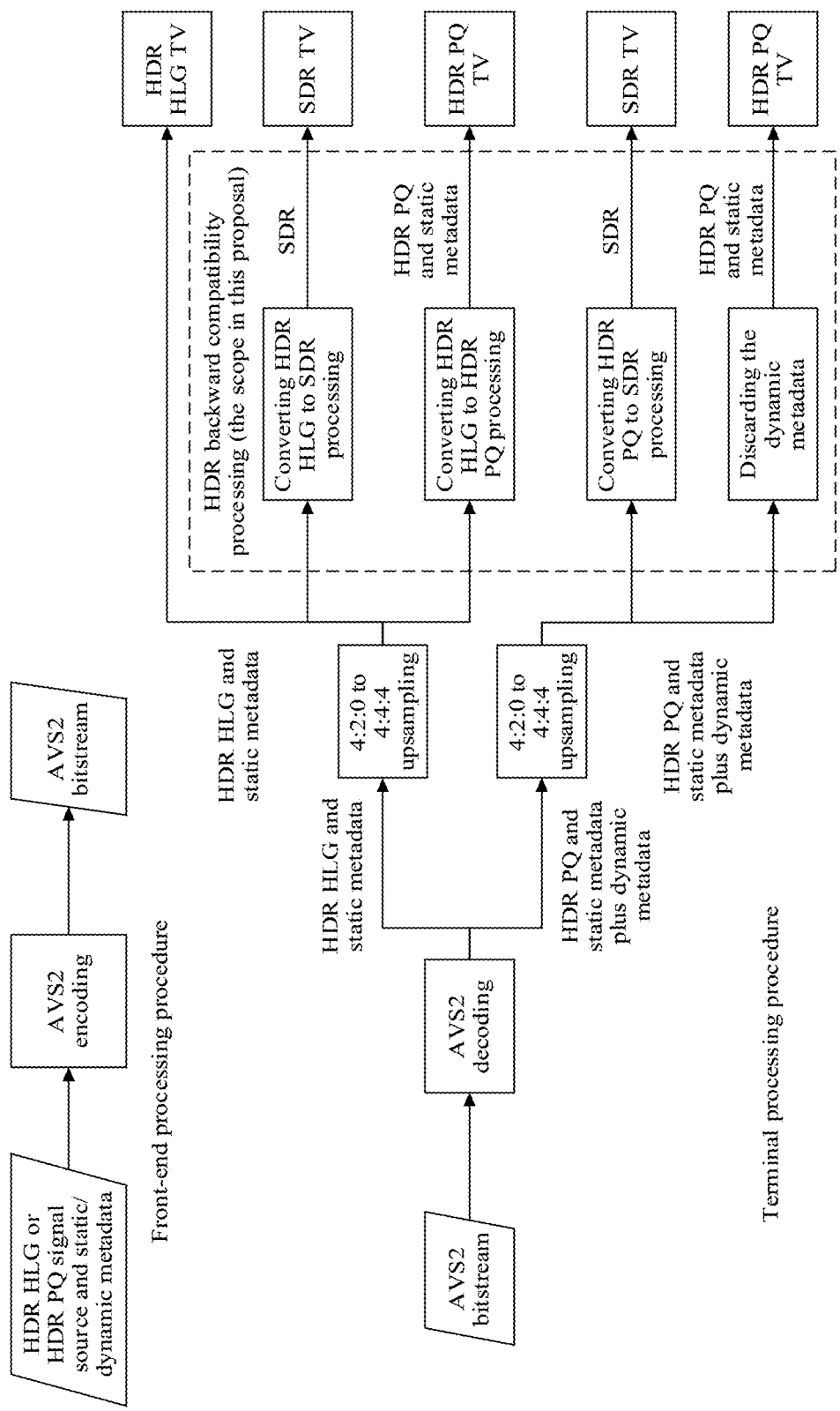
FIG. 14 is an example processing flowchart of an HDR terminal technical solution according to an embodiment of this application.

FIG. 14 is a processing flowchart of an HDR terminal technical solution according to an embodiment of this application, and shows a technical framework and a related scope of an entire video end-to-end system. As shown in FIG. 14, the technical framework of the end-to-end system provided in this embodiment of this application may be used to convert an HDR HLG video signal into an SDR signal to make the SDR signal adapt to an SDR TV, and may also be used to convert an HDR HLG signal into an HDR PQ signal to make the HDR PQ signal adapt to an HDR PQ TV for display. Optionally, an HDR PQ signal may be converted into an SDR signal to make the SDR signal adapt to an SDR TV for playing. Optionally, dynamic metadata of a video signal may be discarded and only static metadata is retained such that the video signal adapts to an HDR PQ TV for playing. It should be understood that, the technical framework is used to perform $2^{nd}$ Audio Video Coding Standard (AVS2) encoding on an HDR video signal and its dynamic metadata or static metadata to obtain an AVS2 bitstream, and then transmit the AVS2 bitstream to a terminal. Optionally, another existing coding standard such as a High Efficiency Video Coding (HEVC) or another future new coding standard or the like that can support an HDR video may be used. This is not limited in this embodiment of this application.

The following describes an implementation of video signal conversion processing provided in an embodiment of this application.

1101. HDR input signal source format

An HDR input signal source supported in this embodiment of this application is the AVS2 bitstream received by the terminal. After the AVS2 bitstream is decoded, a 10-bit integer-type YCbCr color difference signal in a 4:2:0 format (which is referred to as a YCC signal for short below, and is not repeated in this specification) and related HDR static or dynamic metadata.

The YCC HDR signal may have several formats listed in Table 1.

TABLE 1

| Program type | Resolution | Frame rate | Quantization precision | Color gamut | Transfer curve | Metadata |
|---|---|---|---|---|---|---|
| HDR-PQ | 3840 × 2160 | 50P | 10 bits | BT.2020 | PQ | Static metadata or static and dynamic metadata |
| HDR-HLG | 3840 × 2160 | 50P | 10 bits | BT.2020 | HLG | N/A |
|  | 3840 × 2160 | 50P | 10 bits | BT.2020 | HLG | Static metadata |

As a reference, encapsulation of program video parameters of a 4K ultra high definition television in the AVS2 bitstream is listed in Table 2:

TABLE 2

| Parameter | Value | |
|---|---|---|
|  | HDR-PQ program | HDR-HLG program |
| color_primaries | 9 | 9 |
| transfer_characteristics | 12 | 14 |
| matrix_coefficients | 8 | 8 |
| Sequence header static metadata | Existent | Existent when a maximum video luminance is not 1000 nits |
| Picture header dynamic metadata | Existent | N/A |

1102. Types of TVs to which HDR signals are output and recommended adaptation manners Due to a difference between production time, TVs that may be connected to a terminal greatly differ in HDR signal supporting capabilities. Generally, an earlier TV model is difficult to support a new signal format. In view of this, the decoding terminal needs to perform compatibility adaptation based on the difference between the HDR signal supporting capabilities of the TVs.

Based on different HDR signal receiving and processing capabilities of TVs, TVs to which the terminal device may need to be connected are categorized into the following several types, as listed in Table 3:

TABLE 3

| Television type | Color gamut | Transfer curve |
|---|---|---|
| Type 1 | BT.709 | Gamma |
| Type 2 | BT.2020 | Gamma |
| Type 3 | BT.2020 | Supporting PQ |
| Type 4 | BT.2020 | Supporting PQ and HLG |

In this embodiment of this application, corresponding signal conversion processing is performed based on different formats of HDR signals received by the terminal and different HDR signal supporting capabilities of connected TVs, to implement compatibility adaptation between the signals and the TVs.

1103. Compatibility adaptation between an HDR HLG signal and an SDR TV

It is assumed that YsCbsCrs is a 4:4:4 YCbCr non-linear video signal that is obtained through restoration after a terminal performs AVS2 decoding reconstruction and chroma upsampling. Each component is a 10-bit digital code value.

(1) Calculate a non-linear R'sG'sB's signal:

$$\begin{pmatrix} Y_{sf} \\ Cb_{sf} \\ Cr_{sf} \end{pmatrix} = \begin{pmatrix} \frac{1}{876} & 0 & 0 \\ 0 & \frac{1}{896} & 0 \\ 0 & 0 & \frac{1}{896} \end{pmatrix} \times \begin{pmatrix} Y_s - 64 \\ Cb_s - 512 \\ Cr_s - 512 \end{pmatrix}, \text{ and} \quad (68)$$

$$\begin{pmatrix} R'_s \\ G'_s \\ B'_s \end{pmatrix} = \begin{pmatrix} 1 & 0 & 1.4746 \\ 1 & -0.1645 & -0.5713 \\ 1 & 1.8814 & 0 \end{pmatrix} \times \begin{pmatrix} Y_{sf} \\ Cb_{sf} \\ Cr_{sf} \end{pmatrix}. \quad (69)$$

The YsCbsCrs signal is a 10-bit digital code value, and R'sG'sB's obtained through the foregoing processing is a floating-point non-linear color value and its value should be clipped to an interval [0, 1].

An input HDR HLG video signal is a video signal in YCC space, or in other word, the HLG signal is a scene light signal. The HLG video signal is converted to RGB color space through color space conversion, to obtain a non-linear scene light signal R'sG'sB's. In this embodiment of this application, a luminance mapping process is completed in the RGB color space. It should be understood that a video signal obtained through color space conversion is a non-linear video signal. If an input is an HLG signal, a signal obtained through color space conversion is a non-linear scene light signal.

(2) Calculate a linear RsGsBs signal, and calculate an input signal luminance Ys:

$$E_s = \text{HLG\_OETF}^{-1}(E'_s). \quad (70)$$

In the equation, $E_s$ represents any component of the $R_s G_s B_s$ signal, and $E'_s$ represents any component of the $R'_s G'_s B'_s$ signal. A function $\text{HLG\_OETF}^{-1}(\ )$ is defined as follows according to ITU BT.2100:

$$\text{HLG\_OETF}^{-1}(E') = \begin{cases} \dfrac{E'^2}{3} & 0 \leq E' \leq 1/2 \\ \dfrac{\left(\exp\left(\dfrac{(E' - c)}{a}\right) + b\right)}{12} & 1/2 < E' \leq 1 \end{cases}, \quad (71)$$

where a=0.17883277, b=1−4a, and c=0.5−ax ln(4a)5b.

A first linear display light luminance signal is obtained based on a linear video signal. For example, the first linear display light luminance signal is a linear display light luminance signal. In this embodiment of this application, because the input is the HDR HLG signal, the linear video signal is a linear scene light signal, and a luminance signal Ys obtained based on the linear scene light signal is a scene luminance signal.

The linear luminance Ys is calculated as follows:

$$Y_s = 0.2627 R_s + 0.6780 G_s + 0.0593 B_s. \tag{72}$$

(3) Calculate a Yt signal.

(a) Calculate a display luminance Yd:

$$Y_d = 1000 (Y_s)^{1.2}. \tag{73}$$

It should be understood that the input signal is the HDR HLG signal, which is a scene light signal. Ys calculated in the foregoing step is a linear scene luminance, and an input of a luminance mapping curve is a display luminance. Therefore, the HDR HLG signal first needs to be converted into the display light luminance signal Yd before luminance mapping is performed.

(b) Calculate a non-linear luminance $Y_{dPQ}$:

$$y_{dPQ} = PQ\_EOTF^{-1}(Y_d), \tag{74}$$

where $PQ\_EOTF^{-1}(E) = \left( \frac{c_1 + c_2 (E/10000)^{m_1}}{1 + c_3 (E/10000)^{m_1}} \right)^{m_2}$, and $\tag{75}$ $m_1 = 2610/16384 = 0.1593017578125,$
$m_2 = 2523/4096 \times 128 = 78.84375,$
$c_1 = 3424/4096 = 0.8359375 = c_3 - c_2 + 1,$
$c_2 = 2413/4096 \times 32 = 18.8515625,$ and
$c_3 = 2392/4096 \times 32 = 18.6875.$ Further, because luminance mapping is performed in non-linear space, and an input for luminance mapping is a non-linear display luminance, the linear display luminance needs to be converted to the non-linear space to obtain the non-linear display luminance $Y_{dPQ}$.

(c) Perform luminance mapping to obtain $Y_{tPQ}$:

$$Y_{tPQ} = f_{tm}(Y_{dPQ}). \tag{76}$$

$f_{tm}(\ )$ in the equation is defined as follows:

$$f_{tm}(e) = \begin{cases} e, & e \leq 0.2643 \\ hmt(e), & 0.2643 < e \leq 0.7518 \\ 0.5079133, & e > 0.7518 \end{cases} \tag{77}$$

A function $hmt(\ )$ is defined as follows:

$$hmt(x) = 0.2643 \times \alpha_0(x) + 0.5081 \times \alpha_1(x) + \beta_0(x), \text{ and} \tag{78}$$

$$\begin{cases} \alpha_0(x) = \frac{(-0.0411 + 2x)(0.7518 - x)^2}{0.1159} \\ \alpha_1(x) = \frac{(1.9911 - 2x)(x - 0.2643)^2}{0.1159} \\ \beta_0(x) = \frac{(x - 0.2643)(x - 0.7518)^2}{0.2377} \end{cases} \tag{79}$$

(d) Calculate a normalized linear luminance Yt obtained after luminance mapping:

$$y_c = PQ\_EOTF(Y_{tPQ}), \tag{80}$$

where $PQ\_EOTF(E') = 10000 \left( \frac{\max[(E'^{1/m_2} - c_1), 0]}{c_2 - c_3 E'^{1/m_2}} \right)^{1/m_1}. \tag{81}$ The signal obtained after the luminance mapping is a non-linear display light luminance signal. For example, the non-linear display light luminance signal may be converted into the linear display light luminance signal Yt using a PQ EOTF curve.

In summary, a calculation formula of Yt is as follows:

$$Y_t = PQ\_EOTF(f_{tm}(PQ\_EOTF^{-1}(1000(Y_s)^{1.2})), \tag{82}$$

where Yt is a real number and its value is within an interval [0, 100].

(4) Calculate a luminance mapping gain TmGain.

The luminance mapping gain TmGain is calculated according to the following equation:

$$TmGain = \begin{cases} \frac{Y_t}{Y_s}, & Y_s \neq 0 \\ 0, & Y_s = 0 \end{cases}. \tag{83}$$

(5) Calculate a saturation mapping gain SmGain.

For example, a value of $\gamma$ in this embodiment may be 2.2 or 2.4, or may be another value. The value of $\gamma$ may be selected based on an actual case, and is not limited in this embodiment of this application.

(a) Calculate a non-linear display luminance value before luminance mapping:

$$Y_{dGMM} = (Y_d/1000)^{1/\gamma} = (1000(Y_s)^{1.2}/1000)^{1/\gamma}. \tag{84}$$

(b) Calculate a non-linear display luminance value after the luminance mapping:

$$Y_{tGMM} = (Y_t/1000)^{1/\gamma} \tag{85}$$

(c) Calculate a saturation mapping gain SmGain:

$$SmGain = \frac{Y_{tGMM}}{Y_{dGMM}} = \left( \frac{Y_t}{1000(Y_s^{1.2})} \right)^{1/\gamma}. \tag{86}$$

(6) Calculate an RtmGtmBtm signal:

$$E_{tm} = E_s \times TmGain. \tag{87}$$

In the equation, $E_s$ represents any component of the $R_s G_s B_s$ signal, and $E_{tm}$ represents any component of the $R_{tm} G_{tm} B_{tm}$ signal.

(7) Calculate an RtGtBt signal (color gamut mapping):

$$\begin{pmatrix} R_t \\ G_t \\ B_t \end{pmatrix} = \begin{pmatrix} c_{00} & c_{01} & c_{02} \\ c_{10} & c_{11} & c_{12} \\ c_{20} & c_{21} & c_{22} \end{pmatrix} \times \begin{pmatrix} R_{tm} \\ G_{tm} \\ B_{tm} \end{pmatrix}. \tag{88}$$

For example, color gamut mapping may be as follows:

$$\begin{pmatrix} R_t \\ G_t \\ B_t \end{pmatrix} = \begin{pmatrix} 1.6605 & -0.5876 & -0.0728 \\ -0.1246 & 1.1329 & -0.0083 \\ -0.0182 & -0.1006 & 1.1187 \end{pmatrix} \times \begin{pmatrix} R_{tm} \\ G_{tm} \\ B_{tm} \end{pmatrix}. \tag{89}$$

(8) Calculate an R'tG'tB't signal:

$$E'_t = EOTF^{-1}(E_t). \tag{90}$$

Based on a different application scenario, the function $EOTF^{-1}(\ )$ may be a BT.1886 inverse EOTF function or a BT.2100 PQ inverse EOTF function. For example, $E'_t = (E_t/100)^{1/2.4}$ holds true.

(9) Calculate a YtCbtCrt signal:

$$\begin{pmatrix} Y_{tf} \\ Cb_{tf} \\ Cr_{tf} \end{pmatrix} = \begin{pmatrix} 0.2126 & 0.7152 & 0.0722 \\ -0.1146 & -0.3854 & 0.5 \\ 0.5 & -0.4542 & -0.0458 \end{pmatrix} \times \begin{pmatrix} R'_t \\ G'_t \\ B'_t \end{pmatrix}, \text{ and} \quad (91)$$

$$\begin{pmatrix} Y_t \\ Cb_t \\ Cr_t \end{pmatrix} = \begin{pmatrix} 876 & 0 & 0 \\ 0 & 896 & 0 \\ 0 & 0 & 896 \end{pmatrix} \times \begin{pmatrix} Y_{tf} \\ Cb_{tf} \\ Cr_{tf} \end{pmatrix} + \begin{pmatrix} 64 \\ -512 \\ -512 \end{pmatrix}. \quad (92)$$

R'tG'tB't is a floating-point non-linear color value, and its value is within an interval [0, 1]. The YtCbtCrt signal obtained through the foregoing processing is a 10-bit digital code value.

(10) Calculate a YoCboCro signal (saturation mapping):

$$\begin{pmatrix} Y_o \\ Cb_o \\ Cr_o \end{pmatrix} = \begin{pmatrix} 1 & 0 & 0 \\ 0 & SmGain & 0 \\ 0 & 0 & SmGain \end{pmatrix} \times \begin{pmatrix} Y_t \\ Cb_t \\ Cr_t \end{pmatrix}. \quad (93)$$

The YoCboCro signal is a 10-bit digital code value. This procedure is applicable to compatibility adaptation processing between an HDR HLG signal and an HDR PQ signal. Various parameters in the foregoing processing procedure vary based on different adaptation types. It should be understood that in this embodiment of this application, for a video signal, luminance processing is first performed, color gamut processing is then performed, and finally saturation processing is performed. In an optional case, the color gamut processing and luminance processing may be first performed, and then saturation processing is performed.

To implement transmission of an HDR HLG signal to the foregoing types of TVs, a manner listed in Table 4 is recommended for compatibility adaptation in this embodiment.

TABLE 4

| Output parameter | Television type | | | |
| --- | --- | --- | --- | --- |
| | Type 1 | Type 2 | Type 3 | Type 4 |
| Color gamut | BT.709 | BT.2020 | BT.2020 | BT.2020 |
| Curve | Gamma | Gamma | PQ | HLG |

In Table 4, a type-2 television usually also has a capability of processing a BT.709 color gamut signal. Therefore, in this embodiment, for the type-2 television, an HDR HLG signal is also converted to a BT.709 color gamut, and then a signal obtained through color gamut conversion is transmitted to the type-2 television.

Conversion from a BT.2020 Color Gamut into a BT.709 Color Gamut

Such processing is a step of compatibility adaptation processing between an HLG signal and an SDR signal. Because this processing method has been described conceptually in the BT.2407 report, content of the ITU report is introduced into this part of content as material for description.

According to the BT.2407-0 Section 2 in the ITU report, conversion from a BT.2020 wide color gamut signal into a BT.709 signal may be implemented using a linear matrix-based conversion method. This method is a reverse process of the ITU standard BT.2087 except hard-clip performed on an output signal.

Figure 15:
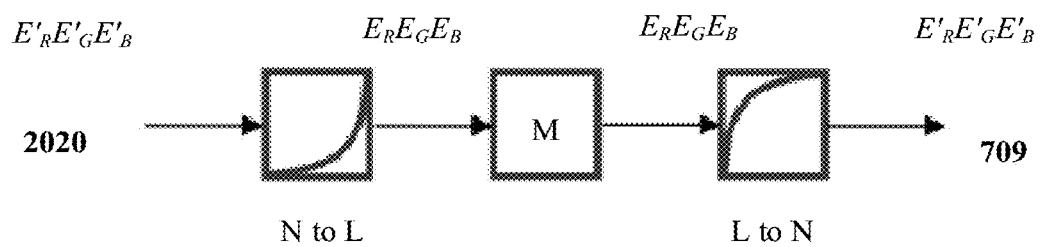
FIG. 15 is a schematic diagram of an example color gamut conversion process according to an embodiment of this application.

FIG. 15 illustrates a conversion process.

The following steps are further included.

(1) Convert a non-linear signal into a linear signal (N to L).

It is assumed that a normalized BT.2020 non-linear RGB signal is $(E'_R E'_G E'_B)$, and its component signals are converted into a linear signal $(E_R E_G E_B)$ using a transfer function. In this embodiment of this application, the transfer function may be an HLG $EOTF^{-1}$ function.

(2) Matrix (M).

Conversion from a BT.2020 linear RGB signal into a BT.709 linear RGB signal may be completed through matrix calculation as follows:

$$\begin{pmatrix} E_R \\ E_G \\ E_B \end{pmatrix}_{709} = \begin{pmatrix} 1.6605 & -0.5876 & -0.0728 \\ -0.1246 & 1.1329 & -0.0083 \\ -0.0182 & -0.1006 & 1.1187 \end{pmatrix} \begin{pmatrix} E_R \\ E_G \\ E_B \end{pmatrix}_{2020}. \quad (94)$$

(3) Convert a linear signal into a non-linear signal (L to N).

According to the ITU-BT.2087-0 standard, if the BT.709 linear RGB signal $(E_R E_G E_B)$ needs to be used for a BT.709 display device, the BT.709 linear RGB signal needs to be converted into a BT.709 non-linear RGB signal $(E'_R E'_G E'_B)$ using an OETF defined in ITU BT.1886. For example, a value of γ in this embodiment may be 2.2 or 2.4, or may be another value. The value of γ may be selected based on an actual case, and is not limited in this embodiment of this application.

A conversion formula is shown as follows:

$$E = (E')^\gamma, 0 \leq E' \leq 1. \quad (95)$$

1104. Compatibility adaptation processing between an HDR HLG signal and an HDR PQ TV According to the BT.2390-4 Section 7.2 in the ITU report, it is first specified that a reference peak luminance $L_w$ from an HLG signal to a PQ signal is 1000 nits, and a black level $L_b$ is 0.

Figure 16:
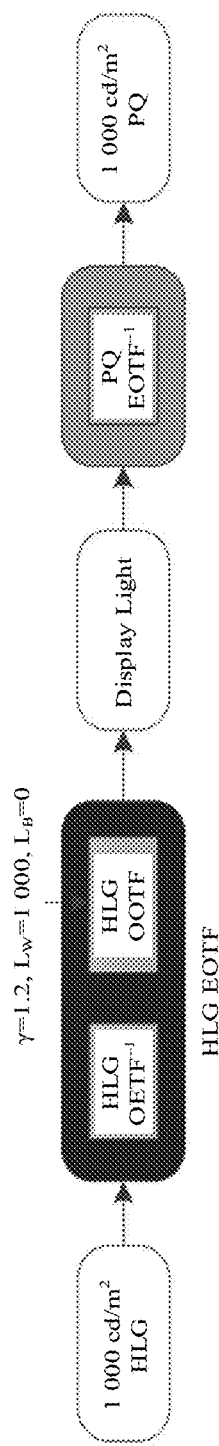
FIG. 16 is a schematic diagram of an example signal conversion process according to an embodiment of this application.

According to the report, using a process shown in FIG. 16, a PQ image that is the same as an HLG image may be generated in a color volume within 1000 nits.

A specific process of conversion from an HDR HLG signal into an HDR PQ signal is as follows.

(1) A linear scene light signal may be generated based on a 1000-nit HLG source signal using an HLG inverse OETF function.

(2) A linear display light signal may be generated based on the linear scene light signal using an HLG OOTF function.

(3) A 1000-nit PQ display light signal may be generated based on the linear display light signal using a PQ inverse EOTF function.

This processing procedure is converting the HDR HLG signal into the HDR PQ signal and displaying the HDR PQ signal on a TV.

A complete processing procedure in this scenario is shown as follows.

It is assumed that YsCbsCrs is a 4:4:4 YCbCr non-linear video signal that is obtained through restoration after a terminal performs AVS2 decoding reconstruction and chroma upsampling. Each component is a 10-bit digital code value.

(1) Calculate a non-linear R'sG'sB's signal:

$$\begin{pmatrix} Y_{sf} \\ Cb_{sf} \\ Cr_{sf} \end{pmatrix} = \begin{pmatrix} \frac{1}{876} & 0 & 0 \\ 0 & \frac{1}{896} & 0 \\ 0 & 0 & \frac{1}{896} \end{pmatrix} \times \begin{pmatrix} Y_s - 64 \\ Cb_s - 512 \\ Cr_s - 512 \end{pmatrix}, \text{and} \quad (96)$$

$$\begin{pmatrix} R'_s \\ G'_s \\ B'_s \end{pmatrix} = \begin{pmatrix} 1 & 0 & 1.4746 \\ 1 & -0.1645 & -0.5713 \\ 1 & 1.8814 & 0 \end{pmatrix} \times \begin{pmatrix} Y_{sf} \\ Cb_{sf} \\ Cr_{sf} \end{pmatrix}. \quad (97)$$

The YsCbsCrs signal is a 10-bit digital code value, and R'sG'sB's obtained through the foregoing processing is a floating-point non-linear color value and its value should be clipped to an interval [0, 1].

An input HDR HLG video signal is a video signal in YCC space, or in other word, the HLG signal is a scene light signal. The HLG video signal is converted to RGB color space through color space conversion, to obtain a non-linear scene light signal R'sG'sB's. In this embodiment of this application, a luminance mapping process is completed in the RGB color space. It should be understood that a video signal obtained through color space conversion is a non-linear video signal. If an input is an HLG signal, a signal obtained through color space conversion is a non-linear scene light signal.

(2) Calculate a linear RsGsBs signal, and calculate an input signal linear luminance Ys.

The non-linear scene light signal R'sG'sB's is converted into the linear scene light signal RsGsBs signal. In an optional case, the non-linear scene light signal R'sG'sB's may be converted into the linear scene light signal RsGsBs signal using an HLG inverse OETF. The conversion is performed as follows:

$$E_s = HLG\_OETF^{-1}(E'_s). \quad (98)$$

In the equation, Es represents any component of the RsGsBs signal, and E's represents any component of the R'sG'sB's signal. A function $HLG\_OETF^{-1}( )$ is defined as follows according to ITU BT.2100:

$$HLG\_OETF^{-1}(E') = \begin{cases} \frac{E'^2}{3} & 0 \le E' \le \frac{1}{2} \\ \frac{\exp\left(\frac{E'-c}{a}\right)+b}{12} & \frac{1}{2} < E' \le 1 \end{cases}, \quad (99)$$

where a=0.17883277, b=1−4a, and c=0.5−ax ln(4a)5b.

A first linear display light luminance signal is obtained based on a linear video signal. For example, the first linear display light luminance signal is a linear display light luminance signal. In this embodiment of this application, because the input is the HDR HLG signal, the linear video signal is a linear scene light signal, and a luminance signal Ys obtained based on the linear scene light signal is a scene light luminance signal. The HDR HLG signal first needs to be converted into the display light luminance signal Yd before luminance mapping is performed.

The linear luminance Ys is calculated as follows:

$$Y_s = 0.2627R_s + 0.6780G_s + 0.0593B_s. \quad (100)$$

(3) Calculate a Yd signal:

$$Y_d = 1000(Y_s)^{1.2}. \quad (101)$$

(4) Calculate a luminance mapping gain TmGain.

The luminance mapping gain TmGain is calculated according to the following equation:

$$TmGain = \begin{cases} \frac{Y_d}{Y_s}, & Y_s \neq 0 \\ 0, & Y_s = 0 \end{cases}. \quad (102)$$

(5) Calculate an $R_{tm}G_{tm}B_{tm}$ signal:

$$E_{tm} = E_s \times TmGain. \quad (103)$$

In the equation, Es represents any component of the $R_sG_sB_s$ signal, and $E_{tm}$ represents any component of the $R_{tm}G_{tm}B_{tm}$ signal.

(6) Calculate an R'tG'tB't signal:

$$E'_t = PQ\_EOTF^{-1}(E_t). \quad (104)$$

For a function $PQ\ EOTF^{-1}( )$ that is in the equation and that is defined as follows, refer to Table 4 in ITU BT.2100:

$$PQ\_EOTF^{-1}(E) = \left(\frac{c_1 + c_2 E^{m_1}}{1 + c_3 E^{m_1}}\right)^{m_2}, \quad (105)$$

where:

$m1 = 2610/16384 = 0.1593017578125$, $m2 = 2523/4096 \times 128 = 78.84375$, $c1 = 3424/4096 = 0.8359375 = c3 - c2 + 1$, $c2 = 2413/4096 \times 32 = 18.8515625$, and $c3 = 2392/4096 \times 32 = 18.6875$.

(7) Calculate a YtCbtCrt signal:

$$\begin{pmatrix} Y_{tf} \\ Cb_{tf} \\ Cr_{tf} \end{pmatrix} = \begin{pmatrix} 0.2627 & 0.6780 & 0.0593 \\ -0.1396 & -0.3604 & 0.5 \\ 0.5 & -0.4598 & -0.0402 \end{pmatrix} \times \begin{pmatrix} R'_t \\ G'_t \\ B'_t \end{pmatrix}, \text{and} \quad (106)$$

$$\begin{pmatrix} Y_t \\ Cb_t \\ Cr_t \end{pmatrix} = \begin{pmatrix} 876 & 0 & 0 \\ 0 & 896 & 0 \\ 0 & 0 & 896 \end{pmatrix} \times \begin{pmatrix} Y_{tf} \\ Cb_{tf} \\ Cr_{tf} \end{pmatrix} + \begin{pmatrix} 64 \\ -512 \\ -512 \end{pmatrix}. \quad (107)$$

R'tG'tB't is a floating-point non-linear color value, and its value is within an interval [0, 1]. The YtCbtCrt signal obtained through the foregoing processing is a 10-bit digital code value.

For example, a terminal may complete subsequent processing such as frame rate adjustment, bit width adjustment, and 4:4:4 to 4:2:2/4:2:0 downsampling based on a frame rate, a bit width, and a chroma downsampling manner that are determined for an HDR PQ TV connected to the terminal, and then transmit an HDR PQ signal generated through conversion to the HDR PQ TV.

1105. Compatibility adaptation performed for an HDR PQ signal

To implement transmission of an HDR PQ signal to the foregoing types of TVs, a manner listed in Table 5 is recommended for compatibility adaptation in this embodiment.

TABLE 5

| | Television type | | | |
|---|---|---|---|---|
| Output parameter | Type 1 | Type 2 | Type 3 | Type 4 |
| Color gamut | BT.709 | BT.2020 | BT.2020 | BT.2020 |
| Curve | Gamma | Gamma | PQ | PQ |

Conversion from an HDR PQ Signal into an SDR Signal.

Conversion from an HDR PQ signal to an SDR signal may be implemented based on a common process described in the part 1103. For example, a terminal may complete subsequent processing such as frame rate adjustment, bit width adjustment, and 4:4:4 to 4:2:2/4:2:0 downsampling based on a frame rate, a bit width, and a chroma downsampling manner that are determined for an SDR TV connected to the terminal, and then transmit an SDR signal generated through conversion to the SDR TV.

Adaptation Performed for an HDR PQ Signal Transmitted to an HDR PQ TV.

Considering that each existing HDR TV supporting an HDR PQ signal has a capability of an HDMI interface in HDMI2.0a and later versions and has a relatively mature capability of processing HDR PQ signals. It is recommended in this embodiment that, when an HDR PQ signal is received, the HDR PQ signal and static metadata should be directly output to an HDR TV through an HDMI interface in HDMI2.0a and later versions, and the TV completes subsequent display processing performed on the HDR PQ signal. Because dynamic metadata cannot be transmitted to the TV due to a limitation on the HDMI interface, after decoding is performed, discard processing needs to be performed on the dynamic metadata.

The following describes a test solution provided in an embodiment of this application.

A specific operation is continuously playing a to-be-evaluated image and a reference image for viewers for a specific time period according to the following test solutions, after playing, reserving a specific time interval for the viewers to give scores, and averaging all given scores and using an average score as an evaluation value of the sequence, that is, an evaluation value of the to-be-evaluated image.

A plurality of testers give scores for various test objects according to a scoring criterion in Table 6 and using a rule of scoring image quality and impairment in BT.500-13 as a reference.

TABLE 6

| 5-point scoring system | |
|---|---|
| Quality score | Assessment of image quality and impairment |
| 5: Excellent | No deterioration in image quality |
| 4: Good | Slight deterioration in image quality but no hindrance to watching |
| 3: General | Obvious deterioration in image quality and slight hindrance to watching |
| 2: Poor | Watching hindered |
| 1: Very poor | Watching hindered seriously |

Adaptation of an HDR HLG Signal to an SDR TV

Figure 17:
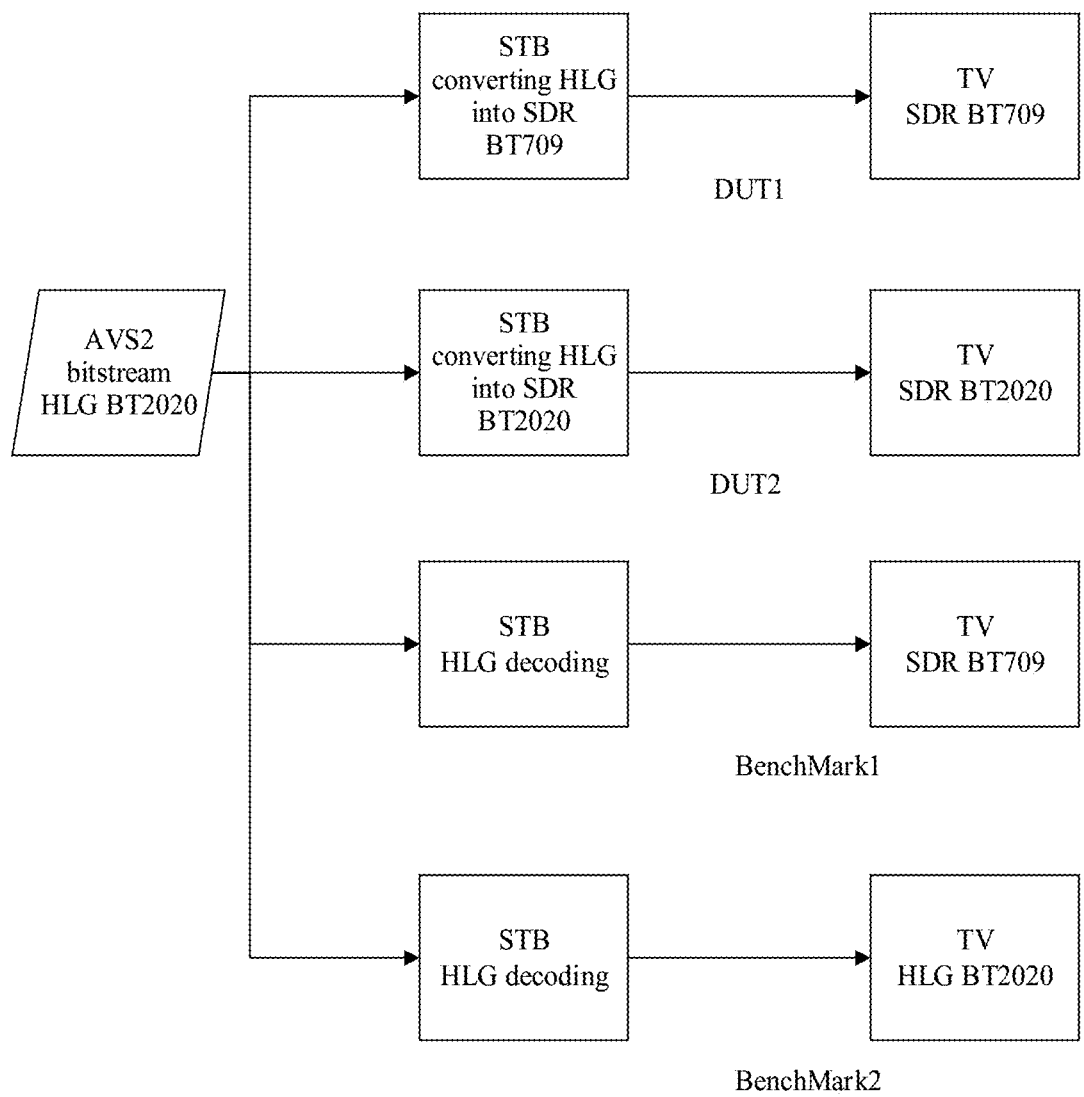
FIG. 17 is a schematic diagram of example test networking according to an embodiment of this application.

Test objective: A comparison test shows, when an HDR HLG signal is sent to an SDR TV, whether a beneficial image effect can be provided after adaptation conversion from an HLG image into an SDR picture is performed. FIG. 17 is a schematic diagram of test networking, where:

DUT1: Converting HLG into BT.709;
DUT2: Converting HLG into SDR BT.2020;
BenchMark1: Watching an HLG image in an SDR BT.709 mode; and
BenchMark1: Watching an HLG image on an HDR HLG TV in an HLG BT.2020 mode.

Adaptation of an HDR HLG Signal to an HDR PQ TV.

Figure 18:
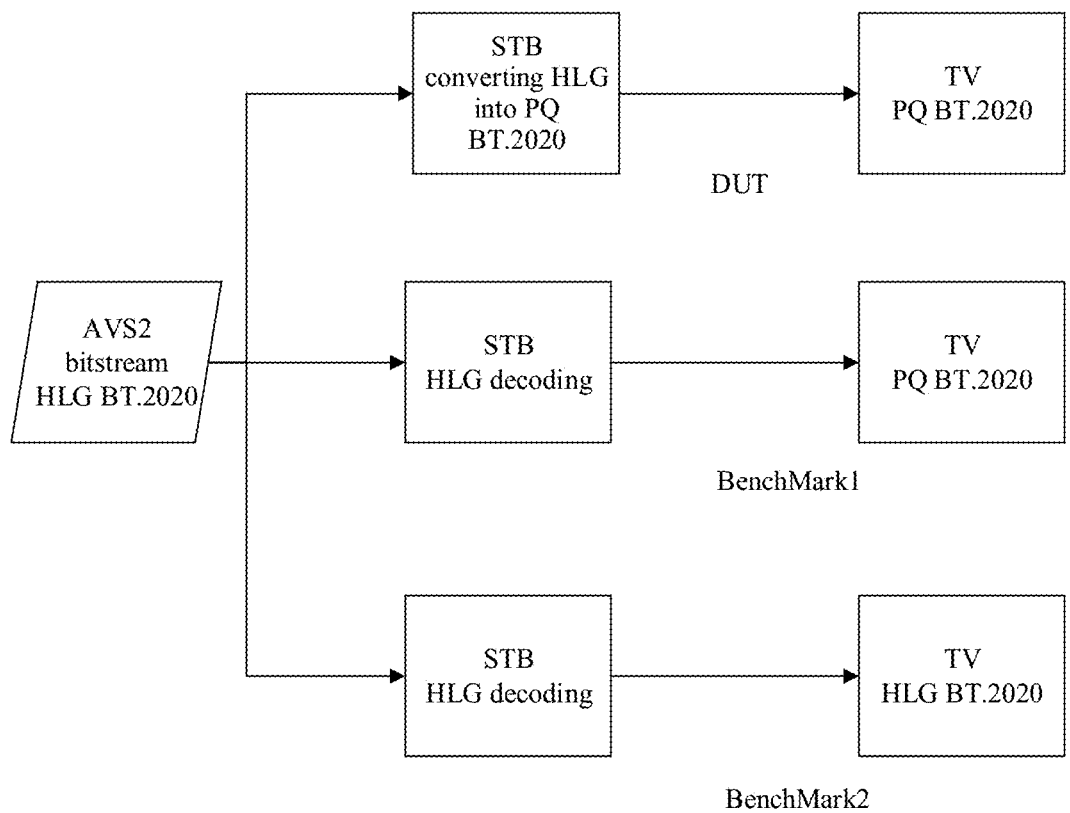
FIG. 18 is a schematic diagram of other example test networking according to an embodiment of this application.

FIG. 18 is a schematic flowchart of a networking mode in another test solution according to an embodiment of this application, where:

DUT1: Converting HLG into HDR PQ BT.2020;
Benchmark1: Watching an HLG image on an HDR PQ TV in an SDR BT.709 mode; and
Benchmark2: Watching an HLG image on an HDR PQ TV in an HLG BT.2020 mode.

Figure 19:
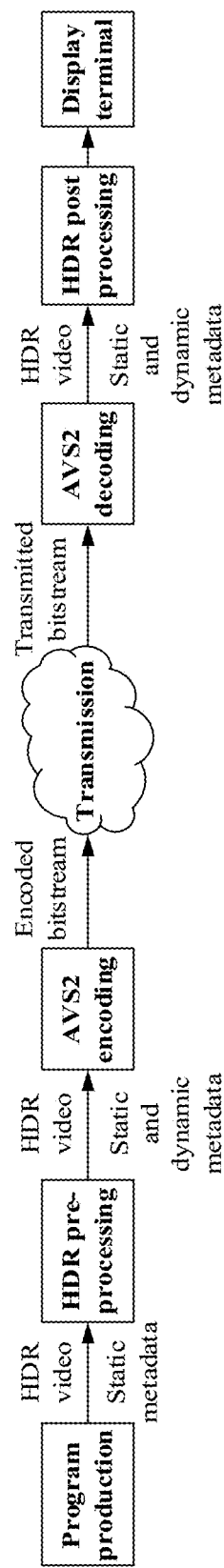
FIG. 19 is an architectural diagram of an HDR end-to-end system according to an embodiment of this application.

For a PQ curve HDR video, an HDR end-to-end system is shown in FIG. 19. Through program production, the PQ curve HDR video and static metadata are obtained, and an HDR video production parameter complies with stipulations in the GY/T 315-2018 standard. HDR pre-processing is performed to extract dynamic metadata, to obtain the HDR video and the metadata that are used for encoding and transmission. After AVS2 encoding and encapsulation are performed on the HDR video and the metadata, the processed HDR video and metadata are transmitted in a network. At a receive end, an AVS2 decoder performs decoding to obtain the HDR video and the metadata. An SDR display terminal reconstructs, using the HDR video and the metadata, an SDR video for display. An HDR display terminal directly performs HDR display if a display capability of the terminal matches a luminance of the HDR video that is produced for transmission. The HDR display terminal performs adaptation based on the display capability of the terminal using the HDR video and the metadata and then performs display, if the display capability of the terminal does not match the luminance of the HDR video that is produced for transmission.

Figure 20:
FIG. 20 is a schematic diagram of a 1000 candela per square meter ($cd/m^2$) HLG curve HDR video end-to-end system according to an embodiment of this application.

For an HLG curve HDR video, when a maximum luminance used during program production is 1000 $cd/m^2$, an HDR end-to-end system is shown in FIG. 20. Through program production, the HLG curve HDR video is obtained, and an HDR video production parameter complies with stipulations in the GY/T 315-2018 standard. After AVS2 encoding is performed on the HDR video, the encoded HDR video is transmitted in a network. At a receive end, an AVS2 decoder performs decoding to obtain the HDR video, and then an SDR terminal and an HDR terminal directly display the HDR video.

Figure 21:
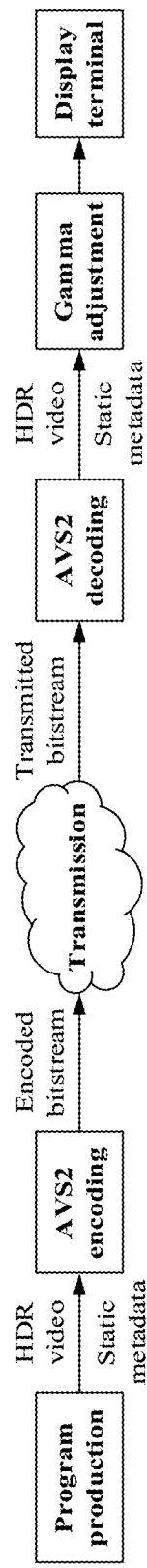
FIG. 21 is a schematic diagram of a non-1000 $cd/m^2$ HLG curve HDR video end-to-end system according to an embodiment of this application.

For an HLG curve HDR video, when a maximum luminance used during program production is not 1000 $cd/m^2$, an HDR end-to-end system is shown in FIG. 21. Through program production, the HLG curve HDR video and static metadata are obtained, and an HDR video production parameter complies with stipulations in the GY/T 315-2018 standard. After AVS2 encoding and encapsulation are performed on the HDR video and the static metadata, the processed HDR video and static metadata are transmitted in a network. At a receive end, an AVS2 decoder performs decoding to obtain the HDR video and the static metadata. An SDR display terminal directly performs display. An HDR display terminal adjusts a display gamma value according to the method specified in Table 5 in GY/T 315-2018 and using the static metadata, and then performs display.

Metadata Information.

The metadata information metadata_info( ) includes dynamic metadata. When the dynamic metadata is combined with a transmitted image related to the dynamic metadata, an HDR picture can be reconstructed.

HDR Picture Characteristic.

hdr_characteristics( ) includes HDR picture signal characteristics an identifier of HDR picture color space and an identifier of a primary color of a mastering display used to perform editing and color grading on an HDR picture.

HDR Picture Color Space (hdrPicColorSpace).

This variable represents primary colors and reference white points that are of HDR picture color space and that are in compliance with definitions in CIE1931.

HDR Mastering Display Color Space (hdrDisplayColorSpace).

This variable represents primary colors and reference white points that are of color space of a mastering display used to perform editing and color grading on an HDR picture and that are in compliance with definitions in CIE1931.

Maximum Display Luminance of an HDR Mastering Display (hdrDisplayMaxLuminance).

This variable defines a nominal maximum display luminance of a mastering display used to perform editing and color grading on an HDR picture. The nominal maximum display luminance is rounded off to an integer multiple of 50 $cd/m^2$.

Minimum Display Luminance of an HDR Mastering Display (hdrDisplayMinLuminance).

This variable defines a nominal minimum display luminance of a mastering display used to perform editing and color grading on an HDR picture. The nominal minimum display luminance is in a unit of 0.0001 $cd/m^2$.

hdrDisplayMinLuminance should be less than hdrDisplayMaxLuminance. If the variables are unknown, it is recommended that the variables should be set to 0.

SDR Picture Characteristic.

sdr_characteristics( ) includes SDR picture signal characteristics an identifier of SDR picture color space and nominal maximum and minimum luminance values of a mastering display used to perform editing and color grading on an SDR picture.

SDR Picture Color Space (sdrPicColorSpace).

This variable represents primary colors and reference white points that are of SDR picture color space and that are in compliance with definitions in CIE1931.

Maximum Luminance of an SDR Mastering Display (sdrDisplayMaxLuminance).

This variable defines a nominal maximum display luminance of a mastering display used to perform editing and color grading on an SDR picture. The nominal maximum display luminance is rounded off to an integer multiple of 50 $cd/m^2$ in a unit of 1 $cd/m^2$.

Minimum Luminance of an SDR Mastering Display (sdrDisplayMinLuminance).

luminance_mapping_variables( ) includes a luminance mapping variable, and is used to construct an LUT lutMapY.

Tone Mapping Input Signal Black Level Offset (tmInputSignalBlackLevelOffset).

In a process of reconstructing a luminance mapping curve, this variable is used to perform a first step of signal gain calculation, and represents a black level offset that is eliminated during color volume reconstruction. A value of this variable should be in a range [0, 1], and is an integer multiple of (1+255).

Receiving Terminal.

It is specified how a receiving terminal implements HDR post processing in the embodiments of this application in different application scenarios. The HDR post processing is categorized into two cases.

(1) A set top box is combined with a television, with a post processing module disposed on the set top box.

A user performs parameter configuration based on a display capability of a television such as a maximum display luminance, a minimum display luminance, and a color gamut and using a remote control of a set top box, where the set top box learns the display capability of the television. The set top box analyzes a received program bitstream, to obtain information a program is an SDR program/HDR program, a maximum luminance, a minimum luminance, and the like. If the program bitstream matches the display capability of the television, the set top box performs audio/video decoding, and sends, through an HDMI, the information to the television for display. If the program bitstream does not match the display capability of the television, the set top box performs audio/video decoding, obtains, through display adaptation, a program signal that adapts to the display capability of the television, and sends, through an HDMI, the information to the television for display.

(2) All-in-one machine is used, with a post processing module disposed on a television.

An all-in-one machine decodes a received program bitstream, and performs adjustment and adaptation based on an actual display capability of a television, and then performs display.

In this embodiment of this application, a manner of transmitting HDR metadata through an HDMI interface is described. The HDMI2.0a specification defines how to transmit HDR static metadata through an HDMI interface, and the HDMI2.1 specification defines how to transmit HDR dynamic metadata through an HDMI interface.

Transmission of HDR Static Metadata Through an HDMI Interface.

The HDMI2.0a standard defines transmission of HDR static metadata using CEA-861.3-2014. When an upstream source processing device (for example, a set top box) cannot process HDR static metadata, the HDR static metadata may be transmitted, through a CEA-861.3-2014 interface, to a receive end (for example, a television) that can receive and process the HDR static metadata. This appendix supplements information transmission and mapping of an HDR static metadata data block "HDR Static Metadata Data Block" (C.2.2, which is corresponding to 4.2 in the CEA-861.3-2014 specification) and a dynamic metadata and a mastering information frame "Dynamic Metadata and Mastering InfoFrame" (C.2.3, which is corresponding to 3.2 in the CEA-861.3-2014 specification).

HDR Static Metadata Data Block.

The HDR static metadata data block "HDR Static Metadata Data Block" is used to transmit HDR static metadata supporting capability information of a receive end to a source device. When an "ET_2" bit in the data block transmitted by the receive end to the source device is equal to 1, it indicates that the receive end supports a PQ EOTF curve specified in GY/T 315-2018. When an "SM_0" bit is equal to 1, it indicates that the receive end supports static metadata in this specification.

Dynamic Metadata and Mastering Information Frame.

The dynamic metadata and mastering information frame "Dynamic Metadata and Mastering InfoFrame" is used by a source device to identify HDR dynamic metadata and transmit the HDR dynamic metadata to a receiving device.

The source device uses a value 2 of "EOTF" to indicate that an EOTF curve of a transport stream is a PQ curve defined in GY/T 315-2018, and uses a value 0 of "Static_MetaData_Descriptor_ID" to indicate that static metadata in this standard is carried in extended information of a user such that the static metadata in compliance with this standard is transmitted.

Transmission of HDR Dynamic Metadata Through an HDMI Interface.

The HDMI2.1 standard defines transmission of HDR dynamic metadata using CTA-861-G-2016. CTA-861-G2016 defines how to add HDR metadata to a CE terminal interface. When an upstream source processing device (for example, a set top box) cannot process HDR metadata, the HDR metadata may be transmitted, through a CTA-861-G-2016 interface, to a receive end (for example, a television) that can receive and process the HDR metadata. This appendix supplements information transmission and mapping of an HDR dynamic metadata data block "HDR Dynamic Metadata Data Block" (C.3.2, which is corresponding to 7.5.14 in the CTA-861-G-2016 specification) and an HDR dynamic metadata extended information frame "HDR Dynamic Metadata Extended InfoFrame" (C.3.3, which is corresponding to 6.10.1 in the CTA-861-G-2016 specification).

HDR Dynamic Metadata Data Block.

The HDR dynamic metadata data block "HDR Dynamic Metadata Data Block" is used to transmit HDR dynamic metadata supporting capability information of a receive end to a source device. When a value of a supported dynamic metadata type "Supported HDR Dynamic Metadata Type" in the data block transmitted by the receive end to the source device is 0x0002, it indicates that the receive end supports dynamic metadata in this standard.

When the value of the supported dynamic metadata type "Supported HDR Dynamic Metadata Type" is 0x0002, support flag "Support Flags" bytes in the data block represent different HDR transmission modes. When a binary value including the first bit to the third bit is greater than or equal to 1, and the fifth bit is equal to 1, it indicates that an HDR transmission mode in this standard is supported.

HDR Dynamic Metadata Extended Information Frame.

The HDR dynamic metadata extended information frame "HDR Dynamic Metadata Extended InfoFrame" is used by a source device to identify HDR dynamic metadata and transmit the HDR dynamic metadata to a receiving device.

The source device uses a value 0x0002 of an extended information frame type "Extended InfoFrame Type" to indicate that dynamic metadata in this standard is carried in extended information of a user such that the dynamic metadata in compliance with this standard is transmitted.

An embodiment of this application further provides a computer-readable storage medium. The computer-readable storage medium stores an instruction. When the instruction is run on a computer, the computer is enabled to perform one or more steps in any one of the foregoing methods. When the signal processing modules in the apparatus are implemented in the form of a software functional unit and sold or used as an independent product, the integrated unit may be stored in the computer-readable storage medium.

Based on such an understanding, the technical solutions of this application essentially, or the part contributing to other approaches, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of this application. For a type of the storage medium, refer to related descriptions of the memory 302.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application. For example, for some specific operations in the apparatus embodiment, refer to the foregoing method embodiments.

What is claimed is:

1. A video signal processing method comprising:
    obtaining a first linear luminance signal based on a first linear red, green, and blue (RGB) signal corresponding to a video signal;
    converting the first linear luminance signal into a first non-linear luminance signal;
    performing a piecewise luminance mapping on the first non-linear luminance signal to obtain a second non-linear luminance signal;
    converting the second non-linear luminance signal into a second linear luminance signal;
    calculating a luminance gain from the first linear luminance signal to the second linear luminance signal; and
    obtaining, based on a product of the luminance gain and the first linear RGB signal, an RGB display signal corresponding to the video signal.

2. The video signal processing method of claim 1, wherein the video signal is a Perceptual Quantizer (PQ) signal, and wherein obtaining the first linear luminance signal comprises:
    performing a first color space conversion on the PQ signal to obtain a first non-linear RGB signal;
    converting the first non-linear RGB signal into the first linear RGB signal based on a PQ electro-optic transfer function (EOTF); and
    calculating, based on first primary color signals of the first linear RGB signal, the first linear luminance signal.

3. The video signal processing method of claim 1, wherein the video signal is a Hybrid Log-Gamma (HLG) signal, and wherein obtaining the first linear luminance signal comprises:
    performing a second color space conversion on the HLG signal to obtain a second non-linear RGB signal;
    converting the second non-linear RGB signal into a second linear RGB signal based on an HLG inverse optical-electro transfer function (OETF);
    calculating, based on second primary color signals of the second linear RGB signal, a third linear luminance signal; and
    performing a luminance signal type conversion on the third linear luminance signal to obtain the first linear luminance signal.

4. The video signal processing method of claim 1, wherein performing the piecewise luminance mapping on the first non-linear luminance signal further comprises:
    obtaining a second luminance value of the second non-linear luminance signal that is equal to a first luminance value of the first non-linear luminance signal when the first luminance value is less than or equal to a first threshold;
    obtaining the second luminance value based on a fitted curve that uses the first luminance value as an independent variable when the first luminance value is greater than the first threshold and is less than or equal to a second threshold, wherein the first threshold is less than the second threshold; and obtaining the second luminance value that is equal to a maximum non-linear display luminance value corresponding to a display device when the first luminance value is greater than the second threshold.

5. The video signal processing method of claim 4, further comprising performing Hermite interpolation on the first threshold and the second threshold to obtain the fitted curve.

6. The video signal processing method of claim 4, further comprising further performing the piecewise luminance mapping on the first non-linear luminance signal using a piecewise function, wherein the piecewise function comprises:

$$f_{tm}(e) = \begin{cases} e, & e \leq KP1 \\ hmt(e), & KP1 < e \leq KP2 \\ \text{max}DL, & e > KP2 \end{cases}; \text{ and}$$

$hmt(x) = y_0 \times \alpha_0(x) + y_1 \times \alpha_1(x) + y'_0 \beta_0(x) + y'_1 \beta_1(x)$, wherein $$\begin{cases} \alpha_0(x) = \dfrac{(x_1 - 3x_0 + 2x)(x_1 - x)^2}{(x_1 - x_0)^3} \\ \alpha_1(x) = \dfrac{(3x_1 - x_0 - 2x)(x - x_0)^2}{(x_1 - x_0)^3} \\ \beta_0(x) = \dfrac{(x - x_0)(x - x_1)^2}{(x_1 - x_0)^2} \\ \beta_1(x) = \dfrac{(x - x_0)^2(x - x_1)}{(x_1 - x_0)^2} \end{cases},$$

wherein e is the first non-linear luminance signal, wherein $f_{tm}(e)$ is the second non-linear luminance signal, wherein KP1 is the first threshold, wherein KP2 is the second threshold, wherein maxDL is the maximum non-linear display luminance value, wherein $x_1$ is a maximum non-linear source luminance value, wherein $x_0$=KP1, wherein $y_0$=KP1, wherein $y_1$=maxDL, wherein $y_0'$=1, and wherein $y_1'$=0.

7. The video signal processing method of claim 1, wherein converting the first linear luminance signal into the first non-linear luminance signal comprises:

converting the first linear luminance signal into the first non-linear luminance signal based on a PQ inverse electro-optical transfer function (EOTF); and converting the second non-linear luminance signal into the second linear luminance signal based on a PQ EOTF.

8. A video signal processing apparatus comprising:
a memory configured to store instructions; and
a processor coupled to the memory, wherein the instructions cause the processor to be configured to:
obtain a first linear luminance signal based on a first linear red, green, and blue (RGB) signal corresponding to a video signal;
convert the first linear luminance signal into a first non-linear luminance signal;
perform a piecewise luminance mapping on the first non-linear luminance signal to obtain a second non-linear luminance signal;
convert the second non-linear luminance signal into a second linear luminance signal;
calculate a luminance gain from the first linear luminance signal to the second linear luminance signal; and
obtain, based on a product of the luminance gain and the first linear RGB signal, an RGB display signal corresponding to the video signal.

9. The video signal processing apparatus of claim 8, wherein the video signal is a Perceptual Quantizer (PQ) signal, and wherein the instructions further cause the processor to be configured to:
perform a first color space conversion on the PQ signal to obtain a first non-linear RGB signal;
convert the first non-linear RGB signal into the first linear RGB signal based on a PQ electro-optical transfer function (EOTF); and
calculate, based on first primary color signals of the first linear RGB signal, the first linear luminance signal.

10. The video signal processing apparatus of claim 8, wherein the video signal is a Hybrid Log-Gamma (HLG) signal, and wherein the instructions further cause the processor to be configured to:
perform a second color space conversion on the HLG signal to obtain a second non-linear RGB signal;
convert the second non-linear RGB signal into a second linear RGB signal based on an HLG inverse optical-electro transfer function (OETF);
calculate, based on second primary color signals of the second linear RGB signal, a third linear luminance signal; and
perform a luminance signal type conversion on the third linear luminance signal to obtain the first linear luminance signal.

11. The video signal processing apparatus of claim 8, wherein the instructions further cause the processor to be configured to:
obtain a second luminance value of the second non-linear luminance signal that is equal to a first luminance value of the first non-linear luminance signal when the first luminance value is less than or equal to a first threshold;
obtain the second luminance value based on a fitted curve that uses the first luminance value as an independent variable when the first luminance value is greater than the first threshold and is less than or equal to a second threshold; and
obtain the second luminance value that is equal to a maximum non-linear display luminance value corresponding to a display device when the first luminance value is greater than the second threshold.

12. The video signal processing apparatus of claim 11, wherein the instructions further cause the processor to be configured to perform Hermite interpolation on the first threshold and the second threshold to obtain the fitted curve.

13. The video signal processing apparatus of claim 11, wherein the instructions further cause the processor to be configured to further perform the piecewise luminance mapping on the first non-linear luminance signal using a piecewise function, wherein the piecewise function comprises:

$$f_{tm}(e) = \begin{cases} e, & e \leq KP1 \\ hmt(e), & KP1 < e \leq KP2 \\ \text{max}DL, & e > KP2 \end{cases}; \text{ and}$$

-continued $hmt(x) = y_0 \times \alpha_0(x) + y_1 \times \alpha_1(x) + y'_0 \beta_0(x) + y'_1 \beta_1(x)$, wherein $$\begin{cases} \alpha_0(x) = \dfrac{(x_1 - 3x_0 + 2x)(x_1 - x)^2}{(x_1 - x_0)^3} \\ \alpha_1(x) = \dfrac{(3x_1 - x_0 - 2x)(x - x_0)^2}{(x_1 - x_0)^3} \\ \beta_0(x) = \dfrac{(x - x_0)(x - x_1)^2}{(x_1 - x_0)^2} \\ \beta_1(x) = \dfrac{(x - x_0)^2(x - x_1)}{(x_1 - x_0)^2} \end{cases},$$

wherein e is the first non-linear luminance signal, wherein $f_{tm}(e)$ is the second non-linear luminance signal, wherein KP1 is the first threshold, wherein KP2 is the second threshold, wherein maxDL is the maximum non-linear display luminance value, wherein $x_1$ is a maximum non-linear source luminance value, wherein $x_0$=KP1, wherein $y_0$=KP1, wherein $y_1$=maxDL, wherein $y_0'$=1, and wherein $y_1'$=0.

14. The video signal processing apparatus of claim 8, wherein the instructions further cause the processor to be configured to:
convert the first linear luminance signal into the first non-linear luminance signal based on a PQ inverse electro-optical transfer function (EOTF); and
convert the second non-linear luminance signal into the second linear luminance signal based on a PQ EOTF.

15. A computer program product comprising computer-executable instructions stored on a non-transitory computer-readable storage medium that, when executed by a processor, cause an apparatus to:
obtain a first linear luminance signal based on a first linear red, green, and blue (RGB) signal corresponding to a video signal;
convert the first linear luminance signal into a first non-linear luminance signal;
perform a piecewise luminance mapping on the first non-linear luminance signal to obtain a second non-linear luminance signal;
convert the second non-linear luminance signal into a second linear luminance signal;
calculate a luminance gain from the first linear luminance signal to the second linear luminance signal; and
obtain, based on a product of the luminance gain and the first linear RGB signal, an RGB display signal corresponding to the video signal.

16. The computer program product of claim 15, wherein the video signal is a Hybrid Log-Gamma (HLG) signal, and wherein the computer-executable instructions further cause the apparatus to:
perform a color space conversion on the HLG signal to obtain a second non-linear RGB signal;
convert the second non-linear RGB signal into a second linear RGB signal based on an HLG inverse optical-electro transfer function (OETF);
calculate, based on primary color signals of the second linear RGB signal, a third linear luminance signal; and
perform a luminance signal type conversion on the third linear luminance signal to obtain the first linear luminance signal.

17. The computer program product of claim 15, wherein the computer-executable instructions further cause the apparatus to:
obtain a second luminance value of the second non-linear luminance signal that is equal to a first luminance value of the first non-linear luminance signal when the first luminance value is less than or equal to a first threshold;
obtain the second luminance value based on a fitted curve that uses the first luminance value as an independent variable when the first luminance value is greater than the first threshold and is less than or equal to a second threshold; and
obtain the second luminance value that is equal to a maximum non-linear display luminance value corresponding to a display device when the first luminance value is greater than the second threshold.

18. The computer program product of claim 17, wherein the computer-executable instructions further cause the apparatus to perform Hermite interpolation on the first threshold and the second threshold to obtain the fitted curve.

19. The computer program product of claim 17, wherein the computer-executable instructions further cause the apparatus to further perform the piecewise luminance mapping on the first non-linear luminance signal using a piecewise function, wherein the piecewise function comprises:

$$f_{tm}(e) = \begin{cases} e, & e \leq KP1 \\ hmt(e), & KP1 < e \leq KP2 \\ maxDL, & e > KP2 \end{cases}; \text{ and}$$

$hmt(x) = y_0 \times \alpha_0(x) + y_1 \times \alpha_1(x) + y'_0 \beta_0(x) + y'_1 \beta_1(x)$, wherein $$\begin{cases} \alpha_0(x) = \dfrac{(x_1 - 3x_0 + 2x)(x_1 - x)^2}{(x_1 - x_0)^3} \\ \alpha_1(x) = \dfrac{(3x_1 - x_0 - 2x)(x - x_0)^2}{(x_1 - x_0)^3} \\ \beta_0(x) = \dfrac{(x - x_0)(x - x_1)^2}{(x_1 - x_0)^2} \\ \beta_1(x) = \dfrac{(x - x_0)^2(x - x_1)}{(x_1 - x_0)^2} \end{cases},$$

wherein e is the first non-linear luminance signal, wherein $f_{tm}(e)$ is the second non-linear luminance signal, wherein KP1 is the first threshold, wherein KP2 is the second threshold, wherein maxDL is the maximum non-linear display luminance value, wherein $x_1$ is a maximum non-linear source luminance value, wherein $x_0$=KP1, wherein $y_0$=KP1, wherein $y_1$=maxDL, wherein $y_0'$=1, and wherein $y_1'$=0.

20. The computer program product of claim 15, wherein the computer-executable instructions further cause the apparatus to:
convert the first linear luminance signal into the first non-linear luminance signal based on a PQ inverse electro-optical transfer function (EOTF); and
convert the second non-linear luminance signal into the second linear luminance signal based on a PQ EOTF.

* * * * *